(12) United States Patent
Warner et al.

(10) Patent No.: US 9,495,087 B2
(45) Date of Patent: Nov. 15, 2016

(54) TWO-DIMENSIONAL SLIDER CONTROL

(71) Applicant: Apple Inc., Cupertino, CA (US)

(72) Inventors: Peter Warner, Paris (FR); Andrew Bryant, Los Gatos, CA (US); James Clinton Arndt, Livermore, CA (US); Olivier Fedkiw, San Francisco, CA (US); Ryan Alan Gallagher, San Jose, CA (US)

(73) Assignee: APPLE INC., Cupertino, CA (US)

( * ) Notice: Subject to any disclaimer, the term of this patent is extended or adjusted under 35 U.S.C. 154(b) by 577 days.

(21) Appl. No.: 13/912,121

(22) Filed: Jun. 6, 2013

(65) Prior Publication Data

US 2013/0346897 A1    Dec. 26, 2013

Related U.S. Application Data

(63) Continuation of application No. 12/853,275, filed on Aug. 9, 2010, now Pat. No. 8,468,465.

(51) Int. Cl.
*G06F 3/14* (2006.01)
*G06F 3/0484* (2013.01)

(52) U.S. Cl.
CPC .................. *G06F 3/04847* (2013.01)

(58) Field of Classification Search
CPC .................... G06F 3/14; G06F 3/17
USPC ........... 715/765, 833, 723; 725/37; 345/689; 348/80
See application file for complete search history.

(56) References Cited

U.S. PATENT DOCUMENTS

| | | | |
|---|---|---|---|
| 6,348,936 B1 | 2/2002 | Berteig | |
| 6,362,829 B1 | 3/2002 | Omvik et al. | |
| 6,850,259 B1 * | 2/2005 | Rzepkowski | G06F 3/04847 345/689 |
| 7,081,900 B2 | 7/2006 | Gonsalves et al. | |
| 7,123,269 B1 | 10/2006 | Bourdev et al. | |
| 7,693,341 B2 | 4/2010 | Pettigrew et al. | |
| 7,978,938 B1 | 7/2011 | Wilensky | |
| 8,023,164 B2 | 9/2011 | Ogawa | |
| 8,401,284 B2 | 3/2013 | Pettigrew et al. | |
| 8,468,465 B2 | 6/2013 | Warner et al. | |
| 2001/0036310 A1 | 11/2001 | Pettigrew et al. | |
| 2003/0103234 A1 | 6/2003 | Takabayashi et al. | |

(Continued)

FOREIGN PATENT DOCUMENTS

| | | |
|---|---|---|
| CA | 2806577 | 2/2012 |
| EP | 2603846 | 6/2013 |

(Continued)

OTHER PUBLICATIONS

International Preliminary Report on Patentability for PCT/US2011/046040, Feb. 21, 2013 (mailing date), Apple Inc.

(Continued)

*Primary Examiner* — Ruay Ho
(74) *Attorney, Agent, or Firm* — Adeli LLP

(57) ABSTRACT

Some embodiments provide a computer program that provides a graphical user interface (GUI) for controlling an application. The GUI includes a contiguous two-dimensional sliding region for defining several values. The GUI also includes several sliders for moving within the sliding region. Each slider selects one or more values from the several values based on a position of the slider within the sliding region. The selected values are parameters for controlling one or more operations of the application.

22 Claims, 32 Drawing Sheets

(56) References Cited

U.S. PATENT DOCUMENTS

| | | |
|---|---|---|
| 2003/0164847 A1 | 9/2003 | Zaima et al. |
| 2003/0197710 A1 | 10/2003 | Gonsalves et al. |
| 2004/0167783 A1* | 8/2004 | Nagai .................. G11B 27/034 704/270 |
| 2005/0271267 A1* | 12/2005 | Cooper .................. H04N 9/646 382/162 |
| 2006/0028483 A1 | 2/2006 | Kondo et al. |
| 2007/0061709 A1 | 3/2007 | Marks et al. |
| 2007/0089061 A1 | 4/2007 | Terada |
| 2007/0195343 A1 | 8/2007 | Yoneda |
| 2008/0131010 A1 | 6/2008 | Wilensky |
| 2008/0226199 A1 | 9/2008 | Breglio |
| 2008/0297597 A1* | 12/2008 | Inomata .................. G03B 7/00 348/80 |
| 2009/0204913 A1 | 8/2009 | Kawano et al. |
| 2009/0263016 A1 | 10/2009 | Kuo |
| 2009/0315867 A1* | 12/2009 | Sakamoto ........... G06F 3/03547 345/184 |
| 2010/0080448 A1 | 4/2010 | Tam et al. |
| 2010/0110101 A1 | 5/2010 | Relyea et al. |
| 2010/0238089 A1 | 9/2010 | Massand |
| 2011/0093890 A1* | 4/2011 | Araki ................. H01R 13/6461 725/37 |
| 2011/0185297 A1* | 7/2011 | Reid .................. G06F 3/04845 715/765 |
| 2011/0218961 A1 | 9/2011 | Johnson et al. |
| 2011/0246904 A1 | 10/2011 | Pinto et al. |
| 2012/0210229 A1* | 8/2012 | Bryant .................. H04N 9/73 715/723 |
| 2013/0205208 A1 | 8/2013 | Kim et al. |

FOREIGN PATENT DOCUMENTS

| | | |
|---|---|---|
| JP | 2004-228734 | 8/2004 |
| KR | 10-2009-0023928 | 3/2009 |
| WO | WO 2009/146296 | 12/2009 |
| WO | WO 2012/021313 | 2/2012 |

OTHER PUBLICATIONS

International Search report and Written opinion for PCT/US2011/046040, Nov. 8, 2011 (mailing date), Apple Inc.

Portions of prosecution history of EP11745864.6, Sep. 20, 2013 (mailing date), Apple Inc.

Author Unknown, "Adobe Photoshop 5.0 Limited Edition User Guide, Chapter 4: Making Color and Tonal Adjustments" Adobe Photoshop 5.0 Limited Edition User Guide, Jan. 1, 1998, pp. 67-68, Adobe Systems Inc., USA.

* cited by examiner

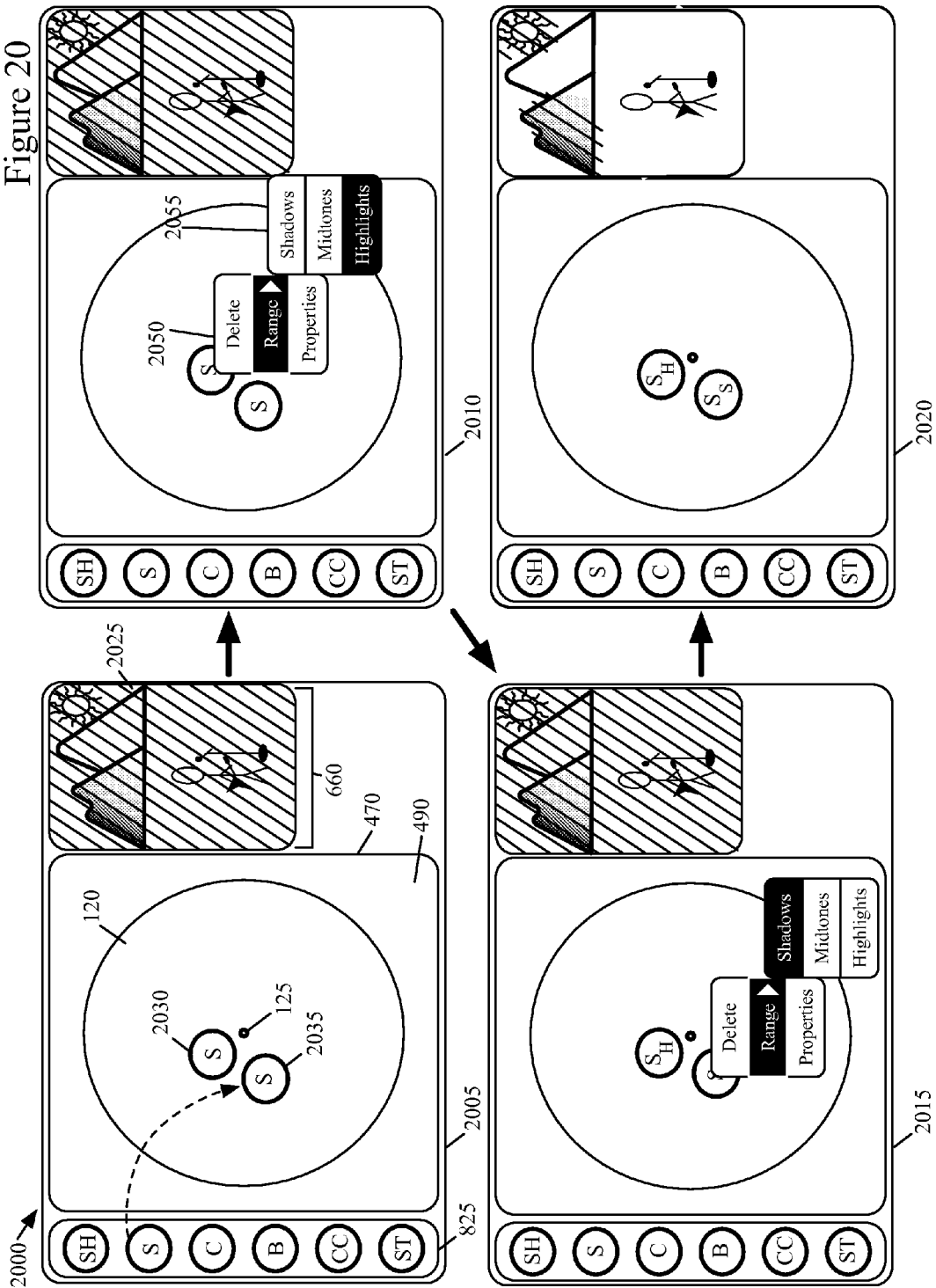

TWO-DIMENSIONAL SLIDER CONTROL

CLAIM OF BENEFIT TO PRIOR APPLICATIONS

This Application is a continuation application of U.S. patent application Ser. No. 12/853,275, filed Aug. 9, 2010, now issued as U.S. Pat. No. 8,468,465. U.S. patent application Ser. No. 12/853,275, now issued as U.S. Pat. No. 8,468,465 is incorporated herein by reference.

BACKGROUND

Many applications provide a graphical user interface (GUI) that allows a user to interact with the applications. An application GUI can include any number of different GUI components (e.g., widgets, controls) for outputting information and/or receiving information from a user. Examples of such GUI components include menus for listing a set of selectable commands, selectable buttons for performing an action, display windows for displaying information and/or receiving user input, text boxes for receiving text input, etc.

A slider control is one type of GUI component for receiving input values from a user. Typically, a slider control has two components: a sliding region (e.g., a "track") and a slider (e.g., a "thumb"). A slider moves along the sliding region on a single axis. A user can select a value from a defined range of values by moving the slider along the sliding region. The values in the defined range of values are associated with different positions along the sliding region and can be indicated (e.g., using a tick mark) along the sliding region. As such, a user can select different values in the range of values by moving the slider to the different positions along the sliding region (or selecting an indicated value along the sliding region).

The slider control can be used to control different functionalities of different applications. For example, sliding control can be used to control a volume level for a media playback application, a contrast value of an image for an image-editing application, a screen resolution of a monitor for a system preference settings application, etc.

Some slider controls also include a text box that displays the current selected value. Such slider controls provide another way for a user to set a value for the slider control by allowing the user to type a value directly into the text box. When a user types a value directly into the text box, the slider automatically moves to the position along the sliding region that corresponds to the value. Likewise, when a user selects a value by moving the slider to a position along the sliding region, the text box displays the selected value.

A slider control usually controls a single operation in an application. For instance, a color correction component of a media editing application usually employs multiple different slider controls that each performs a different operation on media (e.g., an image, a video clip) being edited. To perform multiple different color correction operations, multiple adjustments to multiple different slider controls must be made. Thus, performing color corrections can be tedious and complex for a user of such application. Moreover, a user of such application may have difficulty gauging the adjustments that are made to the media being edited due to the overwhelming number of slider controls.

BRIEF SUMMARY

Some embodiments of the invention provide a novel two-dimensional slider control in a graphical user interface (GUI). The two-dimensional slider control includes a sliding region and several sliders (also referred to below interchangeably as slider shapes). In these embodiments, the slider shapes can each be movably positioned within the sliding region in order to select a value from a range of values. In some embodiments, each slider shape is associated with an operation. A user can control the operation associated with a slider shape by movably positioning the slider shape within the sliding region to select a value from a range of values for the operation. The user can control multiple operations by movably positioning multiple sliders in the single sliding region. Moreover, by serving as one region for placing multiple slider shapes that define multiple attributes, the user can observe multiple operations being controlled and get a feel of multiple slider shape adjustments made at different points in time.

Different embodiments describe positions in the sliding region using different two-dimensional coordinate systems. For example, some embodiments describe positions in the sliding region by using a polar coordinate system. As such, the position in the sliding region is expressed in terms of a radial distance and an angle. Since radial distance and angle are used to describe positions in the sliding region, they are referred to below as position variables.

Some embodiments describe positions in the sliding region using a Cartesian coordinate system. Thus, the position in the sliding region is expressed in terms of two distances, each from a particular reference line (e.g., the x-axis, the y-axis). Like radial distance and angle, the distances from a particular reference line are also referred to below as position variables. Other two-dimensional coordinate systems, such as a two-dimensional parabolic coordinate system, can be used to describe positions within the sliding region in some embodiments. In addition, the positions of slider shapes in the sliding region can be described using a single coordinate system in some embodiments.

In some embodiments, a range of values is defined for each of the different position variables. In such embodiments, each of the possible values for a particular position variable (e.g., the different radial distances for the radial distance position variable, the different angles for the angle position variable, etc.) is associated with one or more values in a range of values. In some embodiments, the same range of values is defined for all the different position variables while in other embodiments the range of values for some or all of the different position variables are defined differently. Furthermore, values in a range of values can be defined differently in different embodiments. For instance, the values of a range of values can be defined as a set of continuous integers, such as 0 to 255, −127 to 128, 500-600, etc. Some embodiments define the values of a range of values as a set of integers at fixed intervals (e.g., 0 to 100 at intervals of 5). Also, the number of values in a range of values can be different in different embodiments and is based on how the range of values is defined. As such, values in a range of values can be defined any number of different ways.

As mentioned above, a range of value can be defined for the values of a particular position variable and positions in the sliding region can be described in terms of the position variable in some embodiments. Therefore, every position within the sliding region is associated with a value in the range of values since every position within the sliding region can be described in terms of the particular position variable. In this manner, a position of a slider shape within the sliding region can be used to specify a value from the range of values (e.g., by identifying the value in the range of values associated with the value of the particular position variable for the slider shape's position) defined for a position variable.

In some embodiments, different slider shapes select a value from a range of values based on different position variables. For instance, in some embodiments, one slider shape selects a value from a range of values based on a radial distance position variable, another slider shape selects a value from a range of values based on an x-axis position variable, and yet another slider shape selects a value from a range of values based on an angle position variable.

In some embodiments, slider shapes are presented as circles. However, different embodiments present slider shapes differently. Slider shapes can be presented using any number of different visual presentations (e.g., dots, squares, thumbnails, icons, colors, text, etc.). In some embodiments, the slider shapes are displayed using the same visual presentation. In other embodiments, slider shapes are displayed differently based on the operation associated with the slider shapes. That is, slider shapes associated with the same operation are displayed using the same visual presentation and slider shapes associated with different operations are displayed using different visual presentations.

The area of a sliding region of a two-dimensional slider control can be defined in any number of different ways (e.g., size, shape, etc.). For instance, the area of the sliding region of the two-dimensional slider control is defined as a circle in some embodiments. Other geometrical shapes can also be used, such as a square, a rectangle, a triangle, an oval, a, etc.

As an example, some embodiments of the two-dimensional slider control include a ring-shaped sliding region defined by an inner circle and an outer circle. In some embodiments, the outer circle represents a minimum value of a range of values and the inner circle represents a maximum value of the range of values. The ring-shaped sliding region of these embodiments allows multiple slider shapes to be positioned within the sliding region to simultaneously select the maximum value from a range of values without having to overlap each other.

Some embodiments of the two-dimensional slider control provide a background region in addition to a sliding region. In some embodiments, the background region is an area in the two-dimensional slider control within which slider shapes can be positioned. In some embodiments, when a slider shape is positioned in the background region, the operation(s) associated with the slider shape is not functioning and the slider shape is referred to as disabled, inactive, off, etc. When the slider shape is positioned in the sliding region, the operation(s) associated with the slider shape is functioning and the slider shape is referred to as enabled, active, on, etc. Thus, instead of positioning a slider shape within the sliding region that corresponds to an "off" position or minimum value, the user can place the slider shape in the background region to reduce clutter or when the user does not wish to use the slider shape at this time. In addition, the background region of some embodiments provides a region within which the sliding region can be movably positioned (instead of slider shapes) to control operations associated with slider shapes.

Some embodiments of the two-dimensional slider control can include any fixed number of slider shapes. In some embodiments, the number of slider shapes is based on the number of operations a user is allowed to control. Furthermore, some embodiments only allow the slider shapes to be movably positioned within the sliding region of the two-dimensional slider control whereas other embodiments allow the slider shapes of the two-dimensional slider control to be movably positioned anywhere within the display area of the two-dimensional slider control (e.g., inside as well as outside of the sliding region).

For a two-dimensional slider control, different embodiments provide different starting configurations for the slider shapes. For example, some embodiments provide a starting configuration in which the slider shapes are "zeroed out." That is, the slider shapes are positioned within the sliding region such that the operations associated with the slider shapes are off (e.g., inactive, disabled, select a value of zero, select a minimum value, etc.). One of ordinary skill will recognize that "zeroing out" the slider shapes depends on how values of a defined range of values are associated with positions within the sliding region and thus any number of different starting configurations are possible in order to "zero out" slider shapes. In addition, some embodiments "zero out" a slider shape by assigning a null value to the slider shape. Moreover, other embodiments provide other starting configurations for slider shapes. For instance, some embodiments of a two-dimensional slider control provide a starting configuration in which slider shapes are positioned at default positions/values. Some embodiments start the slider shapes outside of the sliding region.

Some embodiments of the two-dimensional slider control allow a dynamic number of slider shapes. That is, the number of slider shapes in a two-dimensional slider control can change at any given time. Specifically, such embodiments allow slider shapes to be added and deleted as well as movably positioned within the sliding region of the two-dimensional slider control. Different embodiments provide different ways of adding slider shapes to the two-dimensional slider control. For example, some embodiments add slider shapes to a two-dimensional slider control using a keystroke, a combination of keystrokes, a hotkey, an option selected from a pull-down or pop-up menu, or any other appropriate method.

In some embodiments, a two-dimensional slider control is for performing various image processing operations. Some of these embodiments provide slider shapes for applying a sharpness operation (e.g., unsharp mask) to an image being edited based on a radial distance from the center of the sliding region. Other slider shapes that perform other image processing operations (e.g., saturation, contrast, brightness, color balance, noise reduction, etc.) can be provided in different embodiments. In some embodiments, the image processing operation may be based on other position variables (e.g., angle, x-axis distance, y-axis distance).

In some embodiments, the process for controlling an operation of an application by using a two-dimensional slider control begins when a slider shape or a sliding region is movably positioned within the two-dimensional slider control. The position of a slider shape within the sliding region and the position of the sliding region is identified. A position variable (e.g., radial distance, angle, x-axis distance, y-axis distance) with respect to the sliding region is determined and a value in a range of values defined for the determined position variable is identified. Any remaining position variables for the slider shape are then similarly processed.

After all the position variables are processed, a set of parameters of at least one application based on the identified set of values. As mentioned above, a user can movably position a slider shape in a two-dimensional slider control of some embodiments to control an operation of an application. One way of controlling an operation of an application is to adjust a set of parameters for the operation. In some embodiments, the application can be any standalone application that runs on a computing device while in other embodiments the application is a component that is part of another application. The application can be an application that is part of an operating system of a computing device in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 20 conceptually illustrates a luminance range operation using a two-dimensional slider control of some embodiments.

DETAILED DESCRIPTION

In the following description, numerous details are set forth for purpose of explanation. However, one of ordinary skill in the art will realize that the invention may be practiced without the use of these specific details. For instance, various embodiments of a two-dimensional slider control are described throughout this application. One of ordinary skill will recognize that the same or similar features and processes can be implemented for a three-dimensional slider control as well.

Some embodiments of the invention provide a novel two-dimensional slider control in a graphical user interface (GUI). The two-dimensional slider control includes a sliding region and several sliders (discs, pucks, slider shapes, etc.), which will be referred to below as slide shapes. In these embodiments, the slider shapes can each be movably positioned within the sliding region in order to select a value from a range of values. In some embodiments, each slider shape is associated with an operation. A user can control the operation associated with a slider shape by movably positioning the slider shape within the sliding region to select a value from a range of values for the operation. The user can control multiple operations by movably positioning multiple sliders in the single sliding region. Moreover, by serving as one region for placing multiple slider shapes that define multiple attributes, the user can observe multiple operations being controlled and get a feel of multiple slider shape adjustments made at different points in time.

Figure 1:
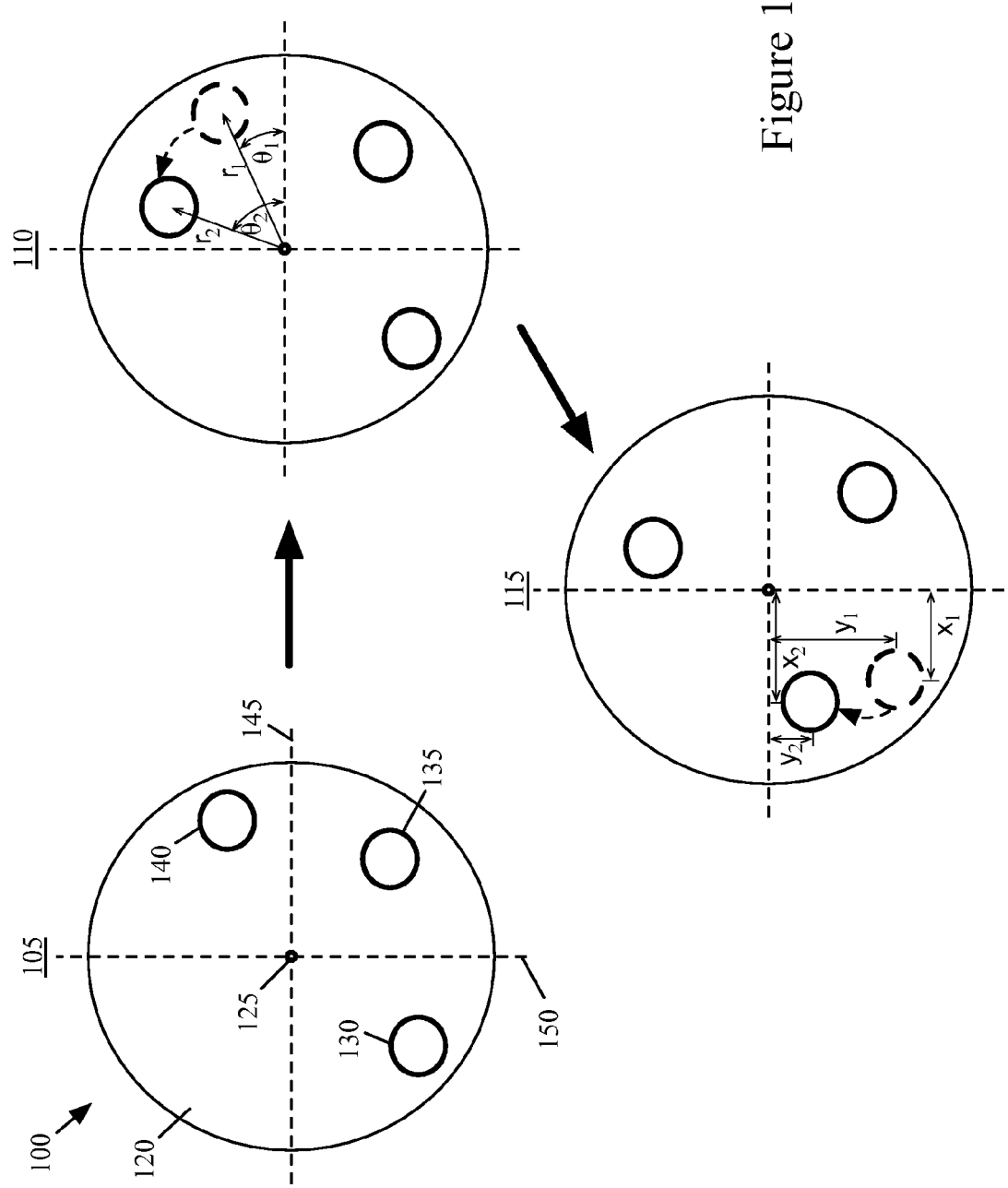
FIG. 1 conceptually illustrates a two-dimensional slider control of some embodiments.

FIG. 1 conceptually illustrates a two-dimensional slider control 100 of some embodiments. Specifically, this figure illustrates the two-dimensional slider control 100 at three different stages 105-115. Each of these stages will be described in further detail below. However, the elements of the two-dimensional slider control 100 will be introduced first.

As shown in FIG. 1, the two-dimensional slider control 100 includes a contiguous sliding region 120, a center 125, slider shapes 130-140, and axes 145 and 150. The axes 145 and 150 are shown in this figure to demonstrate the use of various coordinate systems to describe positions in the sliding region 120, which is described in further detail below.

The sliding region 120 is a contiguous two-dimensional area within which slider shapes may be movably positioned. As described below, the sliding region 120 of some embodiments provides a single scale of values from which multiple slider shapes can each select a value based on their positions in the sliding region 120.

Different embodiments describe positions in the sliding region 120 using different two-dimensional coordinate systems. For example, some embodiments describe positions in the sliding region 120 by using a polar coordinate system. As such, the position in the sliding region 120 is expressed in terms of a radial distance and an angle. In such embodiments, the center 125 is a fixed reference point (i.e., the pole) from which radial distances are determined. In addition, a ray starting from the center 125 and directed towards the right along the axis 145 (i.e., the polar axis) is a fixed direction from which angles are determined. Since radial distance and angle are used to describe positions in the sliding region 120, they are referred to below as position variables.

Some embodiments describe positions in the sliding region 120 using a Cartesian coordinate system. Thus, a position in the sliding region 120 is expressed in terms of two distances, each from a particular reference line (e.g., the x-axis, the y-axis). In such embodiments, the center 125 is the origin, and the axis 145 (e.g., the x-axis) and the axis 150 (e.g., the y-axis) are the two reference lines from which the distances are determined. Like radial distance and angle mentioned above, the distances from a particular reference line used to describe positions in the sliding region in terms of a Cartesian coordinate system are also referred to below as position variables.

Two examples of two-dimensional coordinate systems are described above. However, other two-dimensional coordinate systems, such as a two-dimensional parabolic coordinate system, can be used to describe positions within the sliding region 120 in some embodiments. In addition, although the positions of the slider shapes 130 and 140 are shown as being described using different coordinate systems, the positions of the slider shapes 130-140 can be described using a single coordinate system in some embodiments.

In some embodiments, a range of values is defined for each of the different position variables. In such embodiments, each of the possible values for a particular position variable (e.g., the different radial distances for the radial distance position variable, the different angles for the angle position variable, etc.) is associated with one or more values in a range of values. In some embodiments, the same range of values is defined for all the different position variables while in other embodiments the range of values for some or all of the different position variables are defined differently. Furthermore, values in a range of values can be defined differently in different embodiments. For instance, the values of a range of values can be defined as a set of continuous integers, such as 0 to 255, −127 to 128, 500-600, etc. Some embodiments define the values of a range of values as a set of integers at fixed intervals (e.g., 0 to 100 at intervals of 5). Also, the number of values in a range of values can be different in different embodiments and is based on how the range of values is defined. As such, values in a range of values can be defined any number of different ways.

As mentioned above, a range of value can be defined for the values of a particular position variable and positions in the sliding region 120 can be described in terms of the position variable in some embodiments. Therefore, every position within the sliding region 120 is associated with a value in the range of values since every position within the sliding region 120 can be described in terms of the particular position variable. In this manner, a position of a slider shape within the sliding region 120 can be used to specify a value from the range of values (e.g., by identifying the value in the range of values associated with the value of the particular position variable for the slider shape's position) defined for a position variable.

In some embodiments, different slider shapes select a value from a range of values based on different position variables. For instance, in some embodiments, the slider shape 135 selects a value from a range of values based on a radial distance position variable, the slider shape 130 selects a value from a range of values based on an x-axis distance position variable, and the slider shape 140 selects a value from a range of values based on an angle position variable. However, a slider shape can be defined to select a value from a range of values based on a different position variable in different embodiments.

In some embodiments, a slider shape selects multiple values based on multiple position variables of the slider shape within the sliding region 120. In such embodiments, each value is selected from a different range of values based on a different position variable. Using the slider shape 130 as an example, the slider shape 130 of some embodiments selects a value from a first range of values based on a radial distance position variable and also selects a value from a second range of values based on an angle position variable. That is, the slider shape 130s can be movably positioned within the sliding region 120 to select two values. In other embodiments, a slider shape can be defined to select values from different ranges of values based different numbers of different position variables.

Selecting multiple values through a positioning of a single slider shape within the sliding region 120 allows the user to control multiple operations (i.e., multiple operations can be associated with a particular slider shape) at once. In some such embodiments, each selected value controls a different operation. In other such embodiments, some of the values each control different operations and some of the values, together, control a single operation. In yet other such embodiments, the multiple selected values control a single operation.

The operation of the two-dimensional slider control 100 will now be described by reference to FIG. 1. In the first stage 105, the slider shapes 130-140 are positioned at various locations within the sliding region 120. Specifically, the slider shape 130 is positioned near the bottom of the sliding region 120 on the left side of the axis 145, the slider shape 135 is positioned in the lower right portion of the sliding region 120, and the slider shape 140 is positioned on the right side of the sliding region 120 above the axis 145.

The second stage 110 illustrates the slider shape 140 movably positioned within the sliding region 120. In this example, the position of the slider shape 140 is illustrated in terms of a polar coordinate system. As shown, the slider shape 140 starts at a position of distance $r_1$ and angle $\theta_1$ and is movably positioned (e.g., by performing a drag-and-drop operation) to a position of distance $r_2$ and angle $\theta_2$, as shown by an arrow. The movement modifies the values of the at least one of the radial distance and angle position variables of the slider shape 140. In this manner, movably positioning the slider shape 140 within the sliding region 120 can select different values for the radial distance position variable and the angle position variable.

The third stage 115 illustrates the slider shape 130 movably positioned within the sliding region 120. However, in this example, the position of the slider shape 130 is illustrated in terms of a Cartesian coordinate system. The slider shape 130 starts at a position of $x_1$ and $y_1$ and is movably positioned (e.g., by performing a drag-and-drop operation) to a position of $x_2$ and $y_2$, thereby modifying the values of the x-axis distance and y-axis distance position variables of the slider shape 130. Accordingly, movably positioning the slider shape 140 within the sliding region 120 can select different values for the x-axis position variable and the y-axis position variable.

In FIG. 1, the slider shapes 130-140 are presented as circles. However, different embodiments present slider shapes differently. Slider shapes can be presented using any number of different visual presentations (e.g., dots, squares, thumbnails, icons, colors, text, etc.). In some embodiments, such as the two-dimensional slider control 100, the slider shapes are displayed using the same visual presentation. In other embodiments, slider shapes are displayed differently based on the operation associated with the slider shapes. That is, slider shapes associated with the same operation are displayed using the same visual presentation and slider shapes associated with different operations are displayed using different visual presentations.

The area of a sliding region of a two-dimensional slider control can be defined in any number of different ways (e.g., size, shape, etc.). For instance, FIG. 1 illustrates the area of the sliding region 120 of the two-dimensional slider control 100 is defined as a circle. Other geometrical shapes can also be used, such as a square, a rectangle, a triangle, an oval, etc.

Figure 2:
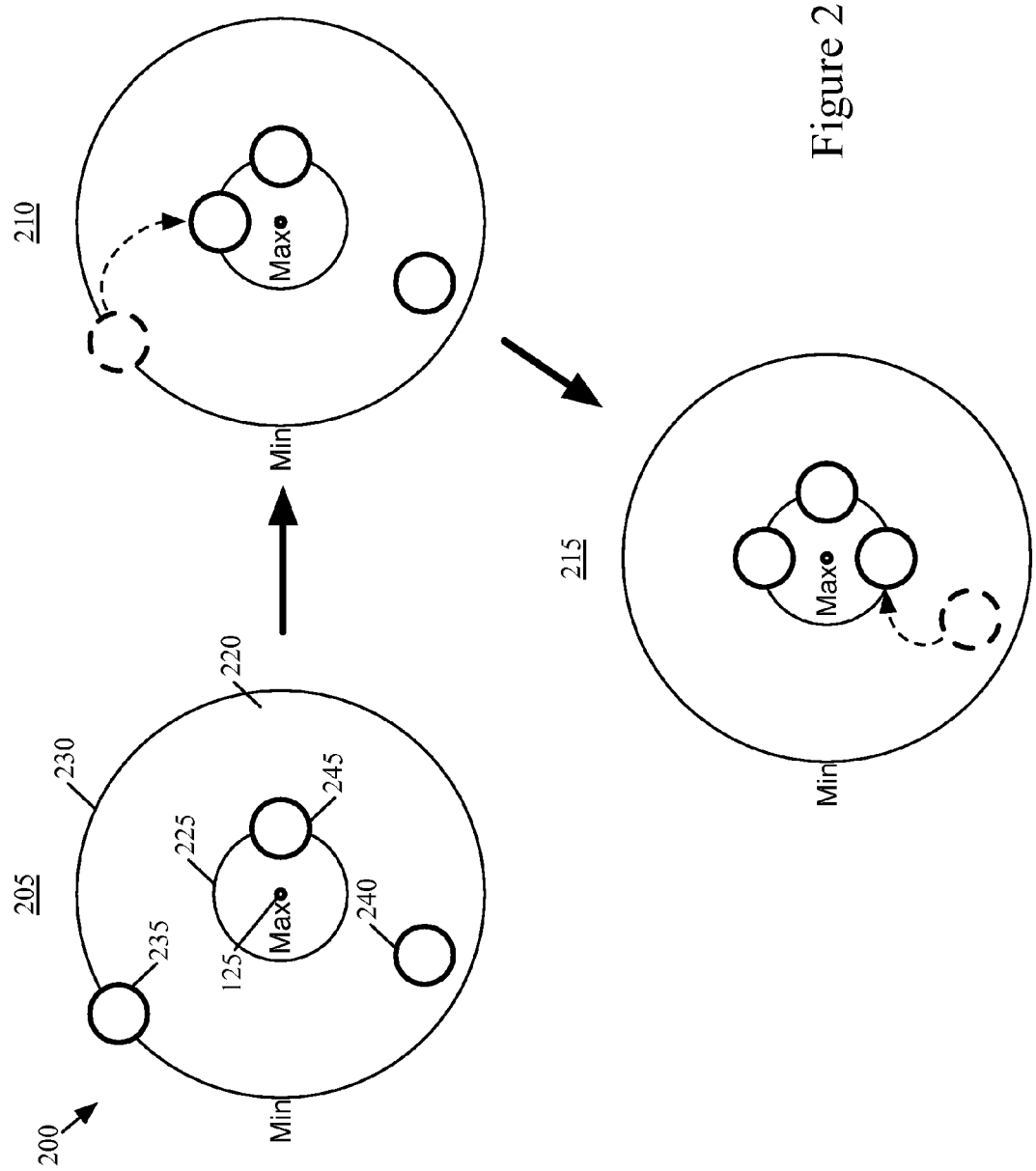
FIG. 2 conceptually illustrates another two-dimensional slider control of some embodiments.

FIG. 2 conceptually illustrates a two-dimensional slider control 200 of some embodiments. As mentioned above, the sliding region of different embodiments of the two-dimensional slider control are defined differently. In particular, FIG. 2 shows the two-dimensional slider control 200 that includes a ring-shaped sliding region 220, the center 125, and slider shapes 235-245. FIG. 2 illustrates the two-dimensional slider control 200 at three different stages 205-215.

As shown, an inner circle 225 and an outer circle 230 define the sliding region 220. In some embodiments, the outer circle 230 represents a minimum value of a range of values and the inner circle 225 represents a maximum value of the range of values. In some such embodiments, positioning a slider shape on or near the outer circle 220 selects a minimum value (e.g., 0, low, off, etc.) for an operation associated with the slider shape, positioning the slider shape on or near the inner circle 225 selects a maximum value (e.g., 100, high, on, etc.) for the operation associated with the slider shape, and positioning the slider shape in between the outer and inner circles 225 and 230 selects a value somewhere in between (e.g., 50, medium, etc.).

The first stage 205 shows the slider shapes 235-245 positioned within the sliding region 220 of the two-dimensional slider control 200. Specifically, the slider shape 235 is positioned on top left of the outer circle 230, the slider shape 240 is positioned between the inner circle 225 and the outer circle 230 in the lower left area of the sliding region 220, and the slider shape 245 is positioned on the right side of the inner circle 225. Thus, in this stage, the slider shape 235 selects a minimum value from a range of values, the slider shape 240 selects a value from the range of values that is in between the minimum value and a maximum value, and the slider shape 245 selects the maximum value from the range of values.

In the second stage 210, the slider shape 235 is moved within the sliding region 220. As shown, the slider shape is movably positioned (e.g., by performing a drag-and-drop operation) from a position on the outer circle 230 to a position on the inner circle 225 of the sliding region 220. As such, the slider shape 235 selects the maximum value from the range of values in this stage. This stage also illustrates that the shape of the sliding region 220 allows the slider shapes 235 and 245 to simultaneously select the maximum value without overlapping each other.

The third stage 215 shows the slider shape 240 moved within the sliding region 220. In particular, the slider shape 240 is movably positioned (e.g., by performing a drag-and-drop operation) onto the inner circle 225 of the sliding region 220. At this stage, the slider shape 240 selects the maximum value from the range of values. This stage also shows each of the slider shapes 235-245 positioned on the inner circle 225 to select the maximum value without overlapping each other.

As illustrated by FIG. 2, some embodiments provide a ring-shaped sliding region so that multiple slider shapes can be positioned within the sliding region to simultaneously select a maximum value from a range of values without having to overlap each other. Furthermore, the various embodiments of the two-dimensional slider control illustrated and described above and below may not show a ring-shaped sliding region. However, one of ordinary skill will recognize that these two-dimensional slider controls can include such a ring-shaped sliding region (or other sliding regions as well) in different embodiments.

Figure 3:
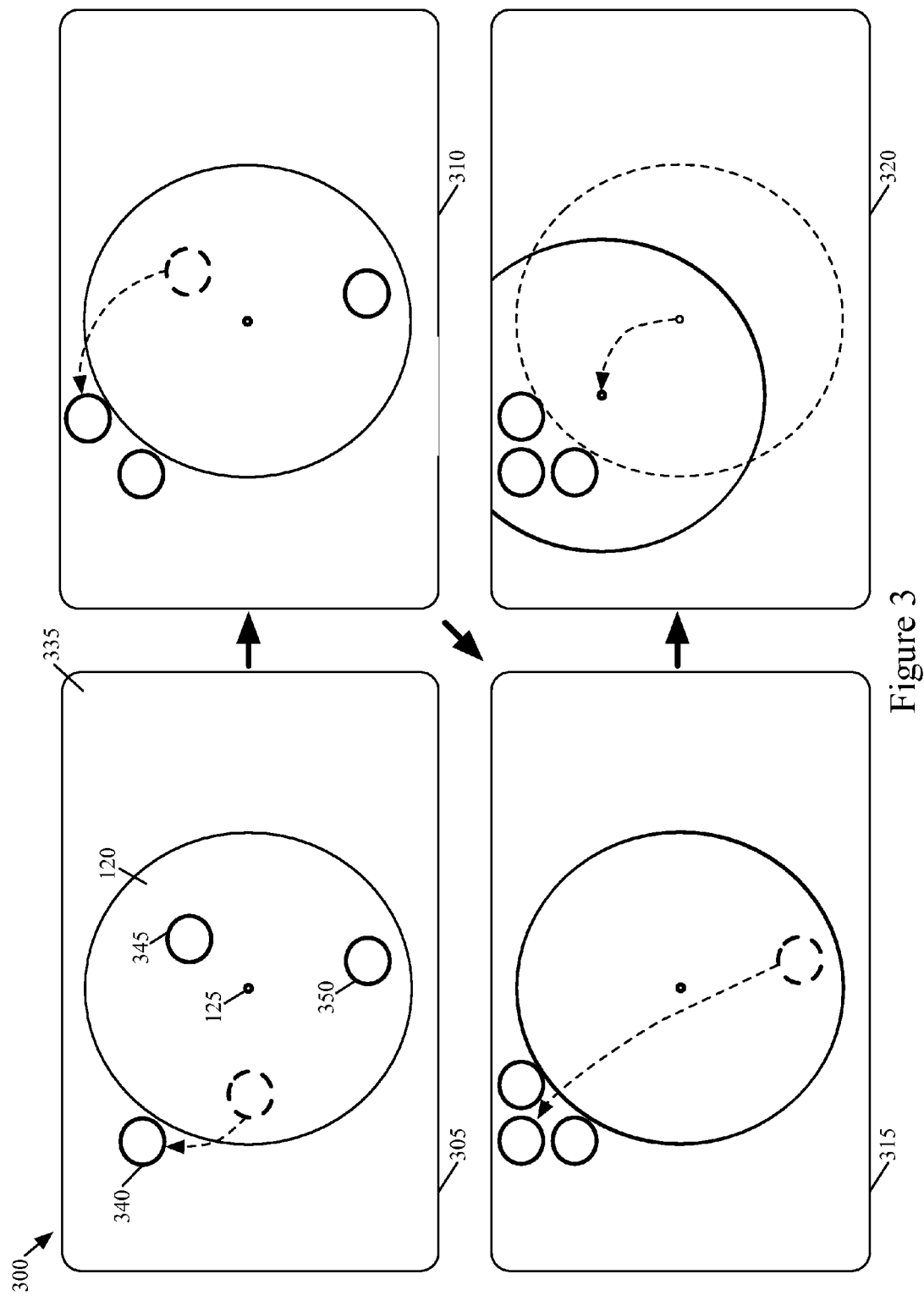
FIG. 3 conceptually illustrates another two-dimensional slider control of some embodiments.

FIG. 3 conceptually illustrates a two-dimensional slider control 300 that includes a background region 335. As shown, the two-dimensional slider control 300 includes the background region 335, a sliding region 120, slider shapes 340-350, and a center 125. The sliding region 120, slider shapes 340-350, and the center 125 are similar to the ones illustrated above in FIG. 1.

The background region 335 is an area in the two-dimensional slider control 300 within which slider shapes 340-350 can be positioned. In some embodiments, when a slider shape is positioned in the background region 335, the operation(s) associated with the slider shape is not functioning and the slider shape is referred to as disabled, inactive, off, etc. When the slider shape is positioned in the sliding region 120, the operation(s) associated with the slider shape is functioning and the slider shape is referred to as enabled, active, on, etc. Thus, instead of positioning a slider shape within the sliding region 120 that corresponds to an "off"

position or minimum value (e.g., the outer circle 230 of the sliding region 220), the user can place the slider shape in the background region 335 to reduce clutter or when the user does not wish to use the slider shape at this time. In addition, the background region 335 of some embodiments provides a region within which the sliding region can be movably positioned (instead of slider shapes) to control operations associated with slider shapes, as will be described in the following example.

FIG. 3 also illustrates the two-dimensional slider control 300 at four different stages 305-320. The stages 305-315 show slider shapes movably positioned within the background region 335 and the stage 320 illustrates an example of movably positioning the sliding region 120. At the first stage 305, the slider shape 340 is movably positioned (e.g., by performing a drag-and-drop operation) from within the sliding region 120 to the upper left corner of the background region 335, as indicated by an arrow. The previous position of the slider shape 340 is indicated by a dotted circle. In this stage, operation(s) associated with the slider shape 340 are disabled.

Similarly, the second and third stages 310 and 315 show the slider shapes 345 and 350 movably positioned (e.g., by performing drag-and-drop operations) from their respective position in the sliding region 120 to the upper left corner of the background region 335, as indicated by respective arrows. Accordingly, the operation(s) associated with the slider shapes 345 and 350 (and slider shape 340) are disabled at this stage. The third stage 350 illustrates the sliding region 320 movably positioned (e.g., by performing a drag-and-drop operation on the center 125) towards the upper left corner of the background region 335, as indicated by an arrow. The previous position of the sliding region 120 is demonstrated by a dotted circle. At this stage, the slider shapes 340-350 are active since they are positioned within the sliding region 120. Therefore, by movably positioning the sliding region 120, multiple slider shapes can be controlled and adjusted through a single action (i.e., the movable positioning of the slider region 325). As shown, portions of the sliding region 120 that would extend past the border of the two-dimensional slider control 300 are not displayed.

FIGS. 1 and 3 show a two-dimensional slider control with a fixed number (i.e., three) of slider shapes. Other embodiments of the two-dimensional slider control can include any static number of slider shapes. In some embodiments, the number of slider shapes is based on the number of operations a user is allowed to control. Furthermore, some embodiments only allow the slider shapes to be movably positioned within the sliding region of the two-dimensional slider control whereas other embodiments, such as that illustrated in FIG. 3, allow the slider shapes of the two-dimensional slider control to be movably positioned anywhere within the display area of the two-dimensional slider control (i.e., inside as well as outside of the sliding region).

For a two-dimensional slider control, different embodiments provide different starting configurations for the slider shapes. For example, some embodiments provide a starting configuration in which the slider shapes are "zeroed out." That is, the slider shapes are positioned within the sliding region such that the operations associated with the slider shapes are off (e.g., inactive, disabled, select a value of zero, select a minimum value, etc.). Using the sliding region 120 in FIG. 1 as an example, in some such embodiments, radial distance based slider shapes can be "zeroed out" by positioning the slider shapes along the outer edge of the sliding region 120. For angle based slider shapes, they are "zeroed out" by positioning the slider shapes to the right of the center 125 and along the axis 145 in some embodiments. One of ordinary skill will recognize that "zeroing out" the slider shapes depends on how values of a defined range of values are associated with positions within the sliding region and thus any number of different starting configurations are possible in order to "zero out" slider shapes. In addition, some embodiments "zero out" a slider shape by assigning a null value to the slider shape. Moreover, other embodiments provide other starting configurations for slider shapes. For instance, some embodiments of a two-dimensional slider control provide a starting configuration in which slider shapes are positioned at default positions/values. Some embodiments start the slider shapes outside of the sliding region.

Some embodiments of the two-dimensional slider control allow a dynamic number of slider shapes. That is, the number of slider shapes in a two-dimensional slider control can change at any given time. Specifically, such embodiments allow slider shapes to be added and deleted as well as movably positioned within the sliding region of the two-dimensional slider control.

Figure 4:
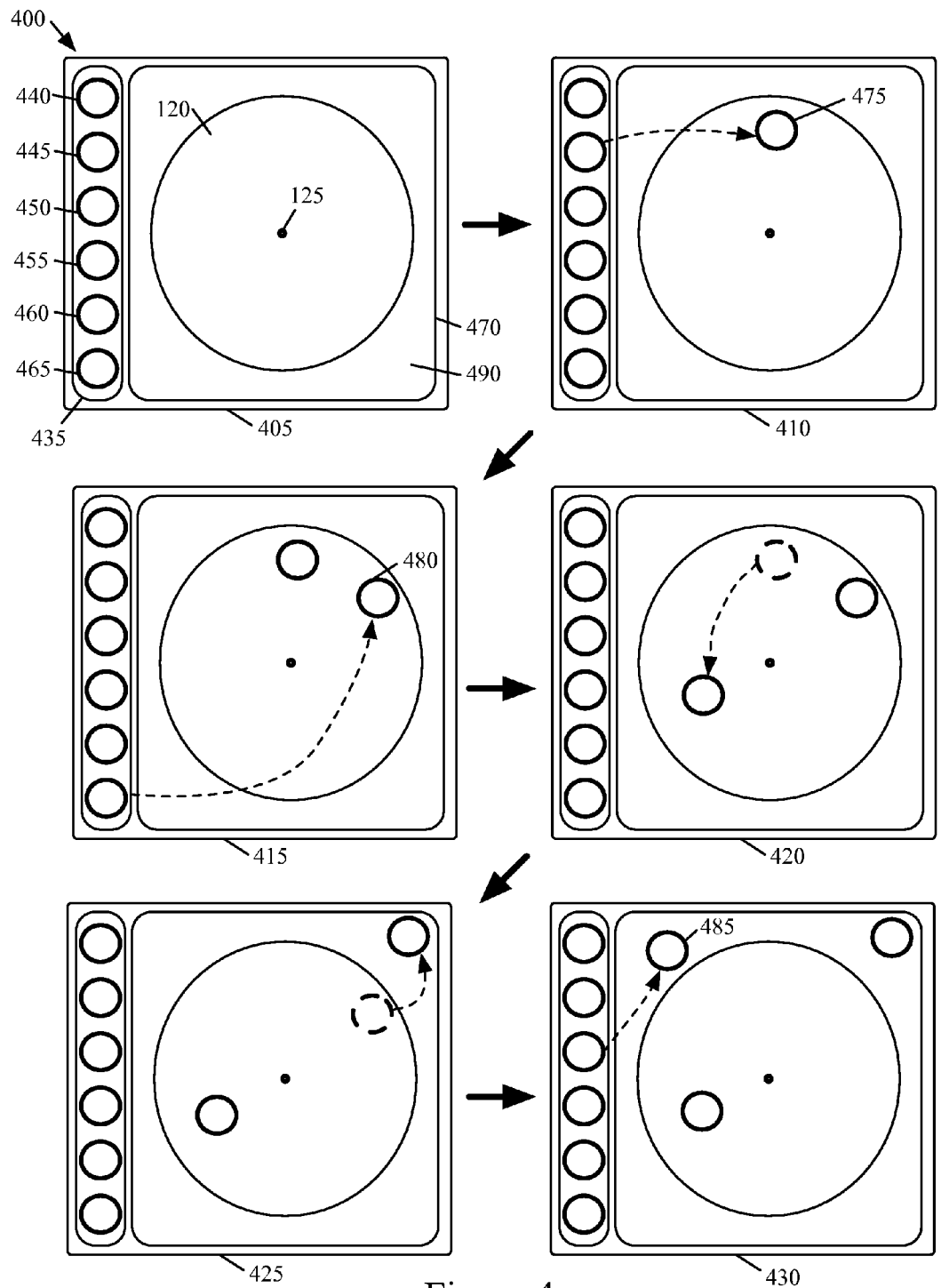
FIG. 4 conceptually illustrates another two-dimensional slider control of some embodiments.

FIG. 4 conceptually illustrates an example of a GUI 400 for such a two-dimensional slider control 470 of some embodiments. As shown, the GUI 400 includes the two-dimensional slider control 470 and a slider shape tool box 435. The two-dimensional slider control 470 is similar to the two-dimensional slider control 300 (i.e., it includes the sliding region 120 and the center 125) except the two-dimensional slider control 470 includes a background region 490. The background region 490 is similar to the background region 335 except the background region 490 has a square border instead of a rectangular border.

The slider shape tool box 435 includes slider shape generators 440-465. In some embodiments, a slider shape generator is a user selectable user interface (UI) item (e.g., a button, icon, thumbnail)) for adding a slider shape of a particular type to the two-dimensional slider control 470 when a command is invoked. For example, a slider shape generator of some embodiments adds a slider shape in the two-dimensional slider control 470 when the slider shape generator is selected and a command (e.g., by clicking, tapping, pressing a hotkey, keystroke, combination of keystrokes, etc.) is invoked.

FIG. 4 also illustrates one way of adding slider shapes using slider shape generators to the two-dimensional slider control 470 in terms of six different stages 405-430. As shown, the first stage 405 shows the GUI 400 without any slider shapes in the two-dimensional slider control 470.

The second stage 410 shows the GUI 400 after a slider shape 475 is added to the two-dimensional slider control 470. Specifically, this stage shows the addition of the slider shape 475 by generating it from the slider shape generator 445. In this example, the slider shape 475 is generated by selecting and dragging (e.g., by performing a drag-and-drop operation) the slider shape generator 445 into the sliding region 120 of the two-dimensional slider control 470, as indicated by an arrow.

In the third stage 415, another slider shape 480 is added to the two-dimensional slider control 470. This stage shows the slider shape 480 added to the two-dimensional slider control 470 by generating it from the slider shape generator 465. Similar to the slider shape 475 in the second stage 410, the slider shape 475 is generated by selecting and dragging (e.g., by performing a drag-and-drop operation) the slider shape generator 465 into the sliding region 120 of the two-dimensional slider control 470, as indicated by an arrow.

The fourth stage 420 of the GUI 400 shows the movement of the slider shape 475 within the two-dimensional slider control 470. As shown, the slider shape 475 is movably positioned (e.g., by performing a drag-and-drop operation) down and to the left within the sliding region 120. This stage illustrates that the slider shape 475 can be movably positioned within the sliding region 120 similar to the movement of the slider shapes 130 and 140 described above by reference to FIG. 1.

At the fifth stage 425, the GUI 400 illustrates the movement of the slider shape 480 within the two-dimensional slider control 470. However, in this stage, the slider shape 480 is movably positioned (e.g., by performing a drag-and-drop operation) up and to the right from within the sliding region 120 to the background region 490. Thus, the fifth stage 425 shows that the slider shape 480 can be movably positioned in the background region 490 similar to the movement of the slider shapes 340-350 described above by reference to FIG. 3.

The sixth stage 430 illustrates the GUI 400 after another slider shape 485 is added to the two-dimensional slider control 470. This stage shows the addition of the slider shape 485 by generating it from the slider shape generator 450. The slider shape 485 is generating by selecting and dragging (e.g., by performing a drag-and-drop operation) the slider shape generator 450 except it is dragged into the background region 490 of the two-dimensional slider control 470. As such, the stages of FIG. 4 show that slider shapes can be added to the background region 490 as well as the sliding region 120 of the two-dimensional slider control 470.

As shown in FIG. 4, the slider shape generators 440-465 are included in the slider shape tool box 435 and arranged in a vertical column. Different embodiments provide different arrangements of slider shape generators and different shapes for a slider shape tool box. For instance, the slider shape generators can be arranged in a horizontal row in a horizontal slider shape tool box that is locate above or below the two-dimensional slider control in some embodiments.

Furthermore, FIG. 4 shows the slider shape tool box 435 as separate from the two-dimensional slider control 470. In some embodiments, the slider shape generators can be part of the two-dimensional slider control (e.g., located along a side of the background region) as conceptually illustrated in FIG. 5. This figure shows a two-dimensional slider control 500 of some embodiments that includes the sliding region 120, the center 125, a background region 520, and slider shape generators 525-545. The background region 520 is similar to the background region 335 except the background region 520 is a different rectangular shape. As shown, the slider shape generators 525-545 are positioned within the background region 520 and along the top of the two-dimensional slider control 500.

Figure 5:
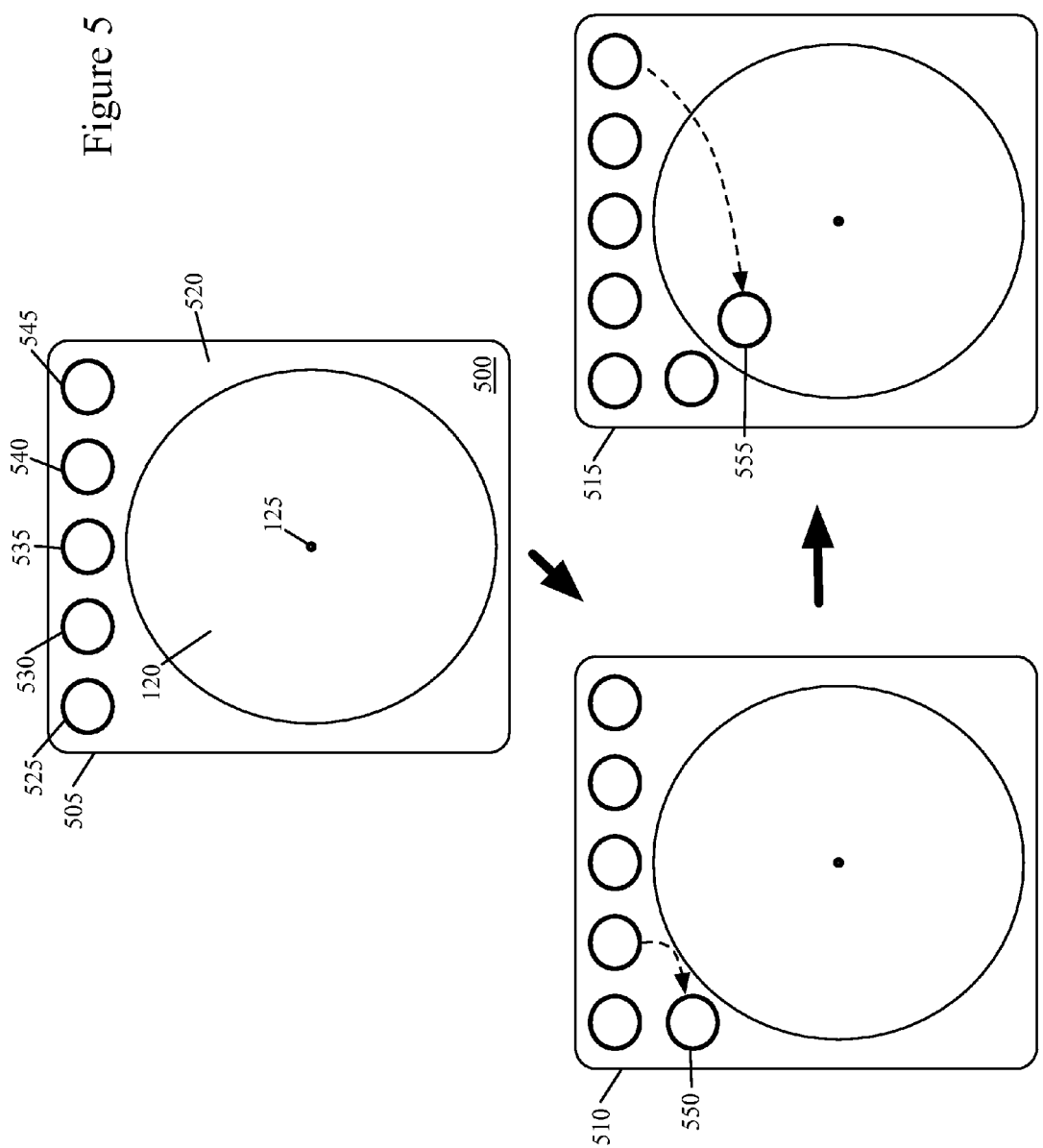
FIG. 5 conceptually illustrates another two-dimensional slider control of some embodiments.

FIG. 5 also illustrates the two-dimensional slider control 500 at three different stages 505-515. Similar to the first stage 405, the first stage 505 shows the two-dimensional slider control 500 without any slider shapes in it.

The second stage 510 illustrates the addition of slider shape 550 to the two-dimensional slider control 500. As shown, the slider shape 550 is added to the two-dimensional slider control 500 by generating it from the slider shape generator 530 in a similar fashion as the generation of the slider shapes 475-485. In this stage, the slider shape generator 545 is selected and dragged (e.g., by performing a drag-and-drop operation) into the background region 520, as indicated by an arrow.

At the third stage 515, another slider shape 555 is added to the two-dimensional slider control 500 similar to the addition of the slider shape 550 in the first second stage 510. In this stage, the slider shape 555 is selected and dragged (e.g., by performing a drag-and-drop operation) into the sliding region 120, as shown by an arrow, instead of into the background region 520.

While FIGS. 4 and 5 illustrate two different configurations of slider shape generators for adding slider shape to a two-dimensional slider control of some embodiments, different embodiments provide different ways of adding slider shapes to the two-dimensional slider control. For example, rather than using a slider shape generator to generate slider shapes, some embodiments add slider shapes to a two-dimensional slider control using a keystroke, a combination of keystrokes, a hotkey, an option selected from a pull-down or pop-up menu, or any other appropriate method. In some such embodiments, slider shape generators are not selected or even displayed.

Figure 6:
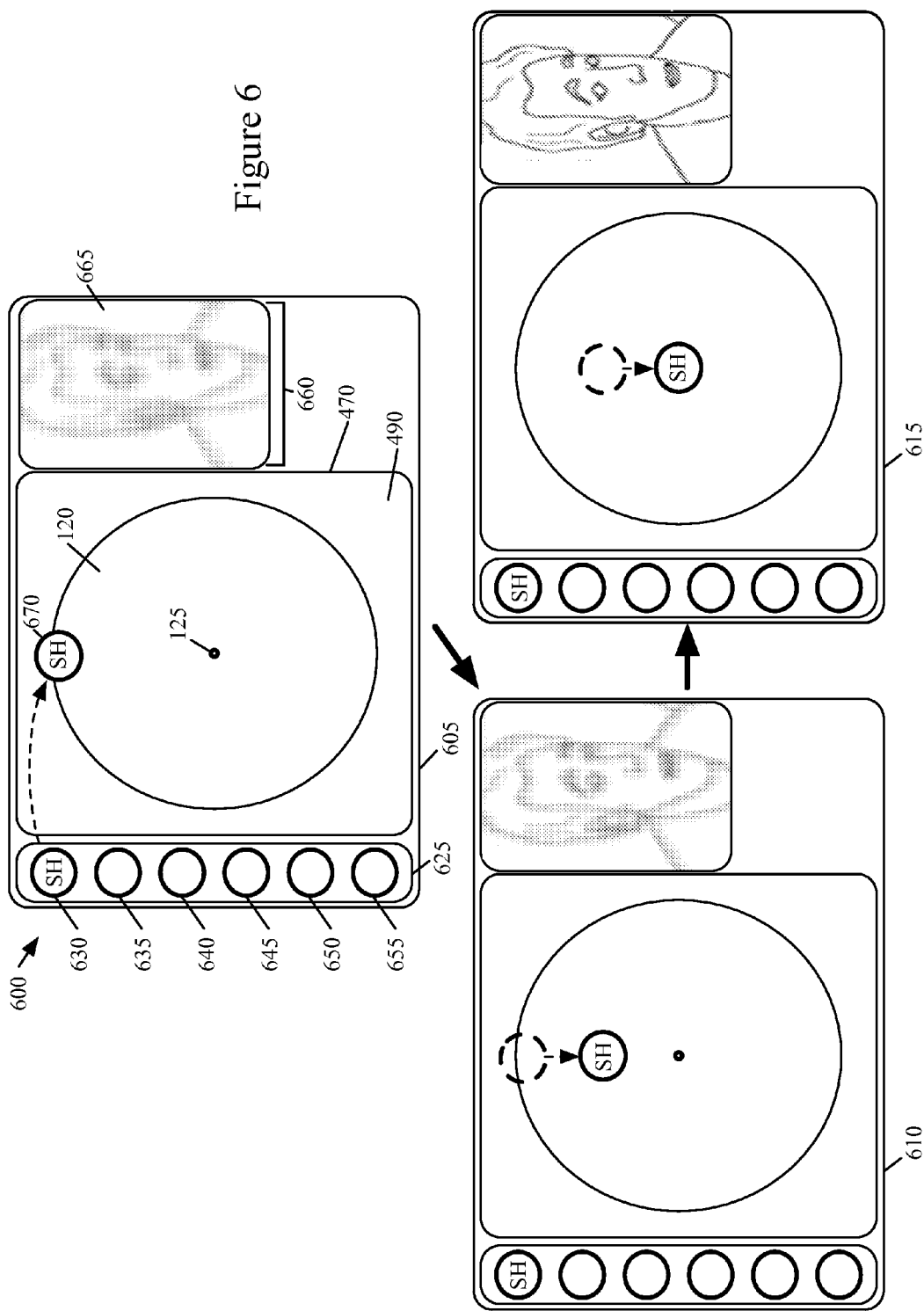
FIG. 6 conceptually illustrates a GUI of an image processing application that includes a two-dimensional slider control of some embodiments.

FIG. 6 conceptually illustrates a GUI 600 that includes a two-dimensional slider control 470 of some embodiments for performing various image processing operations. Specifically, this figure illustrates the GUI 600 at three different stages 605-615 of an image processing operation. As shown, the GUI 600 includes a slider shape tool box 625, the two-dimensional slider control 470, and a viewing area 660. The slider shape tool box 625 is similar the slider shape tool box 435 except the slider shape generators 630-655 generate slider shapes for performing image processing operations. The viewing area 660 is for displaying an image 665 being edited and effects of image processing operations that are applied to the image 665.

The first stage 605 shows the GUI 600 after a slider shape 670 is added to the two-dimensional slider control 470 in a similar manner as the addition of the slider shape 475 to the two-dimensional slider control 470. As mentioned, the slider shape generators 630-655 generate slider shapes for performing image processing operations. In this example, the slider shape generator 630 generates slider shapes for applying a sharpness operation (e.g., unsharp mask), as indicated by its "SH" label, to the image 665 based on a radial distance from the center 125. Specifically, the sharpness operation applied to the image 665 is increased as the slider shape 670 is movably positioned closer to the center 125 of the sliding region 120. As shown, the slider shape 670 is positioned near the top and along the edge of the sliding region 120, which applies a small amount of the sharpness operation to the image 665. The image 665 displayed in the viewing area 660 is a blurry image of the person The second stage 610 illustrates the GUI 600 after the slider shape 670 is movably positioned within the sliding region 120. In particular, this stage shows the slider shape 670 movably positioned down towards the center 125. This position is closer to the center 125 of the sliding region 120 than its previous position in the first stage 605, which increases the amount of the sharpness operation applied to the image 665. As shown in the viewing area 660, the image 665 of the person is sharper than in the previous stage due to the increased sharpness operation applied to the image 665.

In the third stage 615, the slider shape 670 is again movably positioned within the sliding region 120. Specifically, the slider shape 670 is movably positioned further down towards the center 125 of the sliding region 120. At this position of the slider shape 670 within the sliding region 120, the amount of the sharpness operation applied to the image 665 is further increased. Thus, the image 665 displayed in the viewing area 660 is a sharper image of the person than in the previous stages.

While FIG. 6 shows various stages of a sharpness operation, the slider shape generator 630 (and other slider shape generators) can be defined to generate slider shapes that perform other image processing operations (e.g., saturation, contrast, brightness, color balance, noise reduction, etc., on the image 665 in different embodiments. Moreover, the slider shape 670 applies the image processing operation based on a radial distance position variable. In other embodiments, the image processing operation may be based on other position variables (e.g., angle, x-axis distance, y-axis distance).

Figure 7:
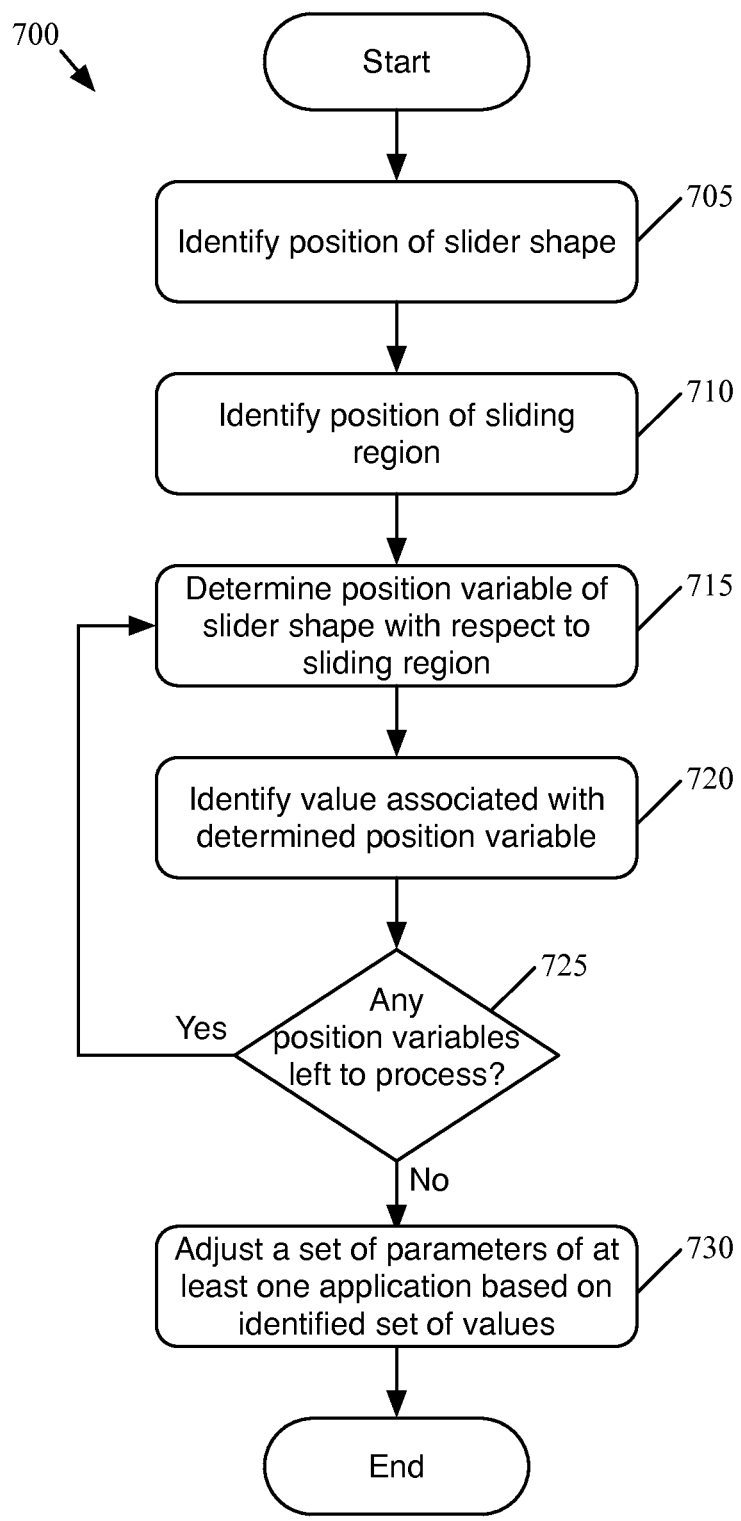
FIG. 7 conceptually illustrates a process for controlling an operation of an application by using a two-dimensional slider control of some embodiments.

FIG. 7 conceptually illustrates a process 700 for controlling an operation of an application by using a two-dimensional slider control of some embodiments. In some embodiments, the process 700 is performed while a slider shape or a sliding region is movably positioned within the two-dimensional slider control. For example, in some such embodiments, the process 700 is constantly performed (i.e., performed in real-time) while the slider shape or the sliding region is being movably positioned within the two-dimensional slider control. In other such embodiments, the process 700 is performed every time the slider shape or sliding region moves a defined distance (e.g., 10 pixels, 5 millimeters, etc.) while it is being movably positioned in the two-dimensional slider control. In yet other embodiments, the process 700 is performed when the movable positioning of the slider shape or the sliding region is completed (e.g., the drag-and-drop operation is completed). Moreover, the process 700 of some embodiments is performed by an application that provides the two-dimensional slider control.

For purposes of explanation, the process 700 will be described based on the embodiments that perform the process 700 when the movably positioning of a slider shape or sliding region is completed. The process 700 begins by identifying (at 705) a position of a slider shape within a sliding region. Referring to FIG. 3 as an example, when the slider shape 340 is moved to its position illustrated in the first stage 305, the process 700 identifies that illustrated position of the slider shape 340. Next, the process 700 identifies (at 710) the position of the sliding region. In some embodiments, and in this example, the center 125 of the sliding region 120 represents the position of the sliding region 120. In other embodiments, a different point within the sliding region 120 represents the position of the sliding region 120. Continuing with the example of FIG. 3, the process 700 identifies the position of the center 125 illustrated in the first stage 305 as the position of the sliding region 120. Moreover, when the sliding region 120 is movably positioned, for example, in the fourth stage 320 of FIG. 3, the process 700 identifies the position of sliding region 120 as the position of the center 125 as shown in the fourth stage 315.

After identifying the positions, the process 700 then determines (at 715) a position variable (e.g., radial distance, angle, x-axis distance, y-axis distance) with respect to the sliding region. Referring again to the slider shape 340 of FIG. 3 and using radial distance as an example position variable, at 715, the process 700 determines the distance between the position of the slider shape 340 and the center 125 of the sliding region 120. Next, the process 700 identifies (at 720) a value in a range of values defined for the determined position variable. Continuing with the example of the slider shape 340, the process 700 identifies a value from a range of values for the radial distance position variable. For example, if the range of values for the radial distance position variable is defined as a continuous range of integers from 0 to 255, the process 700 identifies an integer value in that range based on the determined radial distance of the slider shape 340.

After identifying a value for the determined position variable, the process 700 determines (at 725) whether there are any position variables left to process. If the process 700 determines that there are position variables left to process, the process 700 returns to operation 715 to process any remaining position variables. Otherwise, the process 700 proceeds to operation 730. For slider shapes that are defined to select a value from a range of values based on one position variable, the process 700 ends after the one position variable has been processed. However, for slider shapes that are defined to select multiple values from multiple ranges of values based on multiple position variables, the process 700 performs operations 715 and 720 for each of the position variables.

After all the position variables are processed, the process 700 adjusts (at 730) a set of parameters of at least one application based on the identified set of values. As mentioned above, a user can movably position a slider shape in a two-dimensional slider control of some embodiments to control an operation of an application (e.g., controlling a sharpness operation in an image processing application as illustrated in FIG. 6). One way of controlling an operation of an application is to adjust a set of parameters for the operation as performed by the process 700 at 730. In some embodiments, a different slider shape is associated with each of the parameters in the set of parameters while in other embodiments a slider shape can be associated with one or more parameters in the set of parameters. In addition, the application of some embodiments is a standalone application that runs on a computing device while the application of other embodiments is a component that is part of another application. The application can be an application that is part of an operating system of a computing device in some embodiments.

Although the process 700 described above is described in a particular order, different embodiments may perform the process 700 in a different order. For instance, some embodiments of the process 700 adjust (at 730) a set of parameters of an application before determining (at 725) whether any position variables are left to process. Instead of identifying the position of the slider shape before the sliding region, some embodiments identify the position of the sliding region before identifying the position of the slider shape.

Many embodiments of a two-dimensional slider control described above and below define slider shapes such that positioning them along or close to the outer edge of a sliding region selects a minimum value from a range of values, applies a small or no amount of an operation to an image being edited, etc., and positioning the slider shapes in or close to the center of the sliding region selects a maximum value from a range of values, applies a large amount of an operation to an image being edited, etc. In different embodiments, however, the slider shapes may be defined differently. For instance, the slider shapes of some embodiments may be defined to select a minimum value from a range of values, apply a small or no amount of an operation to an image being edited, etc., when they are positioned in or closer to the center of the sliding region, and to select a maximum value from a range of values, apply a large amount of an operation to an image being edited, etc., when they are positioned on or close to the outer edge of the sliding region.

Several more detailed embodiments are described below. Section I provides a description of example color correction operations of a media editing application of some embodiments. Section II then describes several different types of slider shapes and operations of some embodiments. Next, Section III describes slider shape grouping operations of some embodiments. Section IV then describes sliding region operations of some embodiments. Section V then describes an example tablet implementation of a two-dimensional slider control of some embodiments. Next, Section VI describes the software architecture of an application that employs the two-dimensional slider control of some embodiments. Lastly, Section VII describes a computer system that implements some embodiments of the invention.

I. Exemplary Color Correction Operations

As described above by reference to FIG. 6, some embodiments of the two-dimensional slider control are for performing image processing operations. In some embodiments, a similar two-dimensional slider control can be used to perform color correction operations in a media editing application. Examples of such media editing application include Apple Final Cut Pro®, Apple Aperture®, Apple iPhoto®, Adobe Photoshop®, Adobe Lightroom®, etc.

The following section will describe numerous color correction operations that are controlled by using the two-dimensional slider control of some such embodiments. In particular, several color correction operations based on a single position variable are described followed by a description of several color correction operations based on two position variables. One of ordinary skill will recognize that these are just a few examples of color correction operations and that other color correction operations could be performed using this two-dimensional slider control.

A. Single Variable Operations

Figure 8:
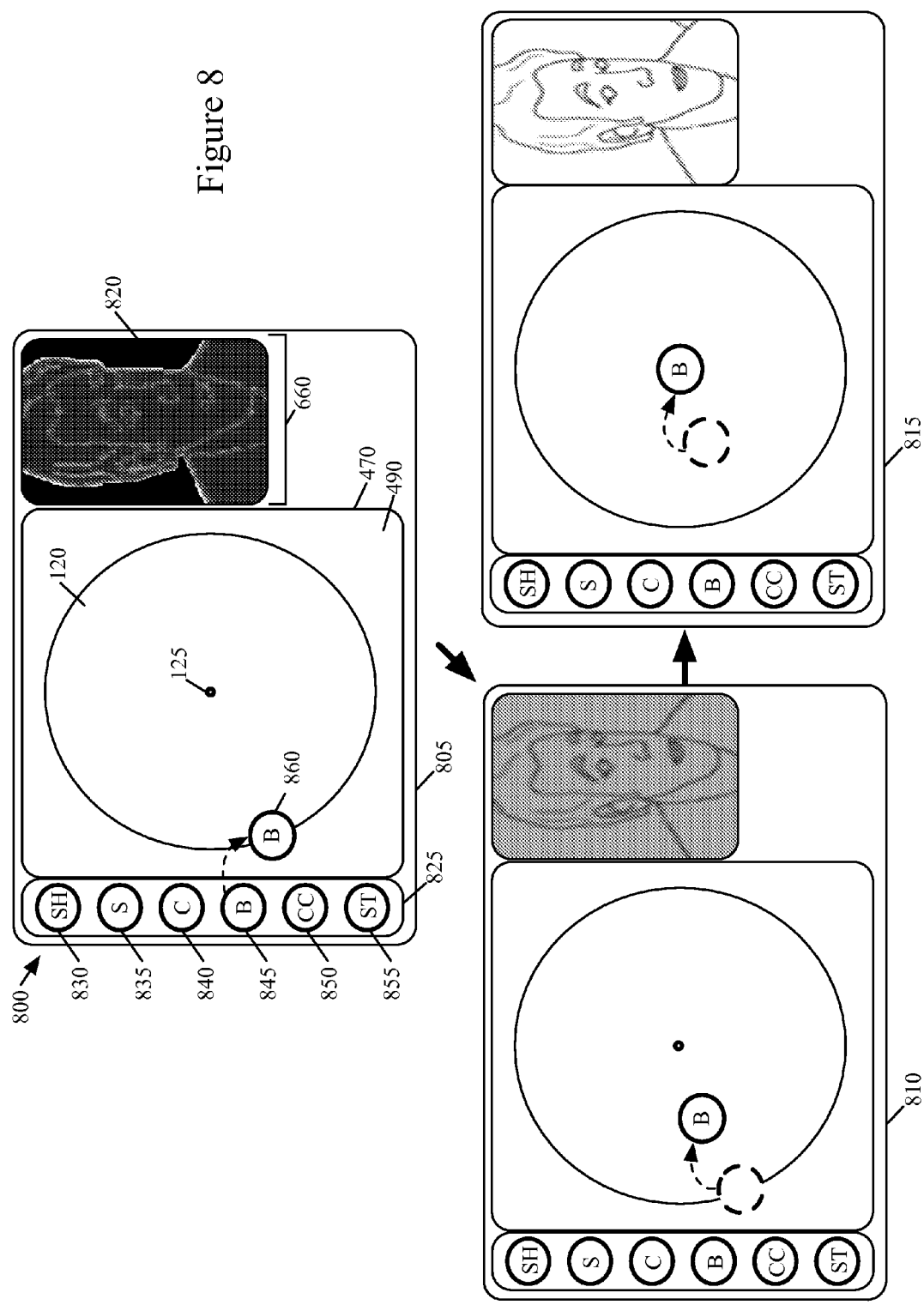
FIG. 8 conceptually illustrates another GUI of a media editing application that includes a two-dimensional slider control of some embodiments.

FIG. 8 conceptually illustrates a color correction operation using a GUI 800 of a media editing application of some embodiments that includes the two-dimensional slider control 470. Specifically, this figure illustrates the GUI 800 at three different stages 805-815 that shows a brightness operation performed using the two-dimensional slider control 470. The GUI 800 is similar to the GUI 600 except the GUI 800 includes a slider shape tool box 825 instead of the slider shape box 625. As shown, the slider shape tool box 825 includes slider shape generators 830-855 that are for generating slider shapes for performing color correction operations. The viewing area 660 is for displaying an image 820 that is being edited and for displaying color corrections that are applied to the image 820. In some embodiments, the image 820 is a still image while in other embodiments the image 820 is part of a video (i.e., a sequence of images or frames).

As mentioned, the slider shape generators 830-855 are for generating slider shapes for performing color correction operations. Specifically, the slider shape generator 830 generates slider shapes for applying a sharpness operation, as indicated by its "SH" label, the slider shape generator 835 generates slider shapes for applying a saturation operation, as indicated by its "S" label, the slider shape generator 840 generates slider shapes for applying a contrast operation, as indicated by its "C" label, the slider shape generator 845 generates slider shapes for applying a brightness operation, as indicated by its "H" label, the slider shape generator 850 generates slider shapes for applying a color cast operation, as indicated by its "CC" label, and the slider shape generator 855 generates slider shapes for applying a skin tone saturation operation, as indicated by its "ST" label. While the slider shape tool box 825 shows slider shape generators that each generate slider shapes that apply a particular color correction operation, other embodiments may define the slider shape generators to generate slider shapes that apply different color correction operations.

An example brightness operations will now be described by reference to the state of the GUI 800 during the first through third stages 805-815 that are illustrated in FIG. 8. In some embodiments, a brightness operation increases the luminance values of the pixels in an image a particular amount to produce a brighter image. Some such embodiments increase the luminance values by multiplying them by a particular value (e.g., 1.1, 2.0).

In this example, the slider shapes 860 controls its brightness operation based on a radial distance position variable. Movably positioning a slider shape towards the center 125 of the sliding region 120 increases the amount of the operation associated with the slider shape 860 applied to the image 820 and vice versa.

The first stage 805 shows a slider shape 860 added to the two-dimensional slider control 470 from the slider shape generator 845 in a similar manner as the addition of the slider shape 475. In this stage, the slider shape 860 is positioned along the lower left edge of the sliding region 120 and, thus, little to no amount of the brightness operation is applied to the image 820. As shown, the image 820 displayed in the viewing area 660 is a dark (i.e., underexposed) image of a person.

In the second stage 810, the brightness operation applied to the image 820 is adjusted. This stage shows the slider shape 860 movably positioned (e.g., by performing a drag-and-drop operation) to the right, slightly up, and towards the center 125 of the sliding region 120. The movement of the slider shape 860 causes an increase in the amount of the brightness operation applied to the image 820, which shows the person a little lighter than in the first stage 805.

The third stage 815 shows an adjustment to the brightness operation that is applied to the image 820. As shown, the slider shape 860 is movably positioned (e.g., by performing a drag-and-drop operation) again to the right, slightly up, and towards the center 125 of the sliding region 120, as indicated by an arrow. The position of the slider shape 860 at this stage applies a large amount of the brightness operation to the image 820 because the slider shape 860 is very close to the center 125 of the sliding region 120. Thus, the image 820 of the person displayed in the viewing area 660 is lighter than in the second stage 810 and no longer dark.

Figure 9:
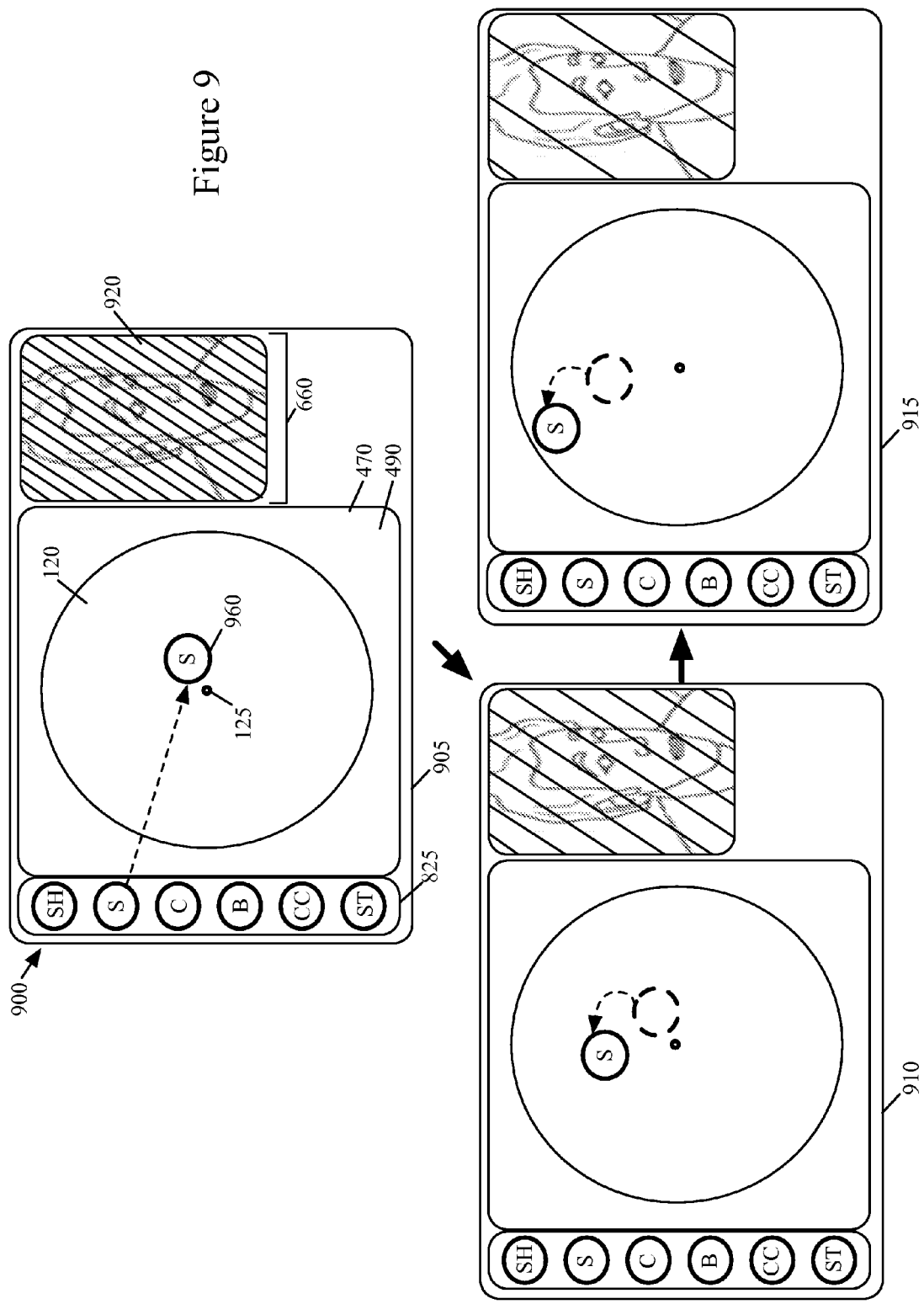
FIG. 9 conceptually illustrates a color correction operation using the GUI of FIG. 8 according to some embodiments of the invention.

FIG. 9 conceptually illustrates another color correction operation using a GUI 900 of a media editing application of some embodiments that includes the two-dimensional slider control 470. In particular, FIG. 9 illustrates the GUI 900 at three different stages 905-915 of a saturation operation using the two-dimensional slider control 470. The GUI 900 is similar to the GUI 800 illustrated in FIG. 8 except the viewing area 660 displays a different image 920 of a person. In addition, diagonal lines running from the lower left corner to the upper right corner of the viewing area 660 are displayed over the image 920 to illustrate the effects of the saturation operation applied to the image 920. In some embodiments, the diagonal lines are not actually displayed. The number of lines displayed over the image 920 represents the amount of the saturation operation applied to the image 920 with a large number of lines representing a large amount of the saturation operation and vice versa.

In some embodiments, a saturation operation adjusts the amount of color present in an image (but does change the hue or luminance of the image in doing so). As such, in some such embodiments, increasing the saturation of an image increases the purity of any chroma that is present in the image and concentrates them in the primary and/or secondary colors (e.g., red, orange, yellow, green, cyan, blue, magenta). On the other hand, decreasing the saturation of the image decreases the purity of any chroma that is present in the image (i.e., turns the image towards black and white).

The first stage 905 of the GUI 900 is similar to the first stage 805 except a slider shape 960 is added to the two-dimensional slider control 470 in a similar manner as the addition of the slider shape 475. As shown, the first stage 905 shows the slider shape 960 positioned close to the right side of the center 125 of the sliding region 120. Thus, a relatively large amount of diagonal lines is displayed over the image 920.

The second stage 910 illustrates an adjustment to the saturation operation that is applied to the image 920. In this stage, the slider shape 960 is movably positioned (e.g., by performing a drag-and-drop operation) to the left, up, and away from the center 125 of the sliding region 120. The resulting decrease in the amount of the saturation operation applied to the image 920 is shown by displaying a fewer number of diagonal lines over the image 920 than in the first stage 905.

At the third stage 915, the saturation operation that is applied to the image 920 is again adjusted. In this stage, the slider shape 960 is movably positioned (e.g., by performing a drag-and-drop operation) further to the left, up, and away from the center 125 of the sliding region 120. As shown, the number of diagonal lines displayed over the image 920 is fewer than that shown in the previous stages due to the decrease in the saturation operation applied to the image 920.

Figure 10:
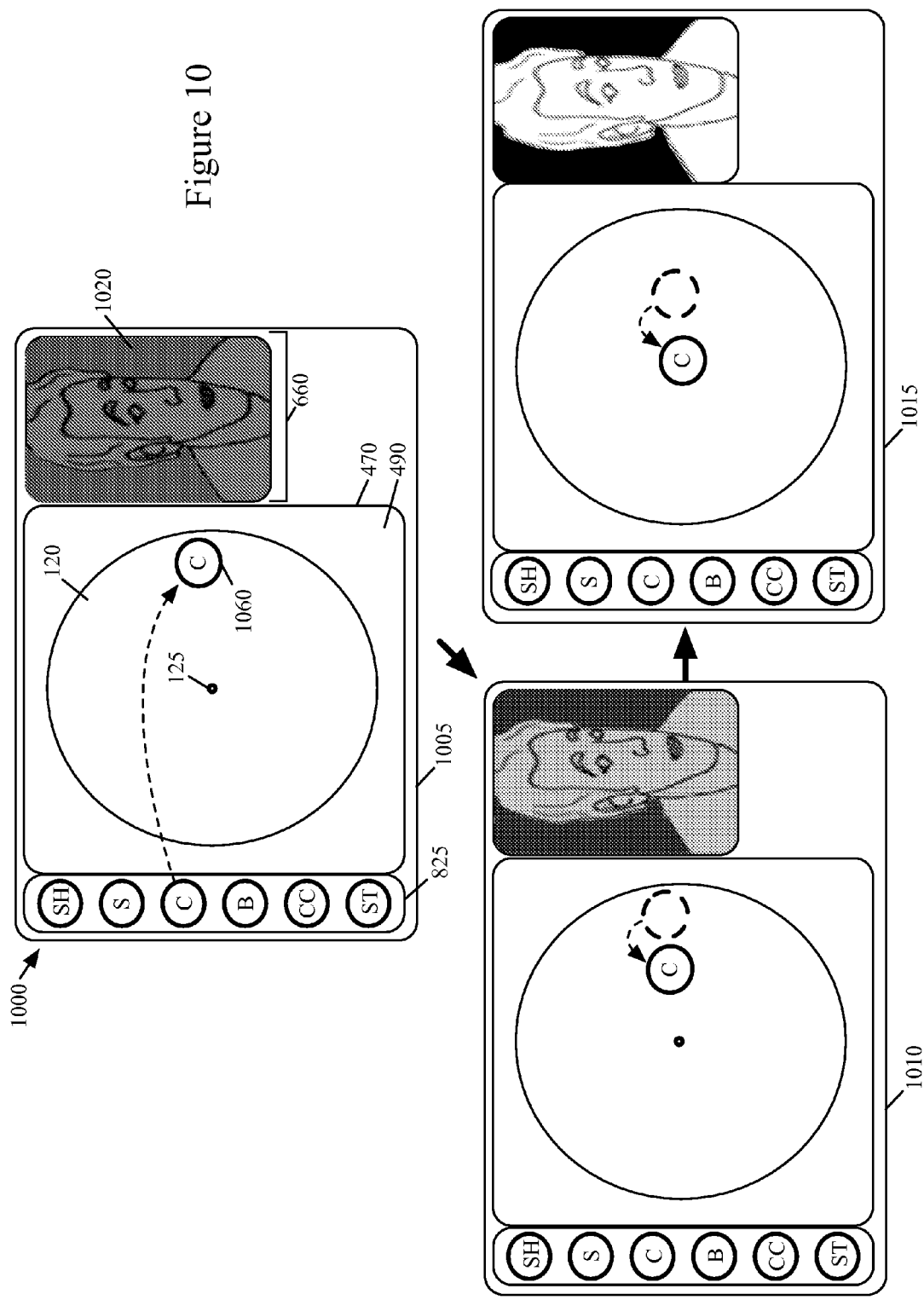
FIG. 10 conceptually illustrates another color correction operation using the GUI of FIG. 8 according to some embodiments of the invention.

FIG. 10 conceptually illustrates another color correction operation using a GUI 1000 of a media editing application of some embodiments that includes the two-dimensional slider control 470. This figure shows the GUI 1000 at three different stages 1005-1015 of a contrast operation using the two-dimensional slider control 470. The GUI 1000 is similar to the GUI 800 illustrated in FIG. 8 except the viewing area 660 displays a different image 1020 of a person.

A contrast operation of some embodiments adjusts the luminance values of pixels in an image towards or away from the black and white ends of the image. In some such embodiments, a contrast operation adjusts dark grey pixels to be darker and light grey pixels to be brighter when the contrast of an image is increased and adjusts the dark pixels and the light pixels towards medium grey when the contrast of an image is decreased.

The first stage 1005 of the GUI 1000 is similar to the first stage 805 except a slider shape 1060 is added to the two-dimensional slider control 470 in a similar manner as the addition of the slider shape 475. In this stage, the slider shape 1060 is positioned on the right edge of the sliding region 120 and is relatively far from the center 125 of the sliding region 120. This means a small amount of the contrast operation is applied to the image 1020, which is shown by the background turning slightly darker grey and the person turning slightly lighter grey.

In the second stage 1010, an adjustment is made to the contrast operation that is applied to the image 1020. As shown, the slider shape 1060 is movably positioned (e.g., by performing a drag-and-drop operation) to the left and towards the center 125 of the sliding region 120. The increase in the contrast operation is shown by the display of an increase in the darkness of the grey background and an increase in the lightness of the person in the image 1020 displayed in the viewing area 660.

The third stage 1015 illustrates another adjustment to the contrast operation that is applied to the image 1020. In this stage, the slider shape 870 is movably positioned (e.g., by performing a drag-and-drop operation) to the left and towards the center 125 of the sliding region 120. As such, the image 1020 displayed in the viewing area 660 shows the background very dark and the person very light to illustrate the increase of the contrast operation that is applied to the image 1020.

Figure 11:
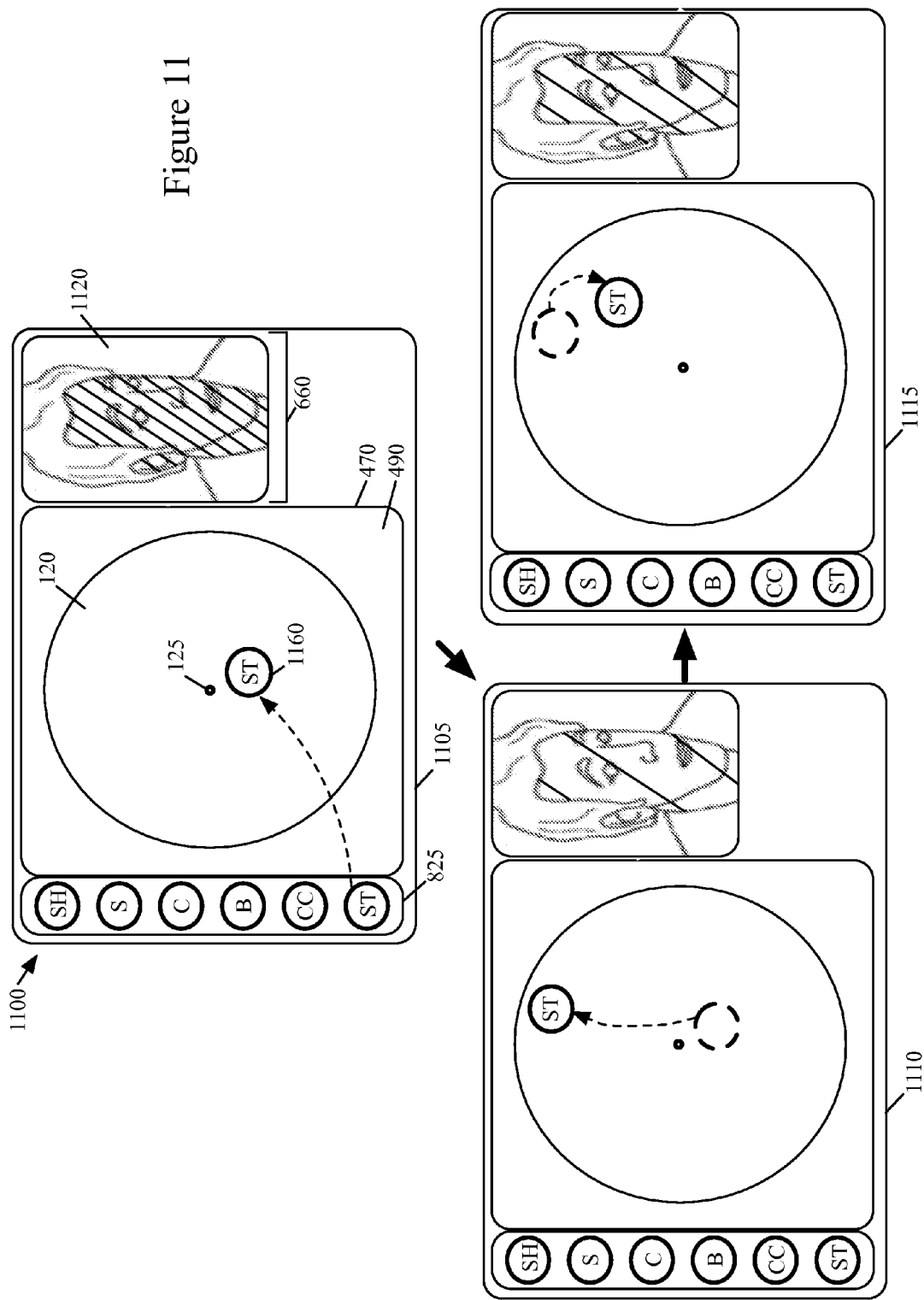
FIG. 11 conceptually illustrates another color correction operation using the GUI of FIG. 8 according to some embodiments of the invention.

FIG. 11 conceptually illustrates another color correction operation using a GUI 1100 of a media editing application of some embodiments that includes the two-dimensional slider control 470. Specifically, this figure illustrates the GUI 1100 at three different stages 1105-1115 of a skin tone saturation operation using the two-dimensional slider control 470. The GUI 1100 is similar to the GUI 800 illustrated in FIG. 8 except the viewing area 660 displays a different image 1120 of a person. Similar to FIG. 9, diagonal lines running from the lower left corner to the upper right corner of the viewing area 660 are displayed over the image 1120, but only in the areas of the image 1120 that are identified as skin in order to illustrate the effects of the skin tone saturation operation. The number of diagonal lines displayed over the image 1120 represents the amount of the skin tone saturation operation applied to the image 1120. In particular, a large number of diagonal lines represents a large amount of the skin tone saturation operation and vice versa.

In some embodiments, a skin tone saturation operation is a color correction operation for applying a saturation operation to only the areas of an image that are identified as skin tones as further described in detail in U.S. patent application Ser. No. 12/029,438, filed Feb. 11, 2008, entitled "Adjusting Color Attribute of an Image in a Non-Uniform Way," now issued as U.S. Pat. No. 8,638,338, which is herein incorporated by reference.

The first stage 1105 of the GUI 800 is similar to the first stage 805 except a slider shape 1160 is added to the two-dimensional slider control 470 in a similar manner as the addition of the slider shape 475. In this stage, the slider shape 1160 is positioned very close to the center 125 of the sliding region 120. As such, a relatively large number of diagonal lines are displayed on the face and neck (i.e., the skin) of the person in the image 1120 to show the skin tone saturation operation applied to the image 1120.

At the second stage 1110, an adjustment is made to the skin tone saturation operation that is applied to the image 1120. The slider shape 1160 is movably positioned (e.g., by performing a drag-and-drop operation) up and away from the center 125 of the sliding region 120. The decrease of the skin tone saturation operation is indicated by displaying fewer diagonal lines over the face and neck of the person in the image 1120 that is displayed in the viewing area 660.

The third stage 1115 shows another adjustment to the skin tone saturation operation that is applied to the image 1120. In this stage, the slider shape 1160 is movably positioned (e.g., by performing a drag-and-drop operation) down and towards the center 125 of the sliding region 120. At this stage, the position of the slider shape 1160 in the sliding region 120 increases the amount of the skin tone saturation operation applied to the image 1120, but this amount is less than the amount applied to the image 1120 in the first stage 1105. Thus, the number of diagonal lines displayed on the face and neck of the person in the image 1120 is more than the number of diagonal lines displayed over the image 1120 at the second stage 1110 but less than that displayed at first stage 1105.

For some embodiments of the invention, the two-dimensional slider control provides static color slider shapes for applying color cast operations to an image being edited. In some embodiments, a static color slider shape has a particular color associated with the static color slider shape. These static color slider shapes can be movably positioned towards and away from the center of a sliding region in order to control an amount of color associated with the static color slider shape to apply to an image being edited (i.e., the color cast operation is based on a radial distance position variable).

Figure 12:
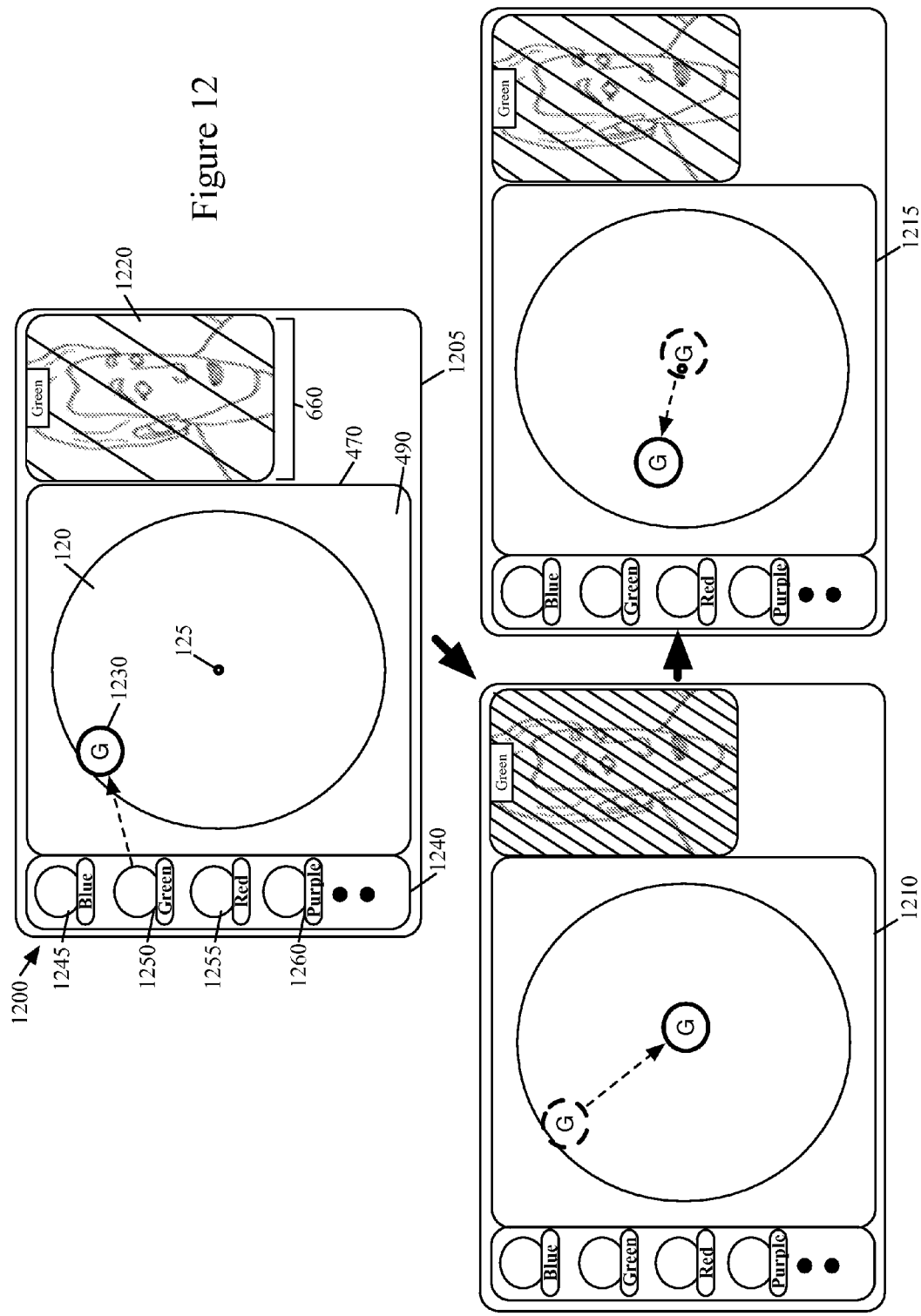
FIG. 12 conceptually illustrates another color correction operation using a GUI of a media editing application that includes a two-dimensional slider control of some embodiments.

FIG. 12 conceptually illustrates another color correction operation using a GUI of a media editing application that includes a two-dimensional slider control of some embodiments. This figures illustrates the GUI 1200 at three different stages 1205-1215 of a color cast operation using a static color cast slider 1230 of some embodiments. The GUI 1200 is similar to the GUI 800 except the GUI 1200 includes a slider shape tool box 1240 instead of the slider shape tool box 825 and the viewing area 660 displays a different image 1220.

The slider shape tool box 1240 includes slider shape generators 1245-1260. Each of the slider shape generators 1245-1260 generates slider shapes for applying a color cast operation associated with a particular color. For example, the slider shape generator 1245 is for generating slider shapes (in a similar manner as described above by reference to FIG. 4) that apply a blue color cast operation on an image being edited. Similarly, the slider shape generator 1250 generates slider shapes for applying a green color cast operation, the slider shape generator 1255 generates slider shapes for applying a red color cast operation, and the slider shape generator 1260 generates slider shapes for applying a purple color cast operation. In other embodiments, different and/or additional slider shape generators can be included in the slider shape tool box 1240.

For FIG. 12, diagonal lines running from the lower left corner to the upper right corner of the viewing area 660 as well as a label indicating a color are displayed over the image 1220 to illustrate the effects of the color cast operation applied to the image 1220. In some embodiments, the diagonal lines are not actually displayed. The number of lines displayed over the image 1220 represents the amount of the color cast operation applied to the image 1220 with a large number of lines representing a large amount of the saturation operation and vice versa.

The first stage 1205 illustrates the addition of the slider shape 1230 from the slider shape generator 1250 to the sliding region 120 in a similar manner as the addition of the slider shape 475. Since the slider shape 1230 is generated from the slider shape generator 1250, the slider shape 1230 is for applying a green color cast operation to the image 1220, as indicated by the label "G" on the slider shape 1230. As shown, the slider shape 1230 is positioned near the outer edge of the sliding region 120. This means a small amount of the green color cast operation is applied to the image 1220 as shown by a few number of diagonal lines displayed over the image 1220.

At the second stage 1210, an adjustment is made to the green color cast operation that is applied to the image 1220. This stage shows the slider shape 1230 movably positioned (e.g., by performing a drag-and-drop operation) down, to the right, and towards the center 125 of the sliding region 120. This movement of the slider shape 1230 causes an increase in the amount of the green color cast operation applied to the image 1220, which is shown by an increase in the number of diagonal lines over the image 1220 displayed in the viewing area 660.

The third stage 1215 shows another adjustment to the green color cast operation that is applied to the image 1220. In this stage, the slider shape 1230 is movably positioned (e.g., by performing a drag-and-drop operation) to the left, slightly up, and away from the center 125 of the sliding region 120. The decrease in the amount of the green color cast operation that is applied to the image 1220 is illustrated by a decrease in the number of diagonal lines over the image 1220 displayed in the viewing area 660.

Figure 13:
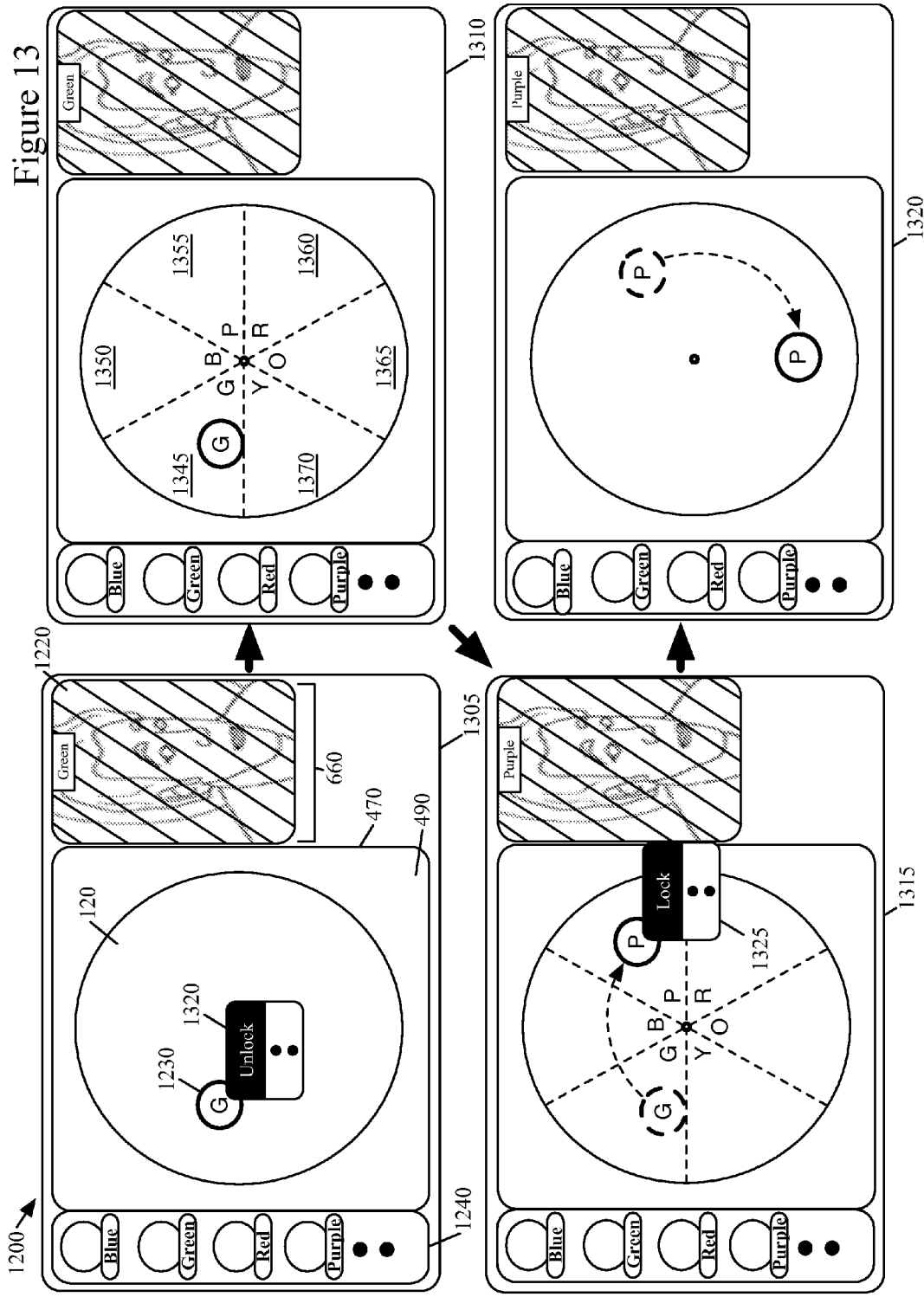
FIG. 13 conceptually illustrates a color change operation using the GUI of FIG. 12 according to some embodiments of the invention.

FIG. 13 conceptually illustrates a color change operation using the GUI 1200 of FIG. 12 according to some embodiments of the invention. Some embodiments of the color change operation temporarily unlock the color associated with a static color slider shape in order to change the color associated with the static color slider shape. FIG. 13 shows the GUI 1200 at three different stages 1305-1315 of the color change operation of such embodiments for the static color slider shape 1230.

The first stage 1305 continues from the last stage 1215 illustrated in FIG. 12. As shown, the slider shape 1230 is in the same position as in the last stage 1215 except the GUI 1200 also displays a pop-up menu 1320. Different embodiments invoke the pop-up menu 1320 differently. For example, some embodiments use a keystroke, a combination of keystrokes, a hotkey, or another appropriate method. In some embodiments, the pop-up menu 1320 is invoked by a cursor control operation (e.g., a right-click cursor operation or a control-click cursor operation). As shown, the pop-up menu 1320 includes a user selectable "Unlock" option for unlocking the color associated with the slider shape 1230 and the "Unlock" option is being selected (e.g., by clicking on, tapping) from the pop-up menu 1320 to unlock the current color associated with the slider shape 1230.

In the second stage 1310, a color selection grid is superimposed over the sliding region 120. In some embodiments, the color selection grid is displayed shortly after the "Unlock" option of the pop-up menu 1320 displayed in the first stage 1240 is selected. As shown, the color selection grid visually divides the sliding region 120 into six wedges 1345-1370. Each wedge is associated with a particular color. The wedge 1345 is associated with green, the wedge 1350 is associated with blue, the wedge 1355 is associated with purple, the wedge 1360 is associated with red, the wedge 1365 is associated with orange, and the wedge 1370 is associated with yellow. In addition, the wedges are labeled (using the first letter of the name of the color) near the center 125 of the sliding region 120 to indicate the color associated with the wedge. In some embodiments, the labels may not be displayed. In this stage, the slider shape 1230 is associated with the color green because the slider shape 1230 is positioned in the green wedge 1345 of the sliding region 120.

Some such embodiments display the color selection grid so that the position of the color on the color selection grid that corresponds to the color associated with a static color slider shape is aligned with the position of the static color slider shape when an unlock command is selected (e.g., the "Unlock" option of the pop-up menu 1320). In the second stage 1310, since the slider shape 1230 is associated with a green color cast operation, the color selection grid is displayed so that the position of the green color on the color selection grid is lined up with the position of the slider shape 1230 when the slider shape 1230 is unlocked. For example, using the same relative order of the color wedges of the color selection grid shown in this figure as an example of the relative order of the color wedges, if the slider shape 1230 is positioned near the bottom of the sliding region 120, the green color wedge would be positioned as the bottom wedge (i.e., wedge 1365 in this stage) followed by the blue color wedge 1350 in the clockwise direction, the purple color wedge 1355 in the clockwise direction, and so on and so forth.

Although the color selection grid is shown with six different colors in a particular order, one of ordinary skill will recognize that different embodiments of the color selection grid can include any number of different colors that can be ordered in any number of different ways. In addition, some embodiments may implement a color selection grid such that the colors gradually change from one color to the next to provide a much wider range of colors from which to select (instead of having only several colors from which to select).

Referring back to FIG. 13, the third stage 1315 illustrates a change in the color associated with the unlocked slider shape 1230. As shown, the slider shape 1230 is movably positioned (e.g., by performing a drag-and-drop operation) from the green color wedge 1345 to the purple color wedge 1355 within the sliding region 120. This stage also displays a pop-up menu 1325, which is invoked in a similar way as the pop-up menu 1320 in the first stage 1305. The pop-up menu 1325 includes a user selectable "Lock" option that locks the color that is associated with the slider shape 1230 to the slider shape 1230 when the option is selected. As shown, the "Lock" option is selected, and because the slider shape 1230 is positioned in the purple color wedge 1355, the color purple is associated with and locked to the slider shape 1230, as indicated by the new "P" label of the slider shape 1230. Since the slider shape 1230 now applies a purple color cast operation to the image 1220, the label displayed over the image 1220 changed accordingly.

The fourth stage 1320 of the GUI 1200 shows a movement of the slider shape 1230 within the sliding region 120. In this stage, the slider shape 1230 is movably positioned (e.g., by performing a drag-and-drop operation) to a different position within the sliding region 120 while maintaining the same radial distance. Thus, the amount of the purple color cast operation applied to the image 1220 remains unchanged, as shown by the display of the same image 1220 in the viewing area 660 as displayed in the third stage 1315.

In addition to the methods described above in reference to FIG. 13, other embodiments may initiate the color change operation using a variety of different methods. For instance, a keystroke, a combination of keystrokes, a hotkey, or another appropriate method can be toggled to initiate and terminate the color change operation. Moreover, instead of toggling a keyboard input to initiate and terminate the color change operation, some embodiments may use a keyboard input that is required to be held throughout the color change operation to initiate the color change operation and a release of the keyboard input to terminate the color change operation.

Figure 14:
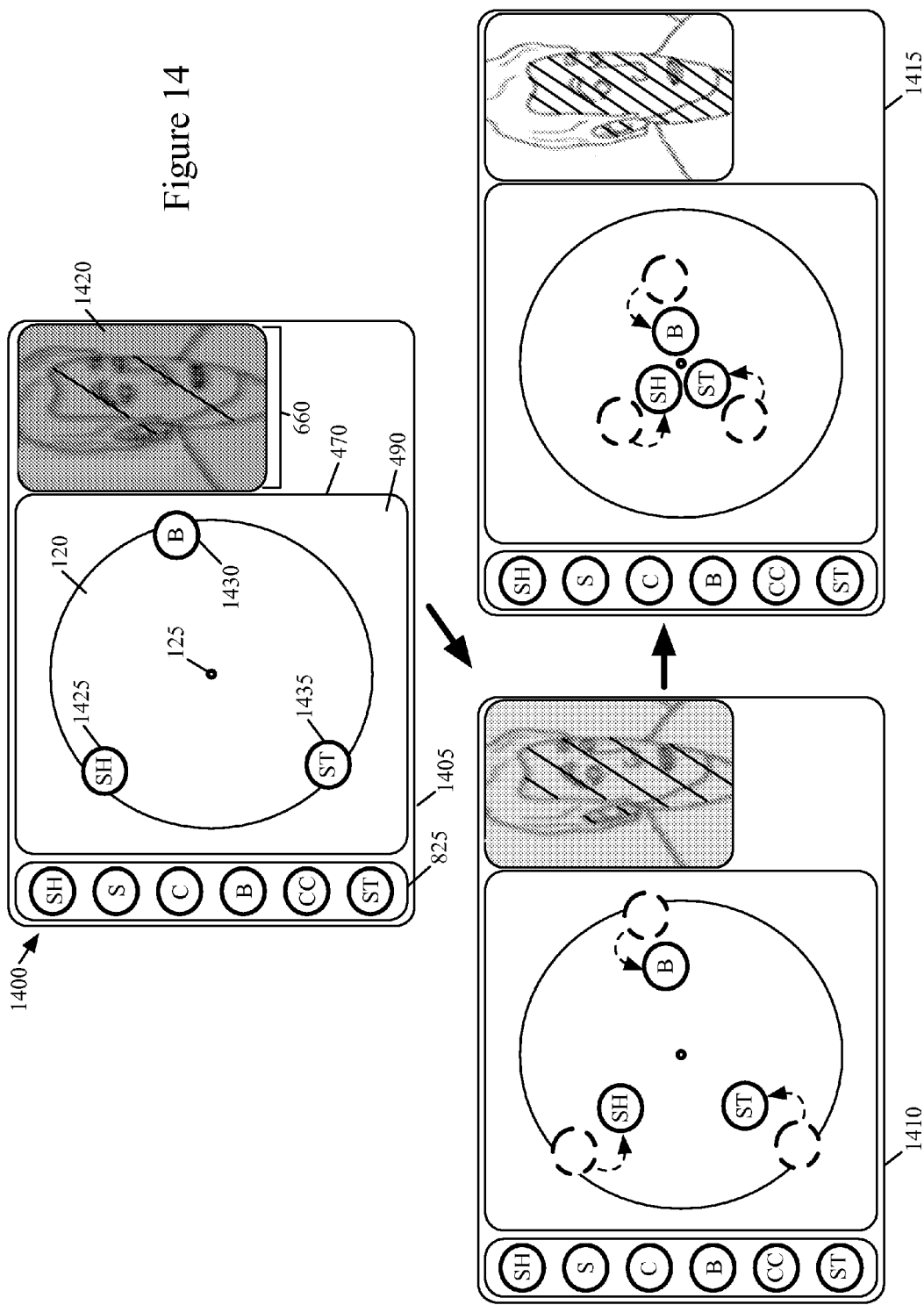
FIG. 14 conceptually illustrates multiple color correction operations using the GUI of FIG. 8 according to some embodiments of the invention.

FIG. 14 conceptually illustrates multiple color correction operations using a GUI 1400 of a media editing application of some embodiments that includes the two-dimensional slider control 470. Specifically, FIG. 14 illustrates the GUI 1400 at three different stages 1405-1420 of multiple color correction operations using the two-dimensional slider control 470. The GUI 1400 is similar to the GUI 800 illustrated in FIG. 8 except the viewing area 660 displays a different image 1420 of a person. Diagonal lines are displayed over the image 1420 in the same manner as the diagonal lines used in FIG. 11 to display the effect of a skin tone saturation operation.

At the first stage 1405, the GUI 1400 illustrates the addition of three slider shapes 1425-1435 to the two-dimensional slider control 470. The slider shapes 1425-1435 are each individually added to the two-dimensional slider control 470 similar to the addition of the slider shape 475. As shown, the slider shape 1425 is for performing a sharpness operation as describe by reference to FIG. 6, the slider shape 1430 is for performing a brightness operation as described by reference to FIG. 8, and the slider shape 1435 is for performing a skin tone saturation operation as described by reference to FIG. 11. In this example, the image 1420 is a blurry and dark image of a person. Since the slider shapes 1425-1435 are positioned near the outer edge of the sliding region 120, a small amount of each operation (i.e., sharpening, brightness, and skin tone saturation) is applied to the image 1420. This is shown by the display of a dark and blurry image of the person with a small number of diagonal lines over the face and neck of the person.

The second stage 1410 shows adjustments to the operations of the slider shapes 1425-1435 applied to the image 1420. As shown, the slider shapes 1425-1435 are each movably positioned (e.g., by performing drag-and-drop operations) towards the center 125 of the sliding region 120, thereby increasing the amount of the operations that are applied to the image 1420. These adjustments are illustrated by the display of the image 1420 that is sharper, is lighter, and has more diagonal lines over the face and neck of the person than that shown in the first stage 1405.

In the third stage 1415, the operations of the slider shapes 1425-1435 are again adjusted. The slider shapes 1425-1435 are each movably positioned (e.g., by performing drag-and-drop operations) further towards the center 125 of the sliding region 120. The increase in the amounts of the operations applied to the image 1420 is shown by displaying an image that is sharper, is lighter, and has more diagonal lines over the face and neck of the person in the image 1420 than that in the previous stages.

While the stages 1405-1415 show the addition or movable positioning of the slider shapes 1425-1435 all at once, in some embodiments, these actions are individually performed. In other embodiments, however, the slider shapes 1425-1435 can be added or movably positioned at the same time as further described below by reference to FIG. 29.

Figure 15:
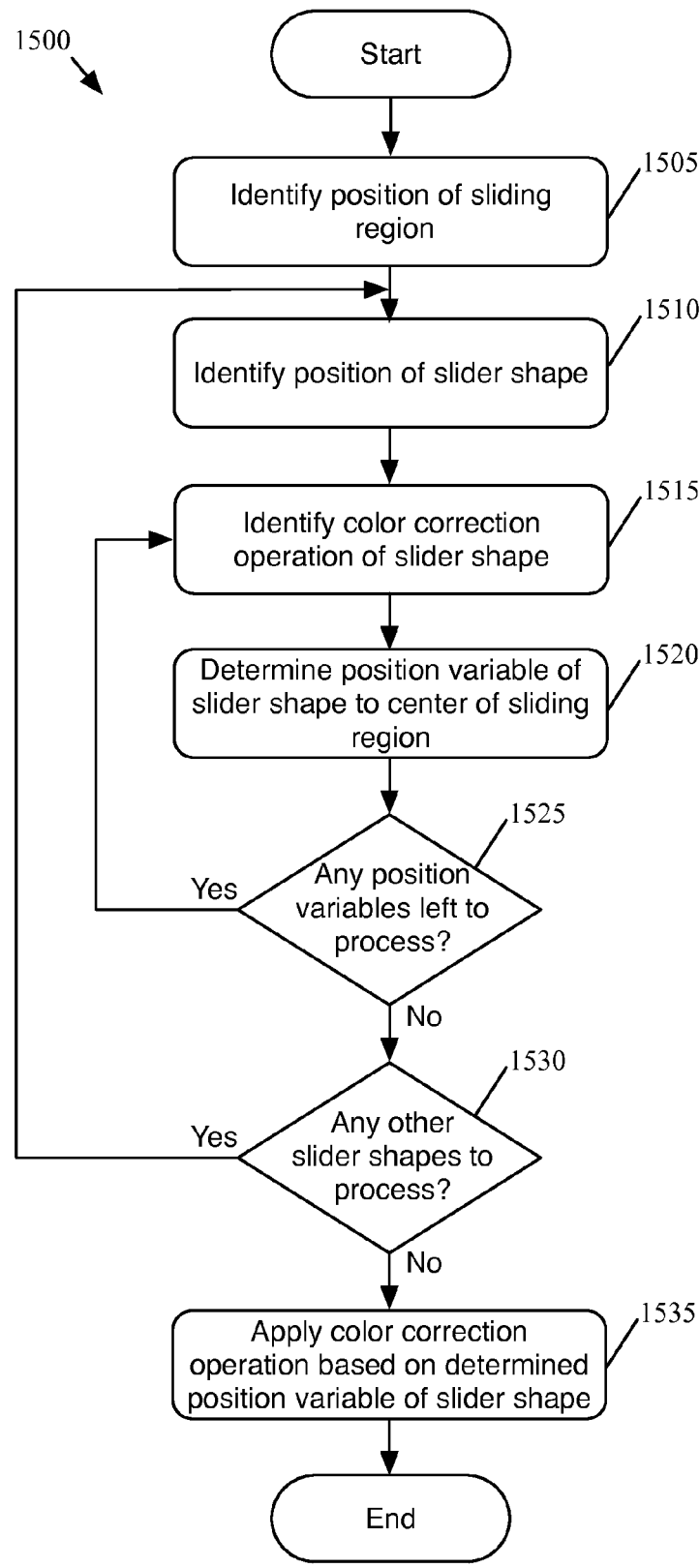
FIG. 15 conceptually illustrates a process of some embodiments for applying a color correction operation to an image using a slider shape in a two-dimensional slider control of some embodiments.

FIG. 15 illustrates a process 1500 for applying a color correction operation to an image being edited using a slider shape in a two-dimensional slider control of some embodiments. In some embodiments, the process 1500 is performed by a media editing application that includes a two-dimensional slider control, such as the one shown in FIG. 8. In some embodiments, the process 1500 is performed while a slider shape or sliding region is movably positioned within the two-dimensional slider control. For instance, in some such embodiments, the process 1500 is constantly performed (i.e., in real-time) while the slider shape or sliding region is being movably positioned within the two-dimensional slider control. In other such embodiments, the process 1500 is performed every time the slider shape or sliding region moves a defined distance (e.g., 10 pixels, 5 millimeters, etc.) while the slider shape or slider region is being movably positioned. In yet other embodiments, the process 1500 is performed when the movable positioning of the slider shape or sliding region is completed (e.g., the drag-and-drop operation performed on the slider shape is completed).

The process 1500 starts by performing operation 1505, which is similar to operation 710, as described above by reference to FIG. 7. Next, the process 1500 performs operation 1510, which is similar to operation 705, also described in FIG. 7. That is, the process 1500 identifies positions of a sliding region and a slider shape within a two-dimensional slider control. At 1515, the process 1500 identifies a color correction operation associated with the slider shape. Examples of color correction operations include a contrast operation, a saturation operation, an exposure operation, a color cast operation, etc.

The process 1500 then determines (at 1520) a position variable (e.g., radial distance, angle, x-axis distance, y-axis distance) of the slider shape with respect to the sliding region (e.g., the center of the sliding region). After operation 1520, the process 1500 determines (at 1525) whether there are any position variables left to process for the slider shape. When the process 1500 determines that there are position variables left to process, the process 1500 returns to operation 1515 to continue processing any remaining position variables of the slider shape. Otherwise, the process 1500 determines (at 1530) whether any slider shapes are left to process. For instance, when the sliding region is movably positioned within a two-dimensional slider control, the position variables of all the slider shapes in the two-dimensional slider control can be changed. In such cases, all the slider shapes within the two-dimensional slider control are processed to determine whether any of the corresponding operations changed. The process 1500 returns to operation 1505 to process any remaining slider shapes when it determines that there are slider shapes left to process. When there are no slider shapes left to process, the process 1500 proceeds to operation 1535.

Finally, the process 1500 applies (at 1535) the identified color correction operation to the image being edited based on the determined position variable of the slider shape. In some cases where a slider shape's color correction operation is based on multiple position variables, the process 1500 applies (at 1535) the identified color correction operation based on the multiple determined position variables of the slider shape. When a slider shape has multiple color correction operations associated with it, the process 1500 applies (at 1535) the multiple color correction operations that can each be based on a single position variable or multiple position variables. In instances when multiple slider shapes are processed (e.g., when the sliding region is movably positioned instead of a slider shape), the process 1500 applies (at 1535) the identified color correction operation(s) of each slider shape that, again, can each be based on a single position variable or multiple position variables.

B. Multi-Variable Operations

Some embodiments provide slider shapes for applying color cast operations to an image based on multiple position variables. For example, some embodiments provide a dynamic color slider shape for applying a color cast operation to an image based on two position variables. In some such embodiments, the dynamic color slider shape can be movably positioned around the sliding region of the two-dimensional slider control in order to change the color associated with the color slider shape, which changes the color of the color cast operation applied to an image being edited. In addition, the dynamic color slider shape can be movably positioned towards and away from the center of the sliding region to control the amount of the color associated with the color slider shape to apply to the image. Thus, these dynamic color slider shapes can control a color cast operation based on multiple position variables.

1. Dynamic Color Slider Shapes

Figure 16:
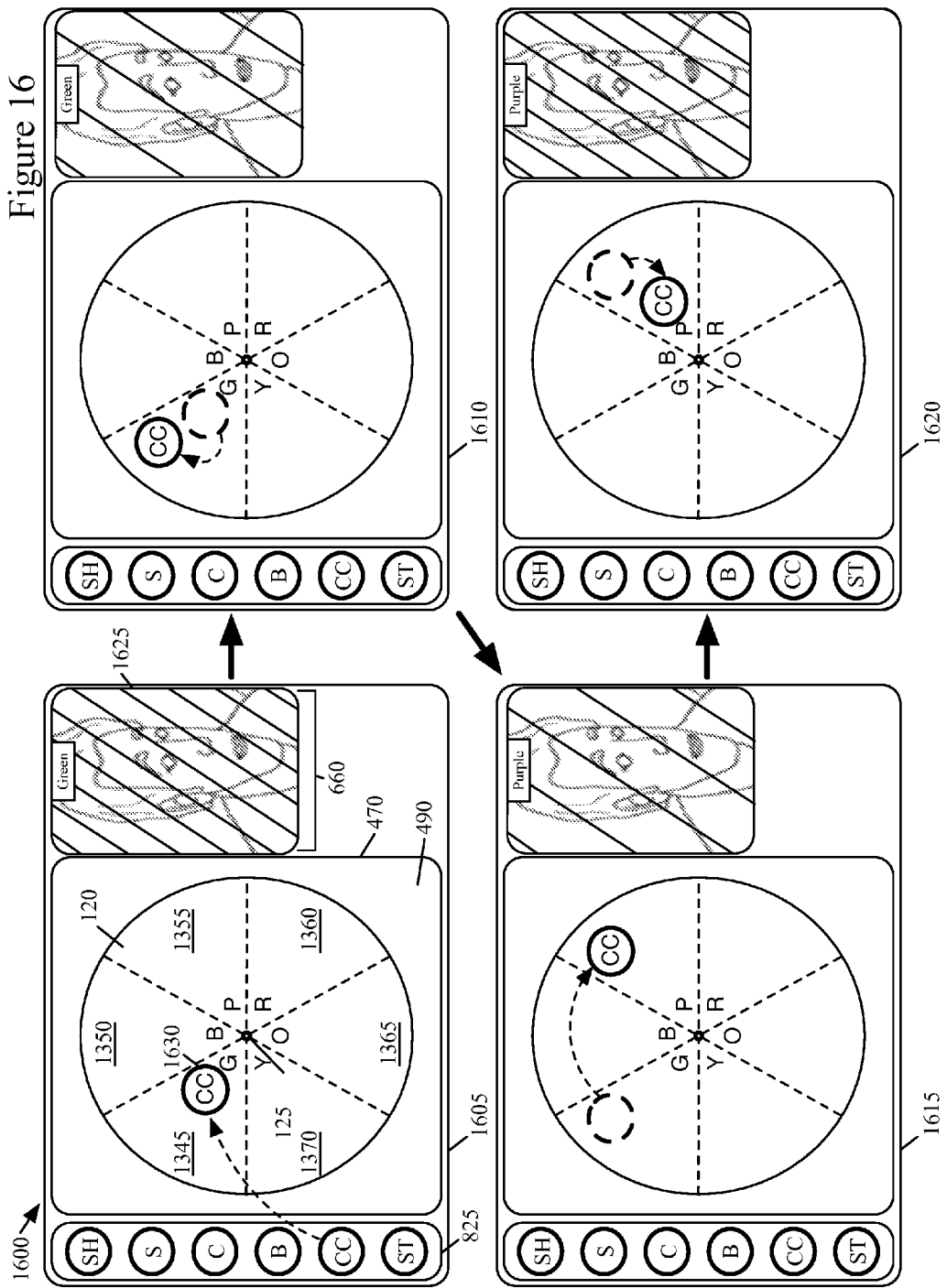
FIG. 16 conceptually illustrates a GUI of a media editing application that includes a two-dimensional slider control of some embodiments for performing a color cast operation.

FIG. 16 illustrates a GUI 1600 of a media editing application that includes the two-dimensional slider control 470 of some embodiments. Specifically, this figure illustrates the GUI 1600 at four different stages 1605-1620 of a color cast operation using a dynamic color slider shape of some embodiments. The GUI 1600 is similar to the GUI 800 except the viewing area 660 displays a different image 1625. The image 1625 displays diagonal lines and a label to indicate the effects of the color cast operation in the same manner as that illustrated in FIG. 12.

As shown, the stages 1605-1620 display the same color selection grid that is shown in FIG. 13 to indicate the colors associated with the areas of the sliding region 120. When a dynamic color slider shape is selected, some embodiments display the color selection grid on the sliding region 120. Some embodiments display the color selection grid until a different slider shape is selected (even if the dynamic color slider shape is not being movably positioned within the sliding region 120).

The first stage 1605 shows the addition of a slider shape 1630 from the slider shape generator 850 to the two-dimensional slider control 470 in a similar way as the addition of the slider shape 475. As shown, the slider shape 1630 is positioned in the green color wedge 1345 of the sliding region 120, which associates the color green with the slider shape 1630. The diagonal lines and the label displayed over the image 1625 represent the effects of the slider shape 1630's green color cast operation on the image 1625.

The second stage 1610 illustrates an adjustment to the color cast operation that is applied to the image 1625. The adjustment is made by movably positioning (e.g., by performing a drag-and-drop operation) the slider shape 1630 up, to the left, and away from the center 125 of the sliding region 120. In this stage, the slider shape 1630 is still within the green color wedge area except that it is now farther from the center 125 of the sliding region 120. Thus, the image 1625 is still labeled green, but with fewer diagonal lines displayed over it.

In the third stage 1615, another adjustment is made to the color cast operation that is applied to the image 1625. As shown, the slider shape 1630 is movably positioned (e.g., by performing a drag-and-drop operation) from the green color wedge to the purple color wedge while maintaining the same distance from the center 125 of the sliding region 120. As a result of the movement of the slider shape 1630, the color purple (instead of green) is now associated with the slider shape 1630. However, since the radial distance from the position of the slider shape 1630 to the center 125 of the sliding region 120 is the same as the radial distance at its previous position, the amount of the color cast operation applied to the image 1625 is not changed. As such, the image 1625 displays the same number of diagonal lines over the image 1625 except the label of the color is changed to indicate purple.

In some embodiments, the color associated with the slider shape 1630 changes as it moves through the sliding region 120. For example, as the slider shape 1630 moves along the path indicated by the arrow in this third stage 1615, the color associated with the slider shape 1630 changes from green to blue when the slider shape 1630 moves from the green color wedge to the blue color wedge. Likewise, the color associated with the slider shape 1630 changes from blue to purple as the slider shape 1630 moves from the blue color wedge to the purple color wedge. In other embodiments, a color is not associated with the slider shape 1630 until the termination of the movement (e.g., the drag-and-drop operation has been completed).

The fourth stage 1620 shows yet another adjustment to the color cast operation applied to the image 1625. In this stage, the slider shape 1630 is movably positioned (e.g., by performing a drag-and-drop operation) down, to the left, and towards the center 125 of the sliding region 120. As shown, the slider shape 1630 is still positioned within the purple color wedge, but is now closer to the center 125 of the sliding region 120. This increase the color cast operation, which is shown by the additional diagonal lines over the image 1625 displayed in the viewing area 660.

Figure 17:
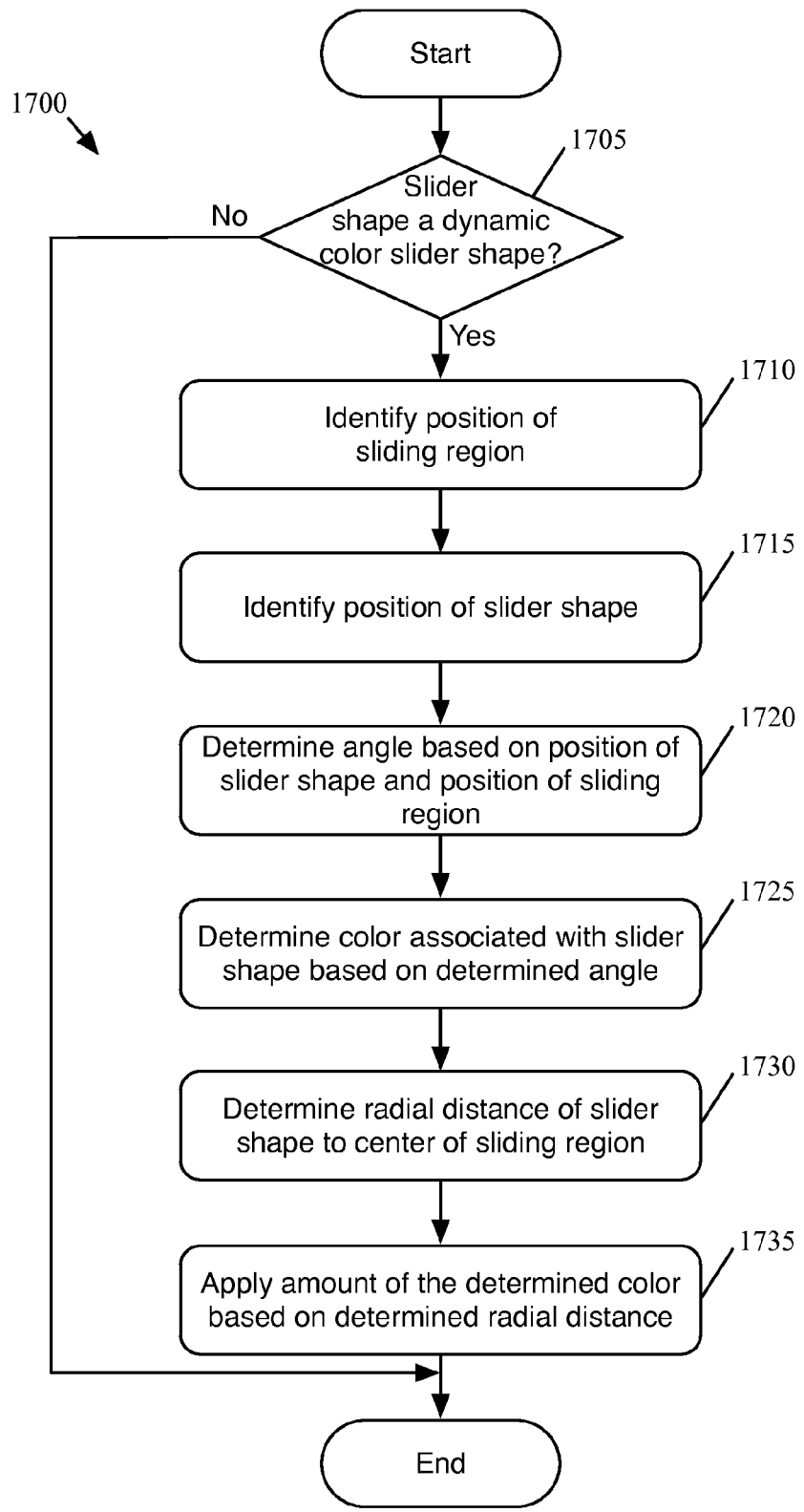
FIG. 17 conceptually illustrates another process of some embodiments for performing a color correction operation on an image.

FIG. 17 conceptually illustrates a process 1700 for applying a color correction operation to an image being edited by using a dynamic color slider shape in a two-dimensional slider control of some embodiments. In some embodiments, the process 1700 is performed while a dynamic color slider shape, such as slider shape 1630, or sliding region is movably positioned within the two-dimensional slider control. For example, in some such embodiments, the process 1700 is constantly performed (i.e., in real-time) while the dynamic color slider shape or sliding region is being movably positioned within the two-dimensional slider control. In other such embodiments, the process 1700 is performed every time the dynamic color slider shape or sliding region moves a defined distance (e.g., 10 pixels, 5 millimeters, etc.) while it is being movably positioned in the two-dimensional slider control. In yet other embodiments, the process 1700 is performed when the movable positioning of the dynamic color slider shape or sliding region is completed (e.g., the drag-and-drop operation performed on the dynamic color slider shape is completed). Furthermore, the process 1700 of some embodiments is performed by a media editing application that includes a two-dimensional slider control for dynamic color slider shapes.

The process 1700 begins by determining (at 1705) whether the slider shape is a dynamic color slider shape for performing a color cast operation. When the process 1700 determines that the slider shape is not a dynamic color slider shape, the process 1700 ends. Otherwise, the process 1700 performs operations 1710 and 1715. The two operations 1710 and 1715 of the process 1700 are the same as the operations 710 and 705, respectively, described above in FIG. 7. Specifically, the process 1700 identifies a position of a sliding region (e.g., the center of the sliding region 120) and a position of a slider shape (e.g., the slider shape 1630) within the sliding region of a two-dimensional slider control.

Next, the process 1700 determines (at 1720) an angle based on the positions of the slider shape and the sliding region. In some embodiments, the process 1700 determines the angle in the same manner described above by reference to FIG. 1. After determining the angle, the process 1700 determines (at 1725) the color associated with the slider shape based on the determined angle. Using the color selection grid displayed in FIG. 13 as an example, the process 1700 determines the color in the color selection grid that is associated with the slider shape based on the determined angle of the position of the slider shape in the sliding region. The process 1700 then determines (at 1730) a radial distance from the position of the slider shape to the position of the sliding region. Based on the determined radial distance, the process 1700 applies (at 1735) an amount of the determined color associated with the slider shape on the image being edited. After operation 1735, the process 1700 ends.

Furthermore, one of ordinary skill will recognize that the process 1700 is an example of one possible process performed by some embodiments in order to perform a color cast operation using a dynamic color slider shape in a two-dimensional slider control. The process 1700 is not the only example of how computer instructions can perform such a color cast operation. For instance, operations 1720-1730 need not necessarily be performed in the order shown in FIG. 1700. In addition, some embodiments of the process 1700 perform the operation 1705 after the positions of the sliding region and the slider shape are identified.

Figure 18:
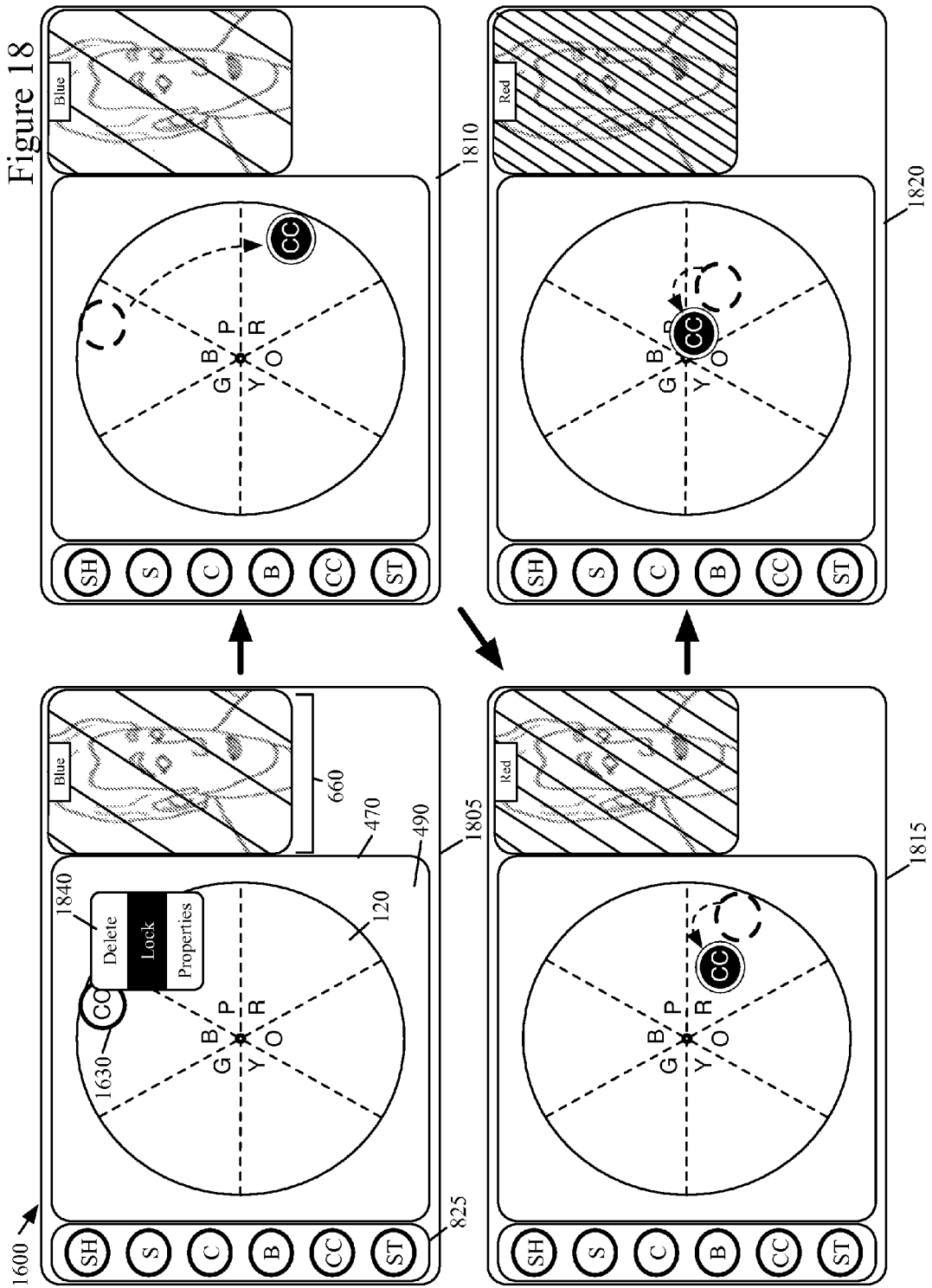
FIG. 18 conceptually illustrates a color locking operation using the GUI of FIG. 16 according to some embodiments of the invention.

FIG. 18 conceptually illustrates a color locking operation using the GUI 1600 of FIG. 16 according to some embodiments of the invention. In some instances, a user may wish to lock a color associated with the dynamic color slider shape so that movably positioning the locked color slider shape within the sliding region does not modify the color associated with the color slider shape, but the user can still control the amount of color cast to apply to the image. FIG. 18 shows the GUI 1600 at four different stages 1805-1820 of the color lock operation.

The first stage 1805 shows the locking of the slider shape 1630. As shown, the same color selection grid as the one in FIG. 13 is displayed in the sliding region 120. Also, a pop-up menu 1840 is displayed in the two-dimensional slider control 470. Different embodiments invoke the pop-up menu 1840 similar to the different methods used to invoke the pop-up menu 1320, as described above by reference to FIG. 13. The pop-up menu 1840 includes user selectable options "Delete," "Lock," and "Properties." The "Delete" option is for removing the slider shape 1630 from the two-dimensional slider control 470. The "Properties" option is for displaying a list of properties of the slider shape 1630. The "Lock" option is for locking the current color associated with the slider shape 1630 to the slider shape 1630. This stage shows the selection of the "Lock" option (e.g., by clicking on, tapping) and since the slider shape 1630 is positioned in the blue color wedge when this option is selected, the color blue is associated with the slider shape 1630.

In the second stage 1810, the slider shape 1630 is moved within the sliding region 120 of the two-dimensional slider control 470. As shown, the shading of the slider shape 1630 is inverted (i.e., white lettering on a black background instead of black lettering on a white background) to indicate that the dynamic color cast slider shape is color locked. Different embodiments designate that a dynamic color cast slider shape is color locked by modifying the appearance of the slider shape differently. For example, some embodiments change the labeling, shape, size, etc., of the slider shape. As mentioned, this stage also illustrates the slider shape 1630 movably positioned (e.g., by performing a drag-and-drop operation) around the sliding region 120 while maintaining the same distance to the center 125 of the sliding region 120. The slider shape 1630 is positioned in the red color wedge of the color selection grid. However, since the color of the slider shape 1630 locked (i.e., blue), the slider shape 1630 does not associate the color of the red color wedge (or any other color wedge) with it. In addition, the amount of the locked color applied to the image 1625 does not change because the radial distance from the position of the slider shape 1630 to the center 125 remains the same. As such, the image 1625 displayed in the viewing area 660 in this stage is the same as the image 1625 displayed in the first stage 1805.

The third stage 1815 shows an adjustment to the color cast operation that is applied to the image 1625. As shown, the slider shape 1630 is movably positioned (e.g., by performing a drag-and-drop operation) to the left and towards the center 125 of the sliding region 120. This movement of the slider shape 1630 increases the amount of the color associated with the slider shape 1630 that is applied to the image 1625, which is illustrated by the additional diagonal lines over the image 1625 that is displayed in the viewing area 660.

The fourth stage 1820 illustrates another adjustment to the color cast operation that is applied to the image 1625. In this stage, the slider shape 1630 is movably positioned (e.g., by performing a drag-and-drop operation) to the left and further towards the center 125 of the sliding region 120. The movement of the slider shape 1630 in this stage further increases the amount of the color cast operation that is applied to the image 1625, which is shown by the additional diagonal lines over the image 1625 displayed in the viewing area 660.

The stages 1815 and 1820 illustrate that even though the color of the slider shape 1630 is locked, movably positioning the slider shape 1630 away from or towards the center 125 of the sliding region 120 (i.e., changing the radial distance) still changes the amount of the locked color that is applied to the image 1625. In addition, some embodiments allow a dynamic color slider shape that is currently locked to be unlocked. Some embodiments provide a pop-up menu (not shown) that is similar to the pop-up menu 1840 except the pop-up menu includes a user selectable "Unlock" option instead of a "Lock" option. A locked dynamic color slider shape can also be unlocked using a keystroke, a combination of keystrokes, a hotkey, or another appropriate method.

Figure 19:
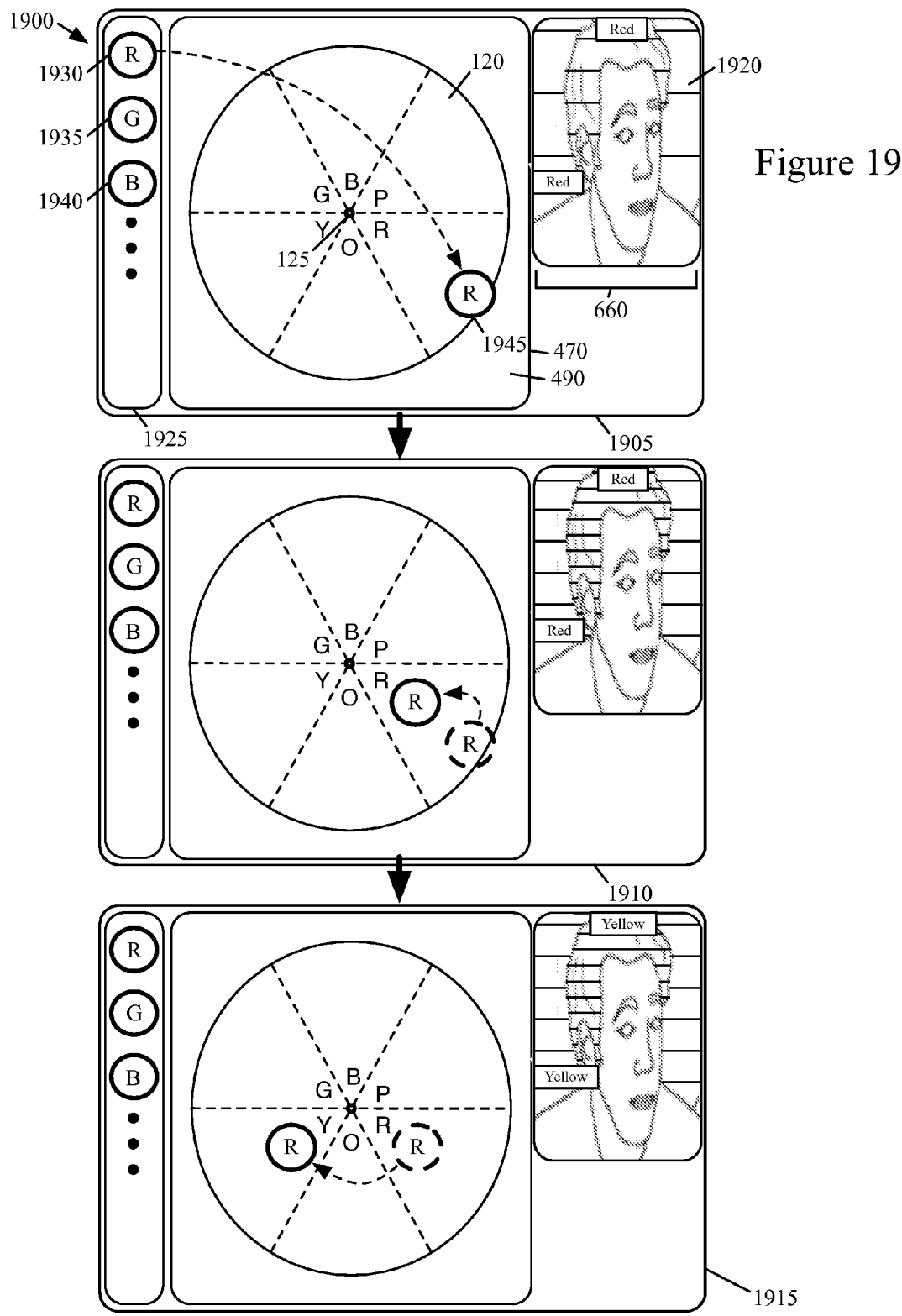
FIG. 19 conceptually illustrates another two-dimensional slider control of some embodiments for performing a color cast operation.

FIG. 19 conceptually illustrates another GUI 1900 of a media editing application that includes the two-dimensional slider control 470 of some embodiments. Specifically, this figure illustrates the GUI 1900 at three different stages 1905-1915 of a color cast operation based on two position variables. The GUI 1900 is similar to the GUI 800 except the GUI 1900 includes a slider shape tool box 1925 instead of the slider shape tool box 825 and the viewing area 660 displays a different image 1920. For FIG. 19, horizontal lines and a label are displayed over the image 1920 to illustrate the effects of the color cast operation on the image 1920. The number of horizontal lines displayed over the image 1920 represents the amount of the color cast operation applied to the image 1920 with a large number of horizontal lines representing a large amount of the color cast operation and a small number of horizontal lines representing a small amount of the color cast operation.

As shown, the slider shape tool box 1925 includes slider shape generators 1930-1940. In some embodiments, the slider shape generators 1930-1940 are for generating slider shapes that apply a color cast operation to portions of an image being edited that have a particular color. For example, a slider shape generator that generates a red color cast slider shape applies a color cast operation on portions of the image being edited that have red in it. In this example, the slider shape generator 1930 is for generating slider shapes that apply a color cast operation to portions of the image being edited that have red in it, as indicated by the label "R," the slider shape generator 1935 is for generating slider shapes that apply a color cast operation to portions of the image being edited that have green in it, as indicated by the label "G," and the slider shape generator 1940 is for generating slider shapes that apply a color cast operation to portions of the image being edited that have blue in it, as indicated by the label "B."

Furthermore, some embodiments of these slider shapes apply a color cast operation to portions of the current image that has a particular color in it while other embodiments apply the color cast operation to the portions of the original imaged that have the particular color in it. Although FIG. 19 shows three examples of such slider shape generators, other embodiments may include different and/or additional slider shape generators for generating slider shapes that apply a color cast operation on portions of the image being edited that are a different color (e.g., orange, yellow, purple, etc.).

As shown, the stages 1905-1915 display the same color selection grid that is shown in FIG. 13 to indicate the colors associated with the different areas of the sliding region 120. Similar to the dynamic color slider shapes described above, when a slider shape illustrated in FIG. 19 is selected, some embodiments display the color selection grid on the sliding region 120. Some embodiments display the color selection grid until a different slider shape is selected (even if the slider shape is not being movably positioned within the sliding region 120).

The first stage 1905 of the GUI 1900 shows the addition of a slider shape 1945 from the slider shape generator 1930 to the two-dimensional slider control similar to the addition of the slider shape 475. As shown, the slider shape 1945 is positioned in the red color wedge of the color selection grid near the outer edge of the sliding region 120. This applies a small amount of a red color cast operation on portions of the image 1920 that have red in it. In this example, the background and the hair of the person in the image 1920 are red or have red in it. Therefore, horizontal lines are displayed in these areas of the image 1920.

In the second stage 1910, an adjustment is made to the color cast operation that is applied to the image 1920. The slider shape 1945 is movably positioned (e.g., by performing a drag-and-drop operation) up, to the left, and towards the center 125 of the sliding region 120. The position of the slider shape 1945 in this stage is still in the red color wedge of the color selection grid so the amount of red applied to the portions of the image 1920 that are red or include red in it is increased. This is shown by the additional horizontal lines over the image 1920 that is displayed in the viewing area 660.

The third stage 1915 shows another adjustment to the color cast operation that is applied to the image 1920. In this stage, the slider shape 1945 is movably positioned (e.g., by performing a drag-and-drop operation) to the left from the red color wedge to the yellow color wedge of the color selection grid. Also, the radial distance from the slider shape 1945 to the center 125 remains the same as its previous position. The movement of the slider shape 1945 in this stage applies a yellow color cast operation to the portions of the image 1920 that are red or include red in it, as indicated by the label in the image 1920.

II. Slider Operations

As mentioned above, some embodiments of the two-dimensional slider control provide slider shapes that control multiple operations through a single positioning of the slider shape. The following section describes examples of such slider shapes as well as additional types of slider shapes and operations.

A. Luminance Range

FIG. 20 illustrates a GUI 2000 of a media editing application of some embodiments that includes the two-dimensional slider control 470. Some embodiments provide a feature that limits the application of color correction operations controlled by slider shapes to a particular range of luminance values of an image being edited. In FIG. 20, slider shapes for performing saturation operations are used to illustrate some of these luminance range operations. This figure shows the GUI 2000 at four different stages 2005-2020 of several luminance range operations. The GUI 2000 is similar to the GUI 800 illustrated in FIG. 8 except the viewing area 660 shows a different image 2025. Diagonal lines running from the lower left corner to the upper right corner of the viewing area 660 are displayed over the image 2025 to illustrate the effects of a saturation operation applied to the image 2025 in a similar manner as the diagonal lines used in FIG. 9.

The first stage 2005 shows the GUI 2000 when a slider shape 2035 is added to the two-dimensional slider control 470. As shown, the slider shape 2035 is for applying a saturation operation to the image 2025 since it was generated from the slider shape generator 835, which is for generating such slider shapes, as mentioned above. Since the position of the slider shape 2035 is close to the center 125 of the sliding region 120, a large amount of the saturation operation is applied to the image 2025, as shown by the diagonal lines over the image 2025 that is displayed in the viewing area 660. The sliding region 120 also includes another slider shape 2030, which is also positioned close to the center 125 of the sliding region 120

In some embodiments, operations of several of the same slider shapes are aggregated. That is, the operation of each slider shape is determined and separately applied to the image being edited. However, different embodiments treat the operations of the same slider shapes differently. For example, in some embodiments, the operations of several of the same slider shapes are averaged while in other embodiments, the highest or lowest amount is applied. For FIG. 20, the operations of the slider shapes 2030 and 2035 are averaged.

The second stage 2010 shows a selection of an option from a sub-menu 2055 of a pop-up menu 2050. Different embodiments invoke the pop-up menu 2050 and sub-menu 2055 differently. For example, some embodiments invoked the pop-up menu 2050 and the sub-menu 2055 using a hotkey, a keystroke, a combination or keystroke, or a cursor control operation (e.g., right-cursor click operation or control-cursor-click operations). As another example, which is illustrated in this stage, the slider shape 2030 is first selected and then a command is used to invoke the pop-up menu 2050 and sub-menu 2055.

In some embodiments, selecting one of the user selectable options in the sub-menu 2055 limits the application of the saturation operation of the slider shape 2030 to a set of pixels in the image 2025 that have luminance values that are within a defined range of luminance values. For example, in some embodiments, the "Shadows" option limits the saturation operation to a set of pixels having a range of low luminance values (e.g., dark portions of the image), the "Midtones" option limits the saturation operation to a set of pixels having a range of medium luminance values (e.g., well-lit portions of the image), and the "Highlights" option limits the saturation operation to a set of pixels having a range of high luminance values (e.g., bright portions of the image).

As shown, the user selectable "Highlights" option is selected (e.g., by clicking on, tapping), as indicated by the highlighting of this option, in order to apply the saturation operation to only the pixels in the image 2025 that have high luminance values. The selection of the luminance range is indicated by a corresponding modification of the label of the slider shape 2030 from "S" to "$S_H$" as illustrated in the next stage.

Since the sun and areas close to the sun are bright, the saturation operation of the slider shape 2030 is applied only to this area as shown in the image 2025. However, the saturation operation of the slider shape 2035 still applies to the entire image 2025 so diagonal lines are still displayed in the entire image 2025 that is displayed in the viewing area 660 even after the selection of the "Highlights" option.

In the third stage 2015, the same pop-up menu 2050 and sub-menu 2055 are invoked by selecting the slider shape 2035 and using the same command as in the second stage 2010. In this stage, however, the user selectable "Shadows" option is selected (e.g., by clicking on, tapping) from the sub-menu 2055, as indicated by the highlighting of this menu option. As illustrated in the next stage, the label of the slider shape 2035 is modified from "S" to "$S_S$" to indicate the selection of the luminance range.

The fourth stage 2020 shows the image 2025 after the luminance range operations are completed. The selection in the third stage 2015 causes the saturation operation of the slider shape 2035 to be applied to only the pixels in the image 2025 that have low luminance values. The left side of the mountains is the only area of shadow in the image 2025. As mentioned above, the saturation operation of the slider shape 2030 is applied only to the bright areas of the image 2025, which are the sun and the areas close to the sun. As such, the saturation operation of the slider shape 2035 is applied to the only aforementioned dark areas of the image 2025 and the saturation operation of the slider shape 2030 is applied to only the bright areas of the image 2025, as shown sin this stage.

FIG. 20 shows the selection of a luminance range through a pop-up menu. In some embodiments, a luminance range can instead be selected for a slider shape using a hotkey, a keystroke, a combination or keystroke. Although this figure shows a luminance range operation performed for a slider shape that controls a saturation operation, a luminance range operation can be similarly performed for any slider shape, which can be associated with any type of color correction operation, in some embodiments.

Figure 21A:
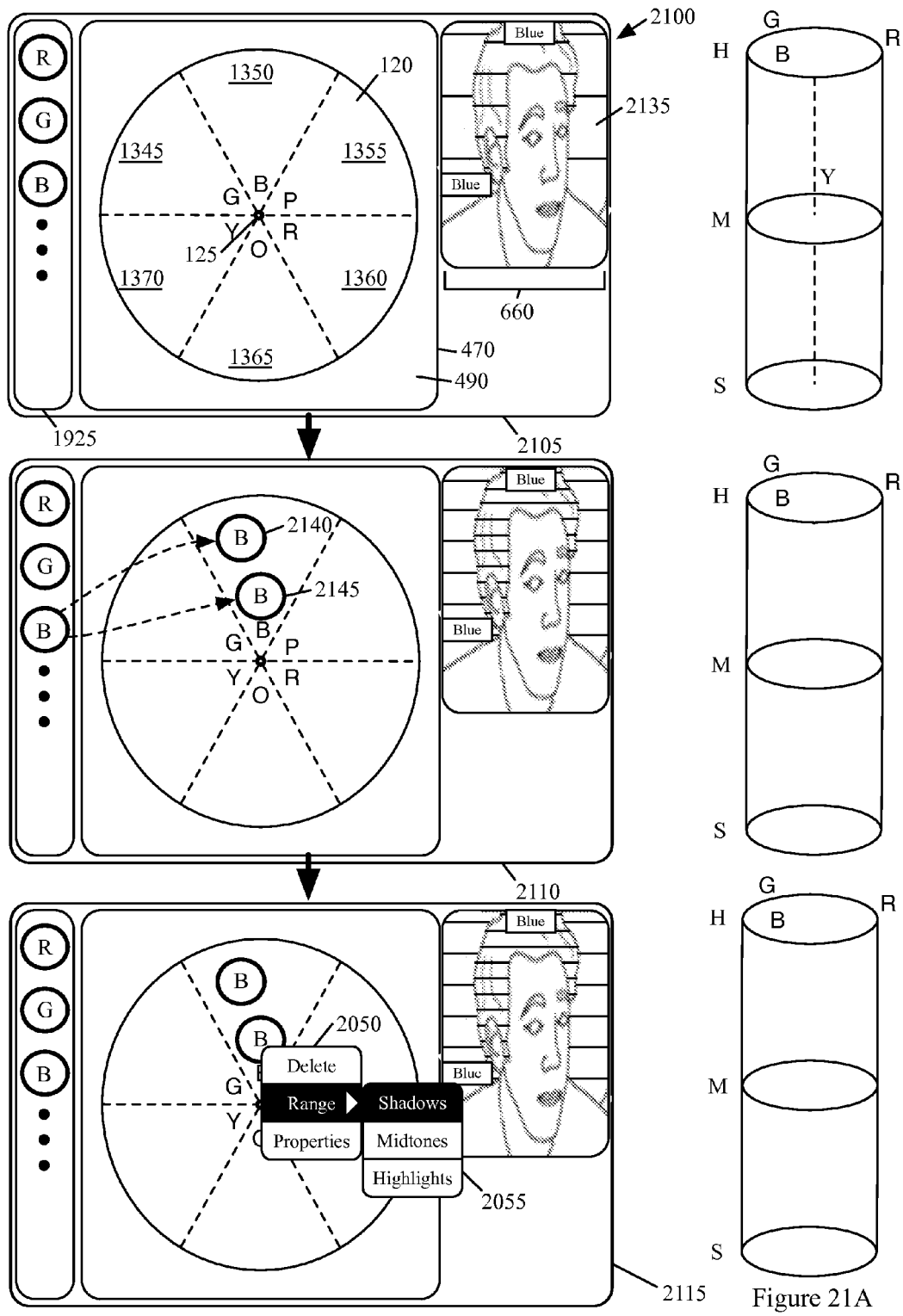
FIGS. 21A-B conceptually illustrate a GUI of a media editing application that includes a two-dimensional slider control of some embodiments.
Figure 21B:
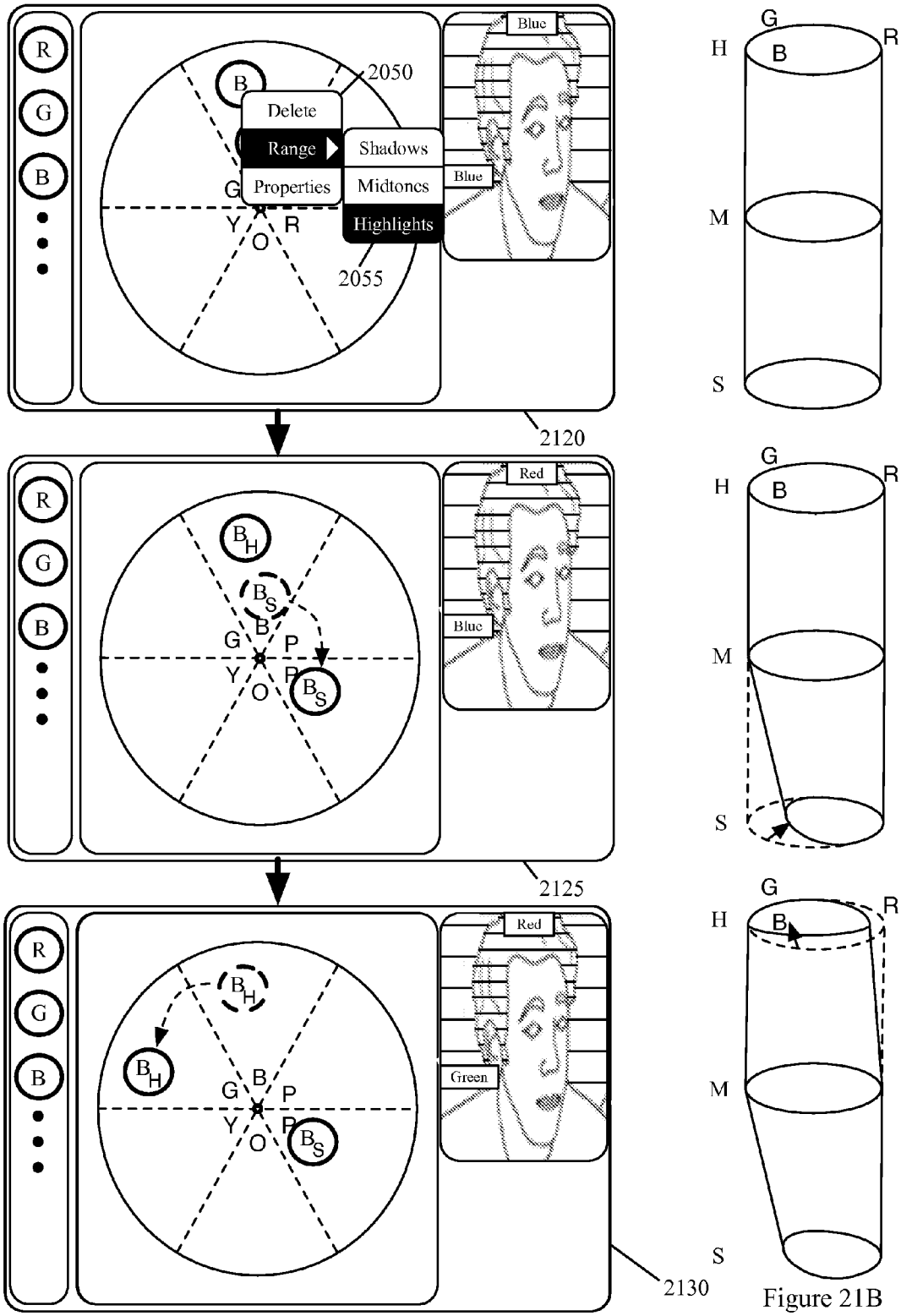

FIGS. 21A-B conceptually illustrate a GUI 2100 of a media editing application that includes the two-dimensional slider control 470 of some embodiments. In particular, these figures illustrate another luminance range operation of some embodiments using the two-dimensional slider control 470 and slider shapes illustrated in FIG. 19. The GUI 2100 is similar to the GUI 1900 except the GUI 2100 displays a different image 2135. FIGS. 21A-B also illustrates the GUI 2100 at six different stages 2105-2130 of the luminance range operation.

In each of these stages, a conceptual diagram of a three-dimensional color space defined in the hue, saturation, and luminance format is shown. As shown, high luminance values (e.g., whites) are located in the upper planes of the color space, medium luminance values (e.g., midtones) are located in the middle planes of the color space, and low luminance values (e.g., blacks) are located in the lower planes of the color space. The angle around the luminance (Y) axis corresponds to colors (hues) and the radial distance from the luminance axis representation the saturation. Modifications, if any, to the color space based on color correction operations that are applied to the image 2135 at each stage are illustrated in the corresponding color space diagram next to the GUI 2100 at the stage.

Similar to FIG. 19, horizontal lines and a label are displayed over the image 2135 to illustrate the effects of the color cast operation on the image 2135. A large number of horizontal lines displayed over the image 2135 represents a large amount of the color cast operation and a small number of horizontal lines displayed over the image 2135 represents a small amount of the color cast operation.

In the first stage 2105, the GUI 2100 shows a color selection grid displayed on the sliding region 120 of the two-dimensional slider control 470. This stage (and the following stages 2110-2130) display the same color selection grid that is shown in FIG. 13 in a similar manner as the display of the color selection grid in FIG. 19. As shown, the two-dimensional slider control 470 does not have any slider shapes in it. Also, the light background and dark hair of the person in the image 2135 is blue as indicated by the label in the image 2135.

The second stage 2110 illustrates the addition of slider shapes 2140 and 2145 from the slider shape generator 1940 to the sliding region 120 in a similar fashion as the addition of the slider shape 475. As shown, the slider shapes 2140 and 2145 are positioned within the blue color wedge 1350 of the color selection grid. As mentioned above, some embodiments aggregate the operations of several of the same slider shapes in the sliding region 120, and some embodiments average the operations, in addition to other methods of handling the operations of multiple slider shapes in the sliding region 120. In this example, the color cast operations are averaged. The increased blue color cast operation on portions of the image 2135 that are blue or include blue in it are shown by the horizontal lines over the image 2135 displayed in the viewing area 660.

At the third stage 2115, the pop-up menu 2050 and sub-menu 2055 shown in FIG. 20 are invoked and displayed in a similar manner as described in reference to FIG. 20. In this stage, the slider shape 2145 is selected (e.g., by clicking on, tapping) and the pop-up menu 2050 and sub-menu 2055 are invoked. As shown, the "Shadows" option is selected, which limits the operation of the color cast operation of the slider shape 2145 to a set of pixels in the image 2135 that that have low luminance values and are blue or include blue in it.

The fourth stage 2120 is similar to the third stage 2115 except the slider shape 2140 is selected (e.g., by clicking on, tapping) and the pop-up menu 2050 and sub-menu 2055 are invoked. In this stage, the "Highlights" option is selected, which limits the operation of the color cast operation of the slider shape 2140 to a set of pixels in the image 2135 that have high luminance values and are blue or include blue in it.

In the fifth stage 2125, an adjustment is made to the color cast operation of the slider shape 2145 that is applied to the image 2135. As shown, the slider shape 2145 is movably positioned (e.g., by performing a drag-and-drop operation) from the blue color wedge to the red color wedge of the color selection grid while maintaining the same distance to the center 125 of the sliding region 120. As a result of this movement, a red color cast operation is applied to the low luminance range of portions of the image 2135 that are blue or include blue in it, but the amount of the color cast operation applied remains the same as the amount applied in the previous stage. As mentioned above, the hair of the person is dark and, thus, falls in this low luminance range. This is illustrated by the modification to the label of the person's hair in the image 2135 that is displayed in the viewing area 660.

Moreover, this adjustment to the color cast operation causes a corresponding modification to the diagram of the color space as shown to the right of the GUI 2100 at this stage. Specifically, the adjustment causes the colors in the color space at the lowest luminance plane (i.e., black) to warp towards the direction represented by the arrow. As shown in the diagram at this stage, the colors of the color space at the lowest luminance plane moves in the direction of the color red. In addition, the colors of the color spaces at the luminance planes between the lowest luminance plane and the middle luminance plane are also moved towards the color red. However, the closer a luminance level is to the middle luminance level, the less the colors of the luminance level's color space is warped towards the color red.

The sixth stage 2130 shows an adjustment to the color cast operation of the slider shape 2140 that is applied to the image 2135. In this stage, the slider shape 2140 is movably positioned (e.g., by performing a drag-and-drop operation) from the blue color wedge to the green color wedge of the color selection grid while maintaining its distance to the center 125 of the sliding region 120. Based on this movement, a green color cast operation is applied to portions of the image 2135 that are blue or include blue in it, but the amount of the color cast operation applied is the same as the amount applied in the previous stage, as shown by displaying the same number of lines over the image 2135.

Similar to the fifth stage 2125, the adjustment to the color cast operation in this stage also causes a corresponding modification to the diagram of the color space as shown to the right of the GUI 2100. In particular, the adjustment causes the colors of the color space at the high luminance plane to warp towards the direction indicated by the arrow. As illustrated, the colors of the color space at the highest luminance plane moves in the direction of the color green. The colors of the color spaces at the luminance planes between the highest luminance plane and the middle luminance are also move towards the color green, but the closer a luminance level is to the middle luminance level, the less the colors of the luminance level's color space is warped towards the color green.

In some embodiments, movably positioning the slider shapes 2140 and 2145 within the sliding region 120 provides a corresponding vector input that is applied to the color space. In some such embodiments, the direction of the corresponding vector is defined to start from the same color in the color space as the color that is used to identify portions of the image to which the color cast operation associated with the slider shape is applied. The direction of the vector points towards the same color in the color space as the color of the color wedge in which the slider shape is positioned. Using the slider shape 2145 in the fifth stage 2125 as an example, the direction of the vector points from the blue (i.e., "B") color of the color space since blue is the color used to identify portions of the image 2135 to which the color cast operation associated with the slider shape 2145 is applied. Since the slider shape 2145 is positioned within the red color wedge, the direction of the vector points towards the red color (i.e., "R") of the color space. The arrow in the color space diagram at the fifth stage 2125 is shown to point in such described direction.

Different embodiments define the magnitude of the vector differently. For instance, some embodiments define the initial point of the vector as the center 125 of the sliding region 120 and the terminal point as the position of the slider shape after it has been movably positioned. Referring to the movable positioning of the slider shape 2145 in the fifth stage 2125 as an example, the magnitude of the corresponding vector is the magnitude of a line from the center 125 to the position of the slider shape 2145 in the sliding region 120.

In other embodiments, the initial point of the vector is defined as the position of the slider shape before it is movably positioned. In yet other embodiments, the initial point of the vector is a particular defined point in a color wedge of the color selection grid that is the same color as the color associated with the color cast operation of the slider shape. Referring to the slider shape 2145 in the fifth stage 2125 as an example of such embodiments, the initial point of the corresponding vector of the movable positioning of the slider shape 2145 can be a particular defined point in the blue color wedge since the color blue is associated with the color cast operation of the slide shape 2145.

While FIGS. 21A-B use a hue, saturation, luminance model to conceptually illustrate modifications to a color space based on applying a color cast operation to portions of the current image being edited that have a particular color, one of ordinary skill will recognize that other ways of representing these effects to the color space are possible and that the diagrams shown in FIGS. 21A-B are conceptual and are merely for purposes of explanation.

B. Switchable-Operation Sliders

A switchable-operation slider shape is another type of slider shape of some embodiments. In some embodiments, multiple operations are associated with a switchable-operation slider shape. Although only one operation of the slider shape can be active at a given time, the slider shape can switch among the different operations at any time. These types of slider shapes allow a user to quickly switch among different operations through a single slider shape.

Any number of different operations can be associated with different embodiments of a switchable-operation slider shape. For example, some embodiments may associate two opposite color correction operations (e.g., contrast/de-contrast, saturate/de-saturate, etc.) with a switchable-operation slider shape.

Figure 22:
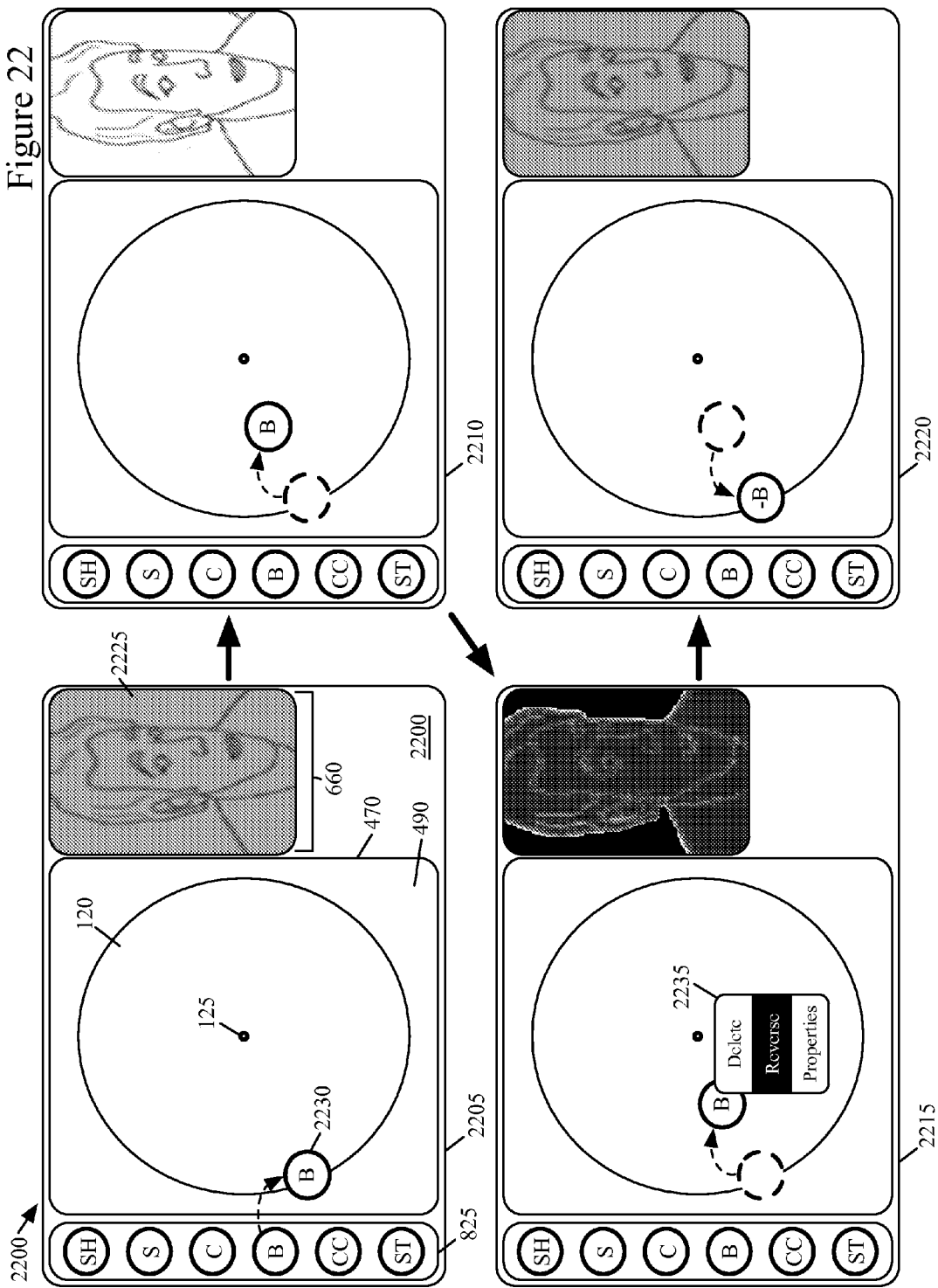
FIG. 22 conceptually illustrates a switchable-operation slider shape of a two-dimensional slider control of some embodiments.

FIG. 22 illustrates a switchable-operation slider shape of the two-dimensional slider control 470 of some embodiments. This figure shows a GUI 2200 at four different stages 2205-2220 of a switch operation using a switchable-operation slider shape of some embodiments. In this example, a slider shape 2230 is switchably associated with a brightness operation and a darkness operation. In contrast to the brightness operation described above, a darkness operation decreases the luminance values of the pixels in an image a particular amount to produce a darker image. Some such embodiments decrease the luminance values by multiply them by a particular value (e.g., 0.9, 0.5 0.2, etc.). FIG. 22 shows the GUI 2200, which is similar to the GUI 800 described above by reference to FIG. 8 except the viewing area 660 displays a different image 2225. The image 2225 is a light grey image of a person.

The first stage 2205 of the GUI 2200 shows the addition of the slider shape 2230 from the slider shape generator 845 to the sliding region 120 in a similar fashion as the addition of the slider shape 475. As shown, the slider shape 2230 is positioned along the outer edge of the sliding region 120, which applies a little or no amount of a brightness operation to the image 2225. This is shown by the still light grey image of the person in the image 2225.

In the second stage 2210, the brightness operation that is applied to the image 2225 is adjusted. As shown, the slider shape 2230 is movably positioned (e.g., by performing a drag-and-drop operation) up, to the left, and towards the center 125 of the sliding region 120. This adjustment causes the image of the person to be brightened, as shown in the image 825 that is displayed in the viewing area 660.

At the third stage 2215, the slider shape 2230 is selected (e.g., by clicking on, tapping) and pop-up menu 2235 is invoke using a similar method used to invoke the menus in FIG. 13, as described above. The pop-up menu 2235 includes user selectable "Delete," "Reverse," and "Properties" options. The "Delete" and "Properties" option are the similar to the ones included in the pop-up menu 1840 described above by reference to FIG. 18. In some embodiments, the switch operation is initiated by selecting (e.g., by clicking on, tapping) the slider shape 2230.

The "Reverse" option is for switching between the brightness operation and the darkness operation for the slider shape 2230. As shown, the "Reverse" option is selected in this stage, which causes the slider shape 2230 to switch from being associated with the brightness operation to being associated with the darkness operation. Now, the darkness operation is applied to the image 2225 instead of the brightness operation. The effects of the darkness operation applied to the image 2225 based on the position of the slider shape 2230 in the sliding region 120. This is shown by displaying the image 2225 of the person that is darker than the image of the person in the first stage 2205 when little to no operation is applied to the image 2225.

The fourth stage 2220 shows an adjustment to the darkness operation that is applied to the image 2225. As shown, the slider shape 2230 is movably positioned (e.g., by performing a drag-and-drop operation) slightly down, to the left, and away from the center 125 of the sliding region 120. This movement causes a decrease in the darkness operation that is applied to the image 2225. Thus, a lighter image of the person is displayed over the image 2225 than that displayed in the previous stage.

As shown in this stage, some embodiments modify the label on the slider shape 2230 from "B" to "-B" to indicate the active operation of the slider shape 2230. Some embodiments change the label to "D" to indicate that the darkness operation is the current operation associated with the slider shape 2230. However, any number of different ways of modifying the appearance of the slider shape 2230 is possible. For instance, the slider shape 1630's label, shape, size, font, etc., can be modified.

FIG. 22 illustrates one example of a switchable-operation slider shape. As noted above, different embodiments of switchable-operation slider shapes can be defined differently. Some embodiments may associate, for example, the most commonly used operations, the least used operations, or the most related operations with a slider shape that can switch among the associated operations. Therefore, any number of operations and any number of different types of operations can be associated with a switchable-operation sliders shape.

While FIG. 22 shows one technique for switching among operations (i.e., providing a menu), other embodiments user a number of different methods. For instance, the operations can be cycled through by double-clicking on the slider shape or using a keystroke, a combination of keystrokes, or a hotkey. Furthermore, other embodiments provide other methods of initiating the switch operation than the one described above. For example, a keystroke, a combination of keystrokes, a hotkey, or a pull-down menu command can be used to initiate the switch operation as well.

C. Multi-Operation Slider Shapes

Another type of slider shape of some embodiments is a multi-operation slider shape. For a multi-operation slider shape of some embodiments, the slider shape is defined such that multiple operations are associated with the slider shape. Unlike switchable-operation slider shapes, all of the operations associated with a multi-operation slider shape are simultaneously active, thereby allowing multiple operations to be performed through a single positioning of the slider shape within a sliding region.

Figure 23:
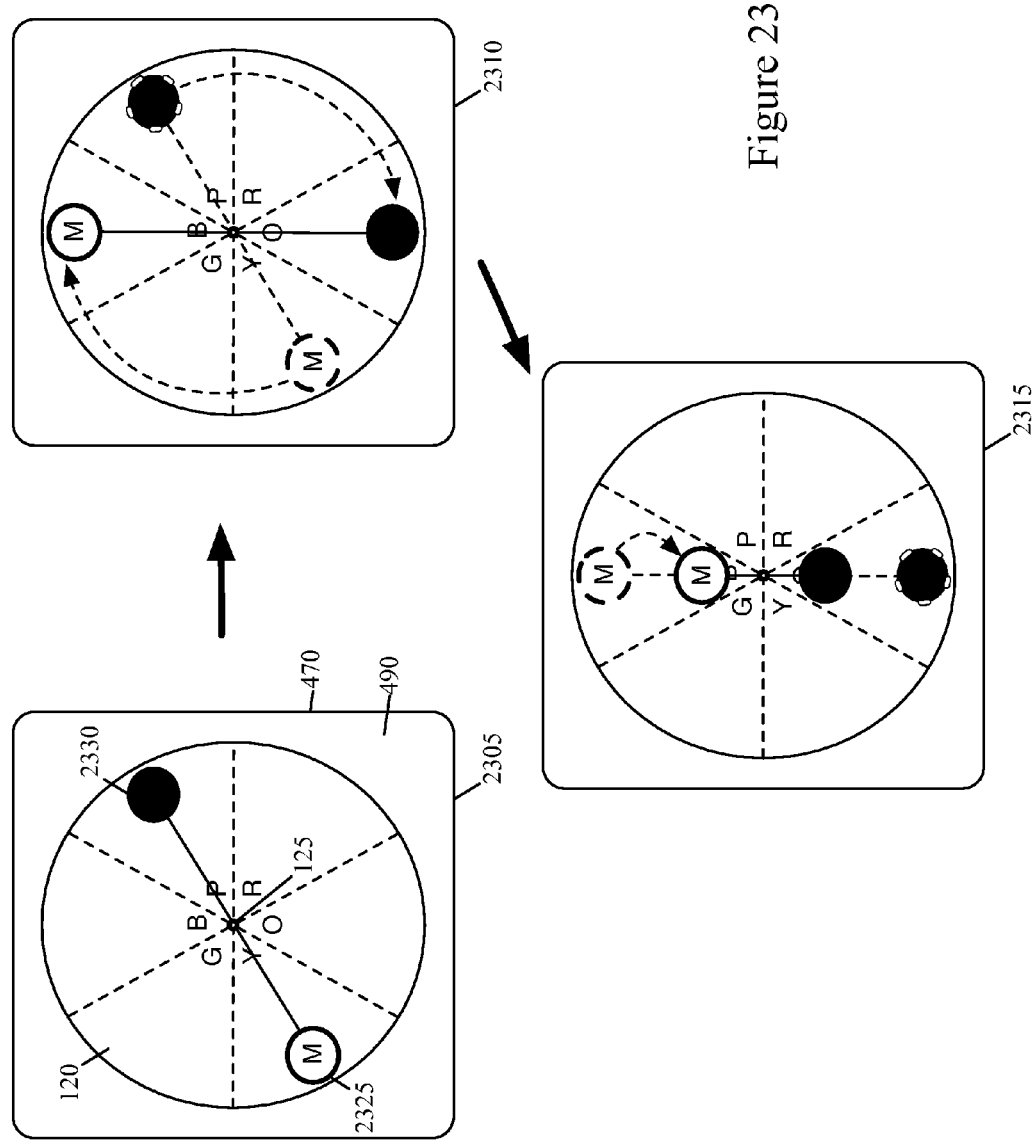
FIG. 23 conceptually illustrates a multi-operation slider shape of some embodiments.

FIG. 23 conceptually illustrates an example of a multi-operation slider shape. In particular, the figure shows the two-dimensional slider control 470 at three different stages 2305, 2310, and 2315. These stages will be described in further detail below. However, the elements of the two-dimensional slider control 470 will be described first.

As shown, the two-dimensional slider control 470 includes a sliding region 120, a circle 2330, and a slider shape 2325, which is labeled with an "M" to identify the slider shape as a multi-operation slider shape. In some embodiments, two color cast operations are associated with the slider shape 2325. In this example, the first color cast operation is controlled by the slider shape 2325 in a similar manner as the dynamic color slider shape 1630 described above by reference to FIG. 16. For this reason, a color selection grid like the one illustrated in FIG. 16 is displayed in the two-dimensional slider control 470. The second color cast operation is also controlled by the slider shape 2325 in the same manner as the dynamic color slider shape 1630 described above by reference to FIG. 16 except the color associated with the second color cast operation is the color opposite of the color indicated by the slider shape 2325 in the color selection grid.

To visually demonstrate the operation of the second color cast operation, a line connected to the slider shape 2325 is extended through the center of the sliding region 2335 to the other side of the sliding region 2335, and the circle 2330 is connected to the other end of the line. The circle 2330 mirrors the positioning of the slider shape 2325 within the sliding region 120 to represent the actual color that is associated with the second color cast operation. Stated differently, for any position to which the slider shape 2325 is movably positioned, the circle 2330 stays 180 degrees offset from the slider shape 2325 and maintains the same radial distance as the slider shape 2325. In some embodiments, the two color cast operations are represented by just the slider shape 2325. In these embodiments, the positioning of the slider shape 2325 within the sliding region 2335 visually represents the color associated with only one color cast operation. The color associated with the other color cast operation is still the opposite of the color indicated by the slider shape 2325 in the color selection grid, but it is not visually represented.

The operation of the two-dimensional slider control 470 will now be described by reference to the state of this two-dimensional slider control during the three different stages 2305, 2310, and 2315 illustrated in FIG. 23. The first stage 2305 shows the two-dimensional slider control 470 before the start of an operation to change the colors associated with the two color cast operation. The second stage 2310 illustrates the two-dimensional slider control 470 after the color associations have been modified. Between the first and second stages 2305 and 2310, the slider shape 2325 is selected and movably positioned (e.g., by performing a drag-and-drop operation) from its position in the first stage 2305 to its position in the second stage 2310. This movement is indicated by an arrow pointing from a dotted circle, which represents the previous position of the slider shape 2325, to its current position. To visually demonstrate the mirroring of the slider shape 2325 by the second dynamic color slider shape operation, the circle 2330 is also movably positioned to a position opposite of the slider shape 2325 within the sliding region 120.

The third stage 2315 shows the two-dimensional slider control 470 after a modification to the amounts of color that is applied by each of the color cast operations associated with the slider shape 2325 to an image being edited (not shown). Between the second stage 2310 and the third stage 235, the amounts have been modified by selecting the slider shape 2325 and movably positioning the slider shape 2325 (e.g., by performing a drag-and-drop operation) towards the center of the sliding region 120, as indicated by an arrow pointing from the previous position of the slider shape 2325 to its current position. The circle 2330 also moved a corresponding equal distance closer towards the center of the sliding region 2325 to visually demonstrate the mirroring operation of the second dynamic color slider shape.

The example operations described by reference to the second and third stages 2310 and 2315 illustrate the slider shape 2325 being selected and movably positioned in order to perform the operations. However, in some embodiments, the circle 2330 is user selectable and, therefore, can be selected and movably positioned to perform the same or similar operations. In other embodiments, the circle 2330 is not user selectable.

The multi-operation slider shape illustrated in FIG. 23 is just one of many different embodiments of multi-operation slider shapes. For example, some embodiments define the color associated with the second color cast operation to be based on a different angle offset from the slider shape 2325 within the sliding region 120. Rather than defining the second color cast operation to associate a color that is offset 180 degrees from the slider shape 2325, some such embodiments define the second color cast operation to associate a color at a different angle offset (e.g., 60 degrees clockwise, 45 degrees counterclockwise, etc.) from the slider shape 2325 and display the circle 2330 at the defined angle offset from the slider shape 2325. Although the second color cast operations illustrated in FIG. 23 is defined to apply the same amount as the first color cast operation, some embodiments define the second color cast operation to apply an amount of color based on a ratio of the amount applied by the first color cast operation.

Furthermore, different operations (e.g., a saturation operation, a contrast operation, an exposure operation, a predefined function, etc.) and different numbers of operations can be associated with different embodiments of a multi-operation slider shape. One such example combines two gamma functions with the two color cast operations described in FIG. 23, above, to define four operations that are associated with a slider shape of some embodiments. Thus, in addition to the two color cast operations, some embodiments apply the following equation to an image being edited.

$$P_{out}=(1.0-Y)*\text{gamma1}+Y*\text{gamma2}$$

where $P_{in}$=input RGB pixel value, $P_{out}$=output RGB pixel value, gamma1=$P_{in}{}^g$, gamma2=$P_{in}{}^{1/g}$, g=an RGB gamma value, $Y=P_{in.R}*0.299+P_{in.G}*0.587+P_{in.B}*0.144$ Since an RGB pixel has three components, the equation is applied to each component as follows:

$$P_{out.R}=(1.0-Y)*\text{gamma1}.R+Y*\text{gamma2}.R$$

$$P_{out.G}(1.0-Y)*\text{gamma1}.G+Y*\text{gamma2}.G$$

$$P_{out.B}=(1.0-Y)*\text{gamma1}.B+Y*\text{gamma2}.B$$

In other embodiments, the two gamma functions provided above are combined with a saturation function and a contrast function to define a different four functions associated with a slider shape of some embodiments. Accordingly, any number of different combinations are possible.

D. Grouping of Slider Shapes

The preceding sections describe movably positioning slider shapes within a sliding region of a two-dimensional slider control one at a time. Some embodiments allow a user to select multiple slider shapes and then movably position the selected slider shapes together. In doing so, operations can be performed faster and more efficiently because multiple operations can be performed at once.

Figure 24:
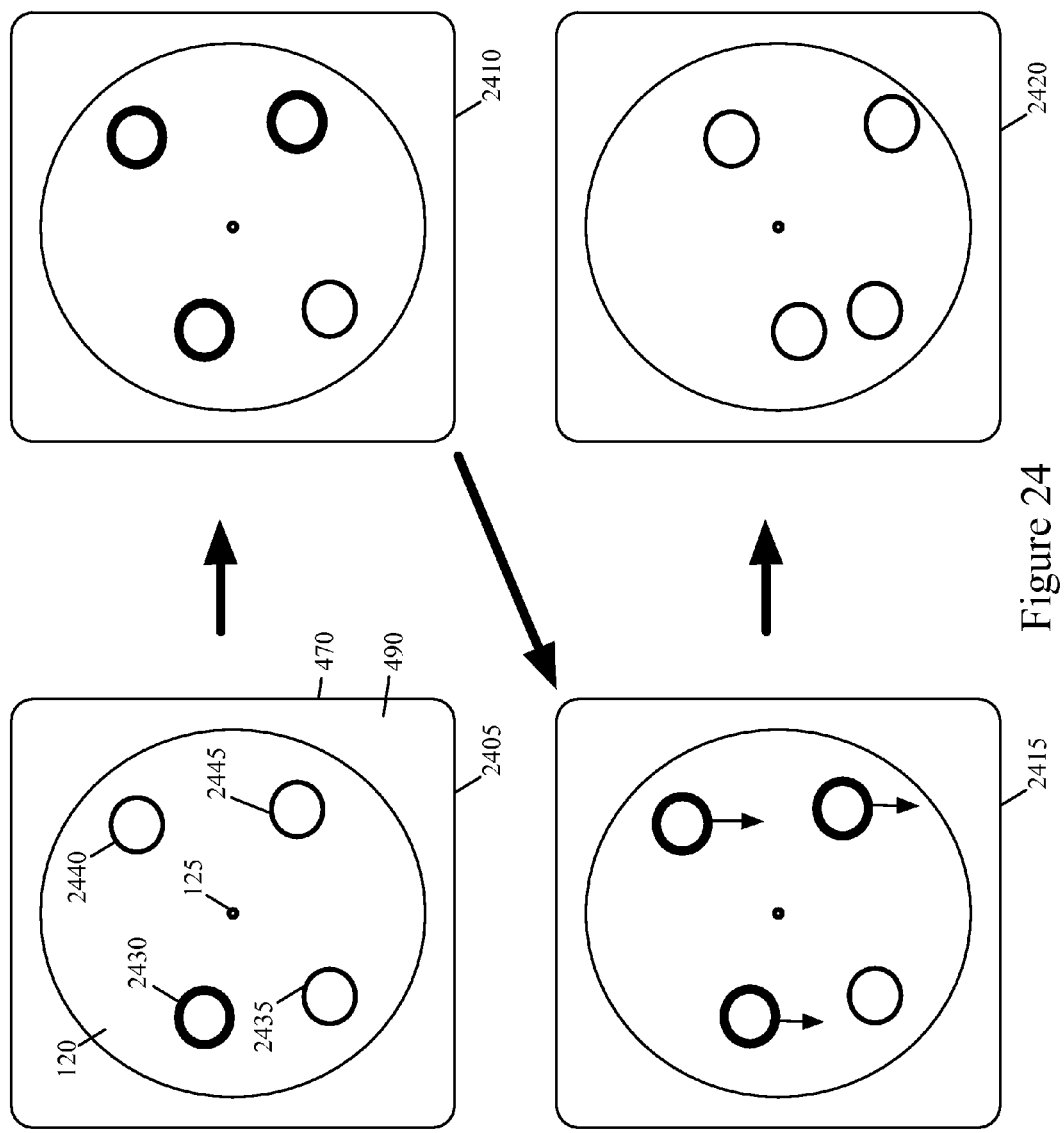
FIG. 24 conceptually illustrates an example slider shape grouping operation of some embodiments.

FIG. 24 conceptually illustrates an example of such operation. FIG. 24 shows the two-dimensional slider control 470 of some embodiments at four different stages 2405, 2410, 2415, and 2420 of a slider shape grouping operation. As shown, the two-dimensional slider control 470 includes a sliding region 2425 and slider shapes 2430-2445.

The first stage 2405 shows the two-dimensional slider control 470 during the selection of slider shapes. In this stage, the slider shape 2430 has been selected (e.g., by holding down a keyboard key and clicking on, tapping). The selection is indicated by the bolding of the border around the slider shape 2430. The second stage 2410 illustrates the two-dimensional slider control 470 after the selection of the slider shapes is completed. In this stage, the slider shapes 2440 and 2445 have also been selected. (e.g., by holding down a keyboard key and clicking on, tapping). Similar to the first stage 2405, the selection of the slider shapes in this stage are indicated by bolding of the borders around the slider shapes 2440 and 2445. One of ordinary skill will recognize that different embodiments may use different methods for selecting slider shapes for creating a custom slider shape. For example, using a selection box, using a series of keyboard keystrokes, or using a combination of keystrokes are other possible methods.

The third stage 2415 shows the two-dimensional slider control 470 during a movable positioning of the selected group of slider shapes. In this stage, the selected slider shapes 2430, 2440, and 2445 are being movably positioned together by selecting one of the slider shapes 2430-2445 and then movably positioning (e.g., by performing a drag-and-drop operation) it within the sliding region 120. As indicated by the arrows below the slider shapes 2430, 2440, and 2445, the movable positioning of one of the slider shapes 2430-2445 also causes the other two slider shapes to move the same distance and in the same direction. Although the third stage 2415 shows the selection and movable positioning of one of the slider shapes, the same operation (e.g., a drag-and-drop operation) can be performed on any other selected slider shapes in the group to move the group of selected slider shapes.

The fourth stage 2420 shows the two-dimensional slider control 470 after the completion of the movable position of the selected slider shapes in the third stage 2415. As shown, the slider shapes 2430, 2440, and 2445 are still selected (i.e., the borders are still bolded). As such, the selected group of slider shapes 2430, 2440, and 2445 can still be movably positioned together.

FIG. 24 shows an example sequence of operations for selecting slider shapes and movably positioning the group of selected slider shapes within the sliding region. However, between any of the stages, any selected slider shape can be unselected (e.g., by holding down a keyboard key and clicking on, tapping, etc.), any unselected slider shapes (i.e., slider shape 2435) can be selected (and movably positioned within the sliding region 2425), and any slider shape in the group of selected slider shapes can be used to movably position the group of selected slider shapes within the sliding region 2425.

E. Custom Slider Shapes

The preceding sections describe a variety of embodiments of multi-operation slider shapes that are predefined (e.g., by the developer of an application that provides such slider shapes). Some embodiments provide a different type of multi-operation slider shape: a user-customizable slider shape. In some embodiments, custom slider shapes are used to easily and consistently replicate a desirable look or appearance that a combination of multiple operations produces on an image (not shown). Moreover, a custom slider shape can reduce the number of slider shapes in the sliding region while preserving the operations associated with the slider shapes represented by the custom slider shape.

Figure 25:
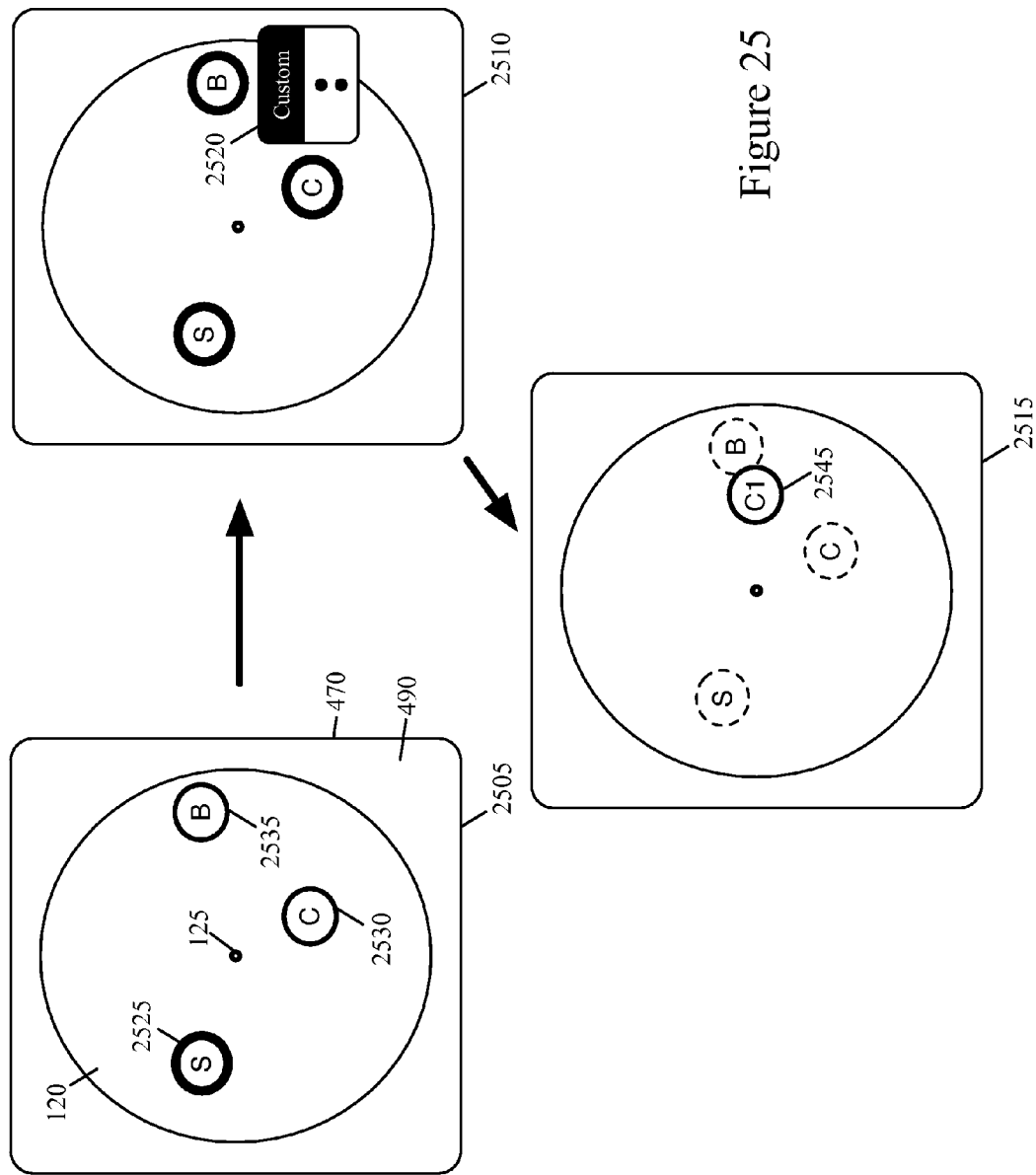
FIG. 25 conceptually illustrates a custom slider shape of some embodiments.

FIG. 25 conceptually illustrates a custom slider shape of some embodiments. This figure shows the two-dimensional slider control 470 of some embodiments at three different stages 2505, 2510, and 2515 of a custom slider creation operation. As shown, the two-dimensional slider control 470 includes a sliding region 120 and slider shapes 2525-2535. In this example, the slider shapes 2525-2535 are each defined to control a saturation operation, a contrast operation, and an exposure operation, respectively. Their operations are indicated by the labels on each of the slider shapes 2525-2535 (i.e., "S," C," and "E").

In some embodiments, a custom slider shape is a single slider shape that represents a configuration of multiple slider shapes (i.e., multiple operations). The custom sliders of some embodiments can even include other multi-operation slider shapes, such as the multi-operation slider shape described above by reference to FIG. 23.

The first stage 2505 shows the two-dimensional slider control 2500 during the selection of slider shapes for creating a custom slider shape. In this stage, the slider shape 2525 is selected (e.g., by holding down a keyboard key and left-clicking). The selection is indicated by the bolding of the border around the slider shape 2525.

The second stage 2510 shows the two-dimensional slider control 470 after the completion of the selection of slider shapes. In this stage, the slider shapes 2530 and 2535 are also selected (e.g., by holding down a keyboard key and clicking on, tapping, etc.). The selections are also indicated by the bolding of the borders around the slider shapes 2530 and 2535. One of ordinary skill will recognize that different embodiments may use different methods for selecting slider shapes for creating a custom slider shape. For example, using a selection box, a series of keyboard keystrokes, or a combination of keystrokes are possible methods.

As shown, the second stage 2510 displays a selection of a user selectable "Custom" option included in a pop-up menu 2520. Different embodiments invoke the pop-up menu 2520 similar to the different methods used to invoke the pop-up menu 1320 described above by reference to FIG. 13. The "Custom" option is for creating a custom slider shape based on the configuration of the selected slider shapes at the time of the creation of the custom slider shape.

The third stage 2515 illustrates the two-dimensional slider control 470 after the creation of a custom slider shape 2545, which is designated with a labeled "C1". The custom slider shape 2545 represents the operations associated with the slider shapes 2525, 2530, and 2535, and it applies these operations to an image being edited based on the positions of the slider shapes 2525, 2530, and 2535 when the custom slider shape 2545 was created. In this manner, the custom slider shape 2545 is able to reproduce the look or appearance produced by the application of the operations associated with the slider shapes 2525, 2530, and 2535 to the image being edited.

Between the second stage 2510 and the third stage 2515, the "Custom" option was selected to create the custom slider shape 2545. Different embodiments provide different ways to invoke the creation of the custom slider shape 2545. For instance, a keyboard keystroke, a combination of keystrokes, a hotkey, an option selected from a pull-down or pop-up menu may be used to invoke the creation of a custom slider shape based on the selected slider shapes. In this stage, the dashed-line circles that indicate the previous positions of the slider shapes 2525, 2530, and 2535 shortly before the custom slider shape 2545 was created is for illustrating the configuration of the slider shapes represented by the created custom slider shape 2545. In some embodiments, the dashed-line circles of the slider shapes are not actually displayed.

Some embodiments define a custom slider shape to operate like an on/off switch. For example, movably positioning the custom slider shape 2545 outside the sliding region 120 does not apply any color correction operations to an image being edited. However, movably positioning the custom slider shape 2545 anywhere within the sliding region 2545 applies the operations of the slider shapes 2525, 2530, and 2535 at their respective positions within the sliding region 120 when the creation of the custom slider shape 2545 is invoked (i.e., the positions of the slider shapes 2525, 2530, and 2535 in the second stage 2510 in this example).

In some embodiments, movably positioning a custom slider within a sliding region can change the application of the combined operations of the custom slider. For instance, movably positioning the custom slider shape 2545 midway between the outer circle and the inner circle of the sliding region 120, as illustrated in the third stage 2515, applies the operations based on the positions of the slider shapes 2525, 2530, and 2535 when the creation of the custom slider shape 2545 was invoked. Movably positioning the custom slider shape 2545 towards the outer circle decrease the relative operations of the slider shapes on the image being edited and movably positioning it towards the center of the sliding region 120 increases the relative operations of the slider shapes. Other ways of controlling the combined operations through the custom slider shape 2545 are possible in different embodiments.

Moreover, some embodiments allow custom slider shapes to be saved for later use, imported from another same or similar application, and/or exported to another same or similar application. These features allow complex and difficult-to-reproduce looks or appearances to be reused and applied to other images at a later time.

III. Sliding Region Operations

The above sections and figures describe controlling operations associated with slider shapes by movably positioning slider shapes within a sliding region of a two-dimensional slider control. However, rather than movably positioning slider shapes, some embodiments control the operations associated with slider shapes by movably positioning the sliding region.

Figure 26:
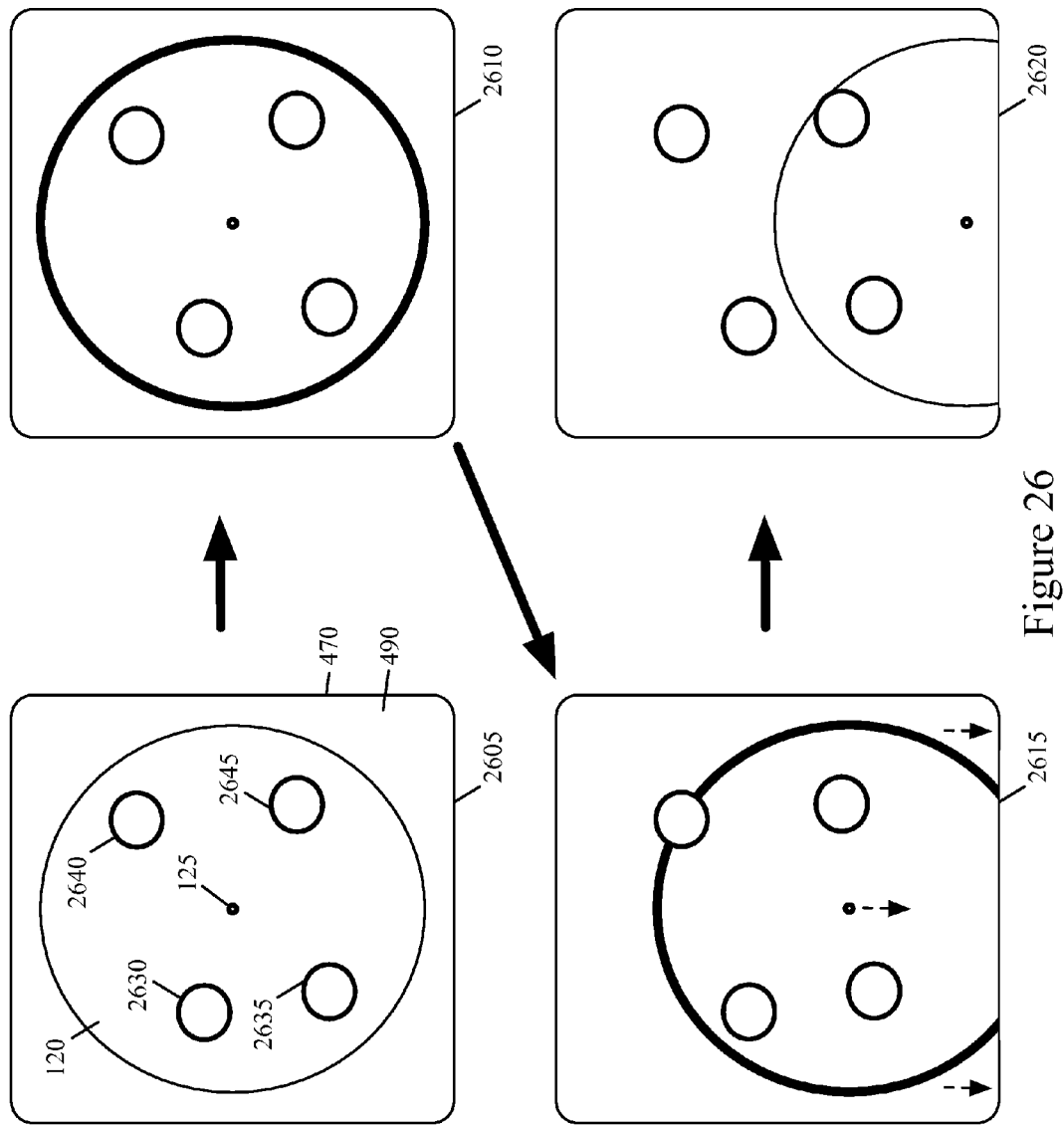
FIG. 26 conceptually illustrates a sliding region operation of some embodiments.

FIG. 26 illustrates the two-dimensional slider control 470 of some embodiments. This figure shows the two-dimensional slider control 470 at four different stages 2605-2620 of a sliding region operation. The two-dimensional slider control 470 includes a sliding region 120 and slider shapes 2630-2645. In the first stage 2605, the slider shapes 2630-2645 are positioned within the sliding region 120. As such, the operations associated with the slider shapes 2630-2645 are applied to an image being edited (not shown) based on the positions of the slider shapes.

The second stage 2610 illustrates the two-dimensional slider control 470 at the start of the sliding region operation. In this stage, the center of the sliding region has been selected (e.g., by performing the drag portion of a drag-and-drop operation). The selection of the sliding region 120 is indicated by the bolding of the outer circle of the sliding region 120.

The third stage 2615 shows the two-dimensional slider control 470 during the sliding region operation. As shown, the sliding region 120 is being movably positioned towards the bottom of the two-dimensional slider control 470, as indicated by the arrows. The slider shapes 2630-2645, however, have not moved and remain stationary in their positions. In some embodiments, as the sliding region 120 is being moved, the operations associated with the slider shapes 2630-2645 are being modified due to changes to their positions relative to the sliding region 120.

The fourth stage 2620 illustrates the two-dimensional slider control 470 after the sliding region operation is completed, as indicated by the un-bolding of the outer circle of the sliding region 120. In this stage, the sliding region 120 is moved further towards the bottom of the two-dimensional slider control 470. As shown, the slider shapes 2630 and 2640 are no longer within the sliding region 120, and, thus, the operations associated with those slider shapes are not applied to the image being edited.

Figure 27:
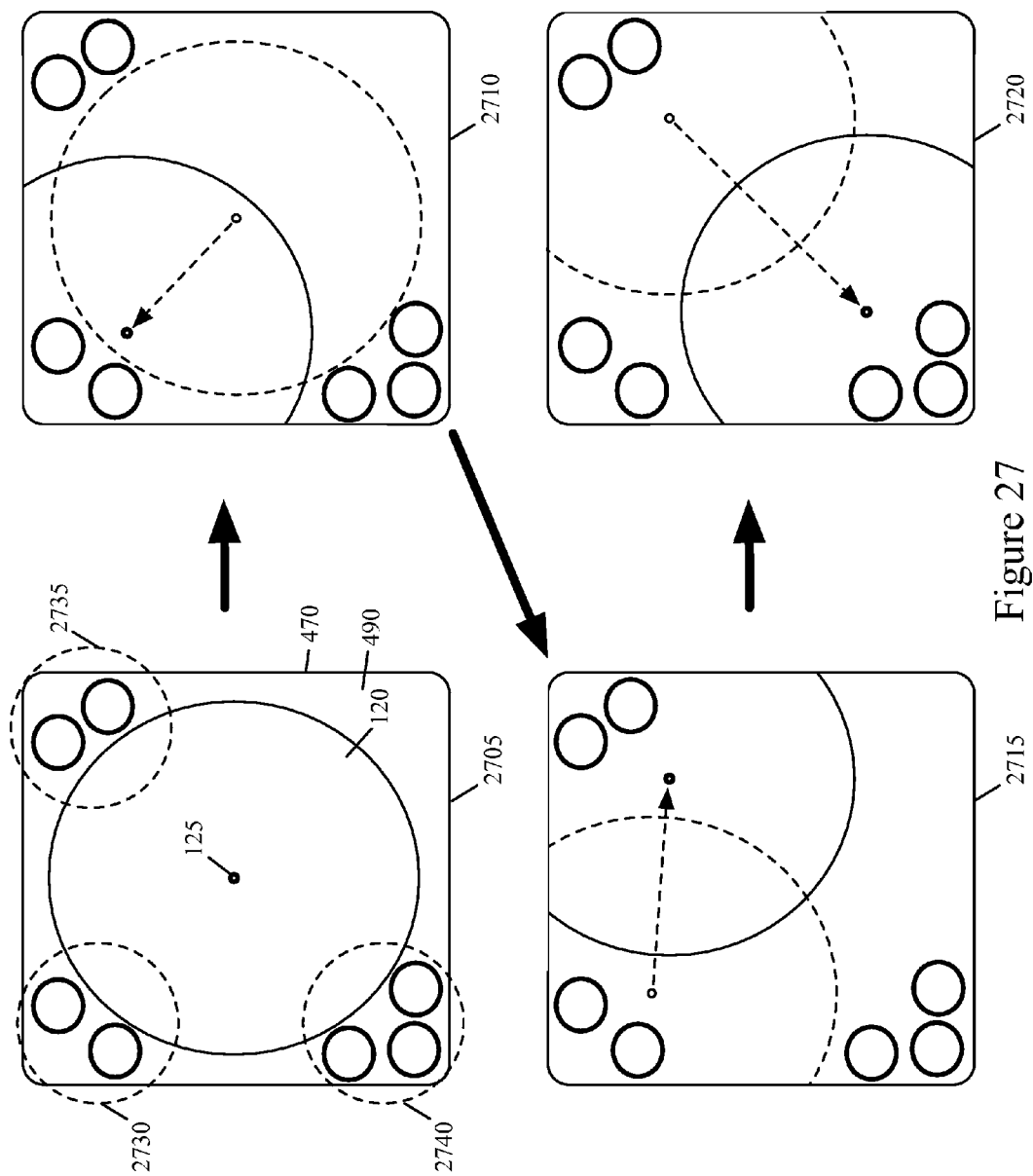
FIG. 27 conceptually illustrates another sliding region operation of some embodiments.

FIG. 27 conceptually illustrates another sliding region operation of some embodiments. Specifically, FIG. 27 illustrates the use of the sliding region operation illustrated above in FIG. 26 to movably position a sliding region among different sets of slider shapes. This way, a user can quickly compare, contrast, mix, and match the different looks or appearances produced by the different sets of slider shapes on an image being edited (not shown). As show, FIG. 27 illustrates the two-dimensional slider control 470 at four different stages 2705, 2710, 2715, and 2720 of a sliding region operation. The two-dimensional slider control 470 includes a sliding region 120 and three sets of slider shapes 2730-2740.

The first stage 2705 shows the two-dimensional slider control 470 before any sliding region operations have started. The sets of slider shapes 2730-2740 are each respectively positioned in the upper left, upper right, and lower left corners of the two-dimensional slider control 470. The second stage 2710 illustrates the two-dimensional slider control 470 after a sliding region operation has been completed. In this stage, the sliding region 120 has been movably positioned (e.g., by performing a drag-and-drop operation) from its position in the first stage 2705 towards the set of slider shapes 2730 in the upper left corner of the two-dimensional slider control 470. The look or appearance produced by operations associated with the slider shapes in the set of slider shapes 2730 are applied to the image being edited.

The third stage 2715 shows the two-dimensional slider control 470 after the completion of another sliding region operation. As shown, the sliding region 120 was movably positioned (e.g., by performing a drag-and-drop operation) from its position in the second stage 2710 towards the set of slider shapes 2735 in the upper right corner of the two-dimensional slider control 470. As this point, the look or appearance produced by operations associated with the slider shapes of the set of slider shapes 2735 are applied to the image being edited.

The fourth stage 2720 illustrates the two-dimensional slider control 470 after the completion of yet another sliding region operation. This stage shows the sliding region 120 movably positioned (e.g., by performing a drag-and-drop operation) from its position in the third stage 2715 towards the set of slider shapes 2740 in the lower left corner of the two-dimensional slider control 470. In this stage, the look or appearance produced by operations associated with the sliders in the set of slider shapes 2740 are applied to the image being edited.

Figure 28:
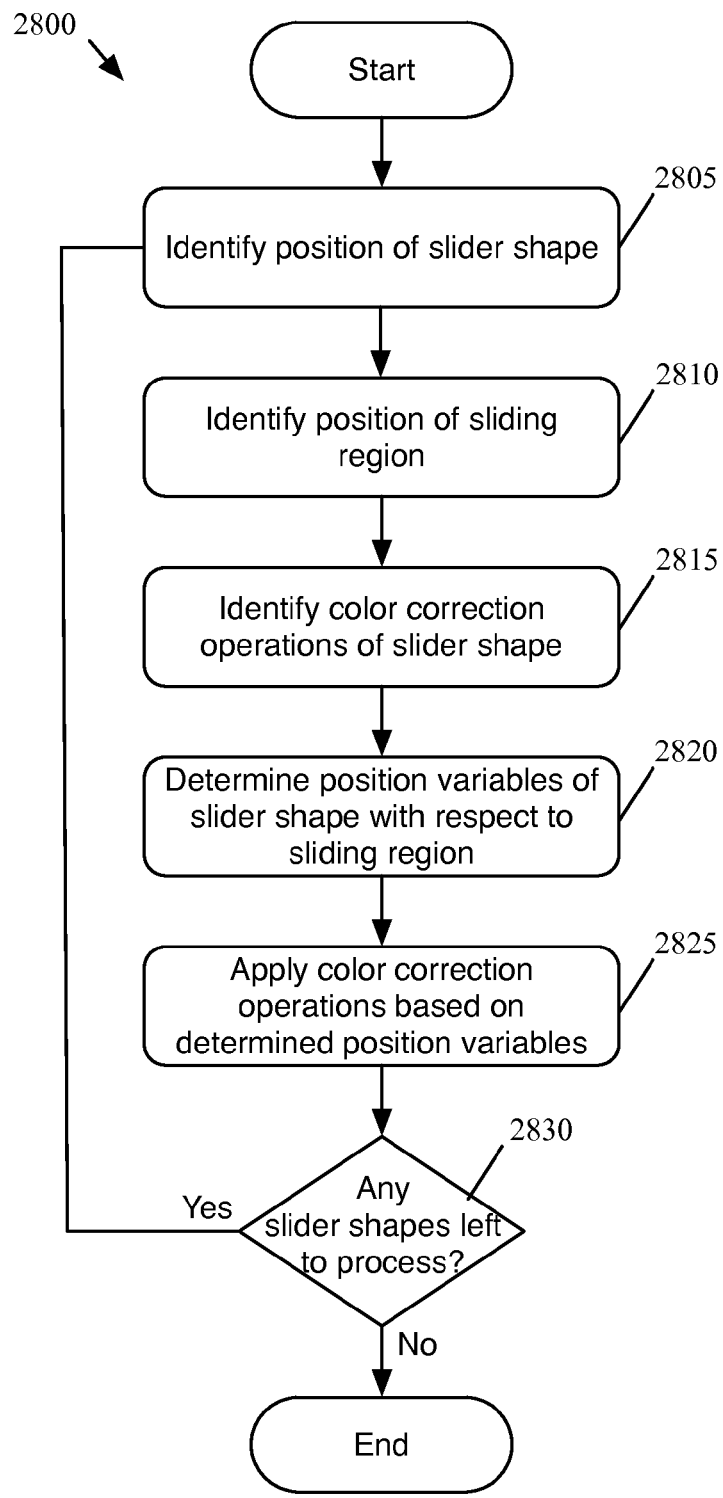
FIG. 28 conceptually illustrates a process for performing color correction operations on an image in some embodiments.

FIG. 28 illustrates a process 2800 of some embodiments for performing color correction operations on an image in response to interactions between user selectable slider shapes and a sliding region displayed of a two-dimensional slider control, such as the sliding region operations illustrated in FIGS. 26 and 27 or similar sliding region operations. In some embodiments, the process 2800 is performed while a sliding region is movably positioned within a display area of the two-dimensional slider control. For example, in some such embodiments, the process 2800 is constantly performed (i.e., in real-time) while the sliding region is being movably positioned within the display area. In other such embodiments, the process 2800 is performed every time the sliding region moves a defined distance (e.g., 10 pixels, 5 millimeters, etc.) while it is being movably positioned in the display area. In yet other embodiments, the process 2800 is performed when the movable positioning of the sliding region is completed (e.g., the drag-and-drop operation performed on the sliding region is completed).

The process 2800 begins by receiving (at 2805) a position of a user selectable slider shape within a sliding region. Next, the process 2800 receives (at 2810) a position of a user selectable sliding region in the display area. In some embodiments, the center of the sliding region is defined to represent the position of the sliding region while in other embodiments a different point within the sliding region is defined to represent the position of the sliding region.

The process 2800 then identifies (at 2815) a set of color correction operations associated with the user selectable slider shape. Examples of color correction operations include a saturation operation, a contrast operation, an exposure operation, and a color cast operation, among other color correction operations. After operation 2815, the process 2800 determines (at 2820) position variables of the user selectable slider shape with respect to the sliding region. In some embodiments, the position variables that are determined include a radial distance position variable, an angle position variable, an x-axis position variable, and a y-axis position variable, as described in above sections. Other embodiments can include other position variables as well.

Next, the process 2800 applies (at 2825) the identified color correction operations based on the determined position variables, such as those described in the sections and illustrated in the figures above. The process 2800 determines (at 2830) whether any slider shapes are left to process. In some embodiments, the process 2800 processes all the slider shapes in the two-dimensional slider control while in other embodiments the process 2800 processes only the slider shapes positioned within the sliding region of the two-dimensional slider control. When the process 2800 determines that there are slider shapes left to process, the process 2800 returns to operation 2805 to process the remaining slider shapes. Otherwise, the process 2800 ends.

Many of the figures (e.g., FIGS. 23, 24, 25, 26, and 27) described above in this section illustrate just a two-dimensional slider control of some embodiments that includes numerous slider shapes. Although not shown in these figures, the slider shapes included in the two-dimensional slider control are added using a corresponding slider shape generator in a similar manner as the addition of the slider shape 475 to the two-dimensional slider control 470 in some embodiments. Other embodiments add the slider shapes via other methods, such as using hotkey, a keystroke, a combination of keystrokes, a selection of an option from a pull-down or pop-up menu, or any other appropriate method.

IV. Exemplary Tablet Implementation

Many of the different embodiments and examples above describe various methods of interacting with the GUI of a two-dimensional slider control. Some of these embodiments use a touchscreen as an input device. Specifically, these embodiments can be implemented on a tablet computing device (e.g., an Apple iPad®) with a touchscreen input device. With a touchscreen input device, a user can simultaneously perform multiple selection operations.

Figure 29:
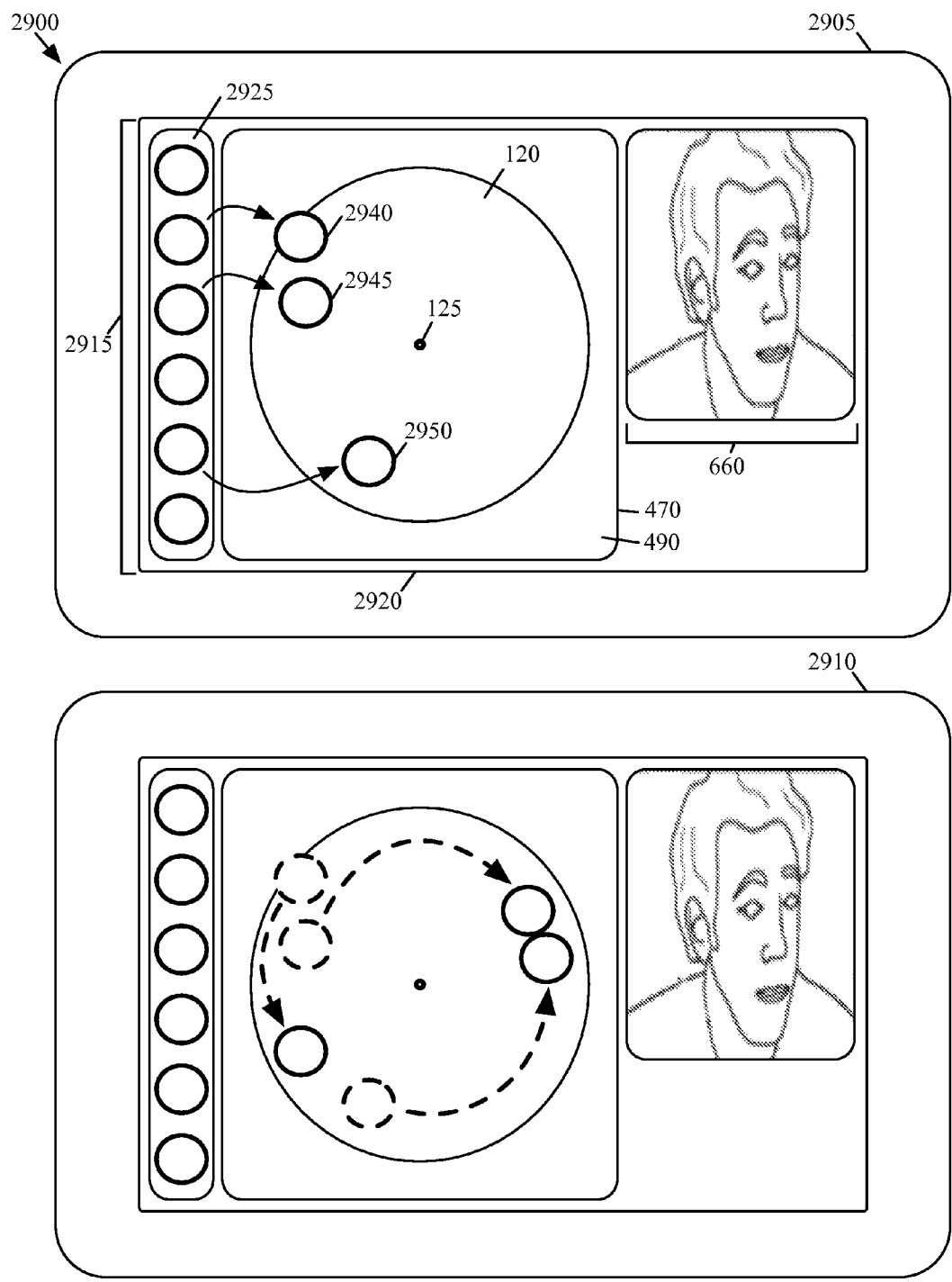
FIG. 29 conceptually illustrates an example of a table implementation of a media editing application that provides a two-dimensional slider control of some embodiments.

FIG. 29 illustrates an example of a table implementation of a media editing application that provides a two-dimensional slider control that allows such multiple simultaneous selections to perform color correction operations on an image. This figure shows a tablet computing device 2900 and a GUI 2920 displayed on a display screen of the tablet computing device 2900. As shown, the GUI 2920 includes a slider shape tool box 2925, a two-dimensional slider control 470, and a viewing area 660. The slider shape tool box 2925 includes several slider shape generators that are similar to the slider shape generators described above by reference to FIG. 4. The two-dimensional slider control 470 includes a sliding region 120 and three slider shapes 2940-2950. The viewing area 660 is for displaying the image being edited and effects produced by the application of color correction operations to the image.

FIG. 29 also illustrates the GUI 2920 at two different stages 2905 and 2910. The first stage 2905 shows the GUI 2920 after a multiple slider shapes have been generated. In this stage, the slider shapes 2940, 2945, and 2950 have been simultaneously generated from slider shape generators in the slider shape tool bar 2925. In some embodiments, the slider shapes 2940, 2945, and 2950 have been generated by touching each of the corresponding slider shape generators on the display screen 2915 and dragging towards the sliding region 120 as indicated by the arrows.

The second stage 2910 shows the GUI 2900 after the slider shapes 2940-2950 have been simultaneously movably positioned from their positions within the sliding region 120 in the first stage 2905. In some embodiments, the slider shapes 2940-2950 are movably positioned by touching each of the slider shapes 2940-2950 at their previous positions (i.e., their positions in the first stage 2905) and dragging them to their current positions, as shown in this stage.

The operations illustrated in FIG. 29 demonstrate how multiple selection operations can be simultaneously performed through a touchscreen input device of a tablet computing device. However, one of ordinary skill will recognize that such selection operations do not have to be performed simultaneously. For instance, some or all of the operations performed in the stages 2905 and 2910 can overlap, be performed sequentially in any order, and/or be performed concurrently.

In many of the embodiments described above, the operation(s) of slider shapes that are based on a radial distance position variable are defined to increase as the slider shapes are movably positioned closer to a center of a sliding region. However, in some of these embodiments, such slider shapes can be defined differently. For instance, when positioning such a slider shape at approximately the center, a small or no amount of the operation associated with the slider shape is applied (e.g., to an image being edit) and movably positioning the slider shape away from the center of the sliding region increases the amount of the operation applied to the image.

V. Software Architecture

Figure 30:
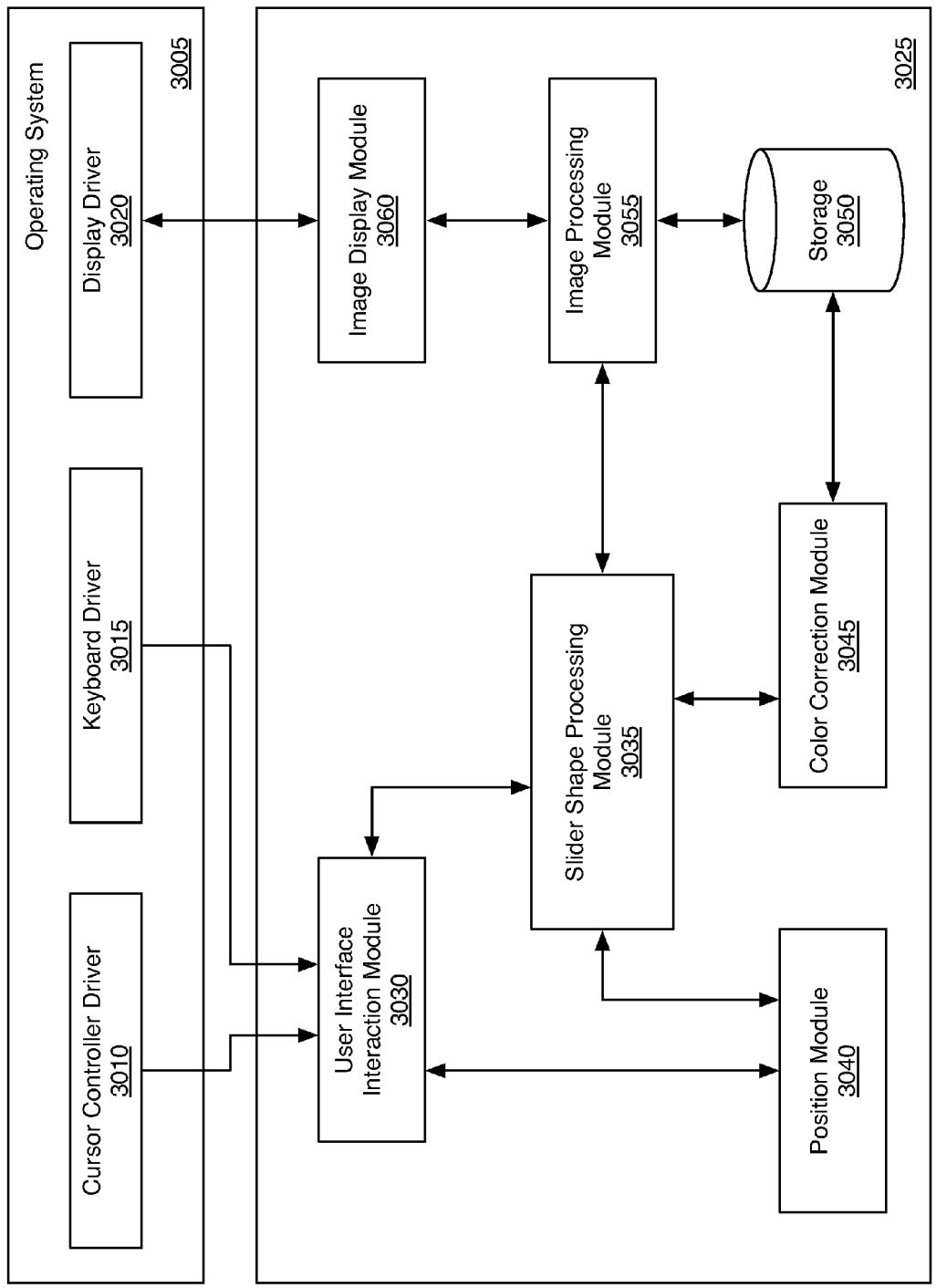
FIG. 30 conceptually illustrates a software architecture of a color mixing processor of some embodiments.

In some embodiments, the processes described above are implemented as software running on a particular machine, such as a computer or a handheld device, or stored in a non-transitory computer readable medium. FIG. 30 conceptually illustrates the software architecture of an application 3025 of some embodiments for processing image processing and/or color correction operations, such as those described in the previous sections. In some embodiments, the application 3025 is a standalone application or is part of another application (e.g., a photo-editing application, a media editing application, a video-editing application, etc.) while in other embodiments the application 3025 is implemented as part of an operating system. Furthermore, the application 3025 of some embodiments is implemented as part of a client-server solution. In some such embodiments, the application 3025 is provided via a thin client (i.e., the application 3025 runs on a server while a user interacts with the application 3025 through a machine that is separate from the server). In other such embodiments, the application 3025 is provided via a thick client (i.e., the application 3025 is distributed from a server to a client machine and runs on the client machine).

As shown, the application 3025 includes a user interface (UI) interaction module 3030, a slider shape processing module 3035, a position module 3040, a color correction module 3045, a storage 3050, an image processing module 3055, and an image display module 3060. FIG. 30 also illustrates an operating system 3005 that includes a cursor controller driver 3010, a keyboard driver 3015, and a display driver 3020.

A user can interact with the user interface via input devices (not shown). The input devices, such as cursor controllers (a mouse, trackball, tablet, touchpad, etc.) and keyboards, send signals to the cursor controller driver 3010 and keyboard driver 3015. The cursor controller driver 3010 and keyboard driver 3015 translate such signals into user input data that is provided to the UI interaction module 3030.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc). For example, a cursor in the graphical user interface can be used to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching (e.g., tapping) that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The UI interaction module 3030 then interprets the user input data in the context of displayed user interface objects (e.g., slider shapes, slider shape generators, a sliding region, etc.) and passes the data to the slider shape processing module 3035.

The slider shape processing module 3035 interprets UI interactions into movement of user interface objects in the UI. For each slider shape that is moved, the slider shape processing module 3035 instructs the position module 3040 to retrieve position information (e.g., x and y coordinates) of the slider shape and the sliding region, which the position module 3040 retrieves from the UI interaction module 3030.

The slider shape processing module 3035 sends identifying information (e.g., a unique identifier associated with the slider shape), which it receives from the UI interaction module 3030 along with the user input data, to the color correction module 3045. Based on the identifying information and information retrieved from the storage 3050, the color correction module 3045 identifies the color correction operation(s) associated with the slider shape. The color correction module 3045 passes the identified color correction operation information to the slider shape processing module 3035.

When the slider shape processing module 3035 receives the position information and the color correction operation information, it processes the received information. The slider shape processing module 3035 determines the positions variables for applying one or more color correction operations to an image based on the processed information and instructs the image processing module 3055 to apply the determined color correction operation(s) to the image.

The image processing module 3055 receives the instructions from the slider shape processing module 3035 and applies the color correction operation(s) to the image, which is stored in the storage 3050. The image processing module 3055 also informs the image display module 3060 of the applied color correction operation(s). The image display module 3060 controls the display of the image in another display area of the UI. In some embodiments, the image display module 3060 handles the display of modifications to the color attributes of the image in response to movements of slider shapes or the sliding region in the UI. The image display module 3060 passes the display information to the display driver 3020, which handles the actual display of the image (and the rest of the UI) on an output device (not shown), such as a monitor (CRT, LCD, etc.).

While many of the features have been described as being performed by one module (e.g., the slider shape processing module 3035), one of ordinary skill would recognize that the functions can be split up into multiple modules, and the performance of one feature might even require multiple modules.

VI. Computer System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 31:
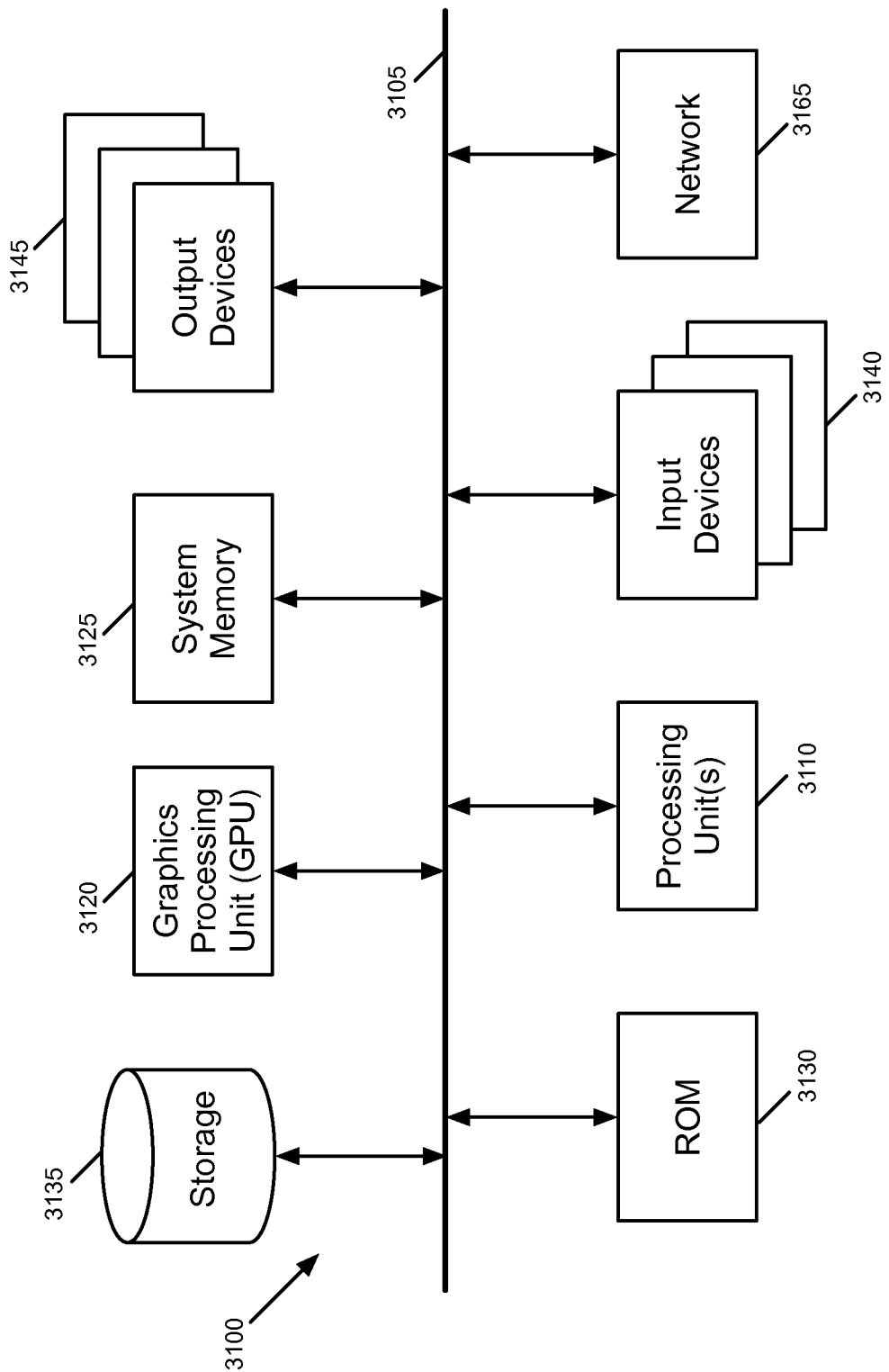
FIG. 31 conceptually illustrates a computer system with which some embodiments of the invention are implemented.

FIG. 31 conceptually illustrates an electronic system 3100 with which some embodiments of the invention are implemented. The electronic system 3100 may be a computer, phone, PDA, or any other sort of electronic device. Such an electronic system includes various types of computer readable media and interfaces for various other types of computer readable media. Electronic system 3100 includes a bus 3105, processing unit(s) 3110, a graphics processing unit (GPU) 3120, a system memory 3125, a read-only memory 3130, a permanent storage device 3135, input devices 3140, and output devices 3145.

The bus 3105 collectively represents all system, peripheral, and chipset buses that communicatively connect the numerous internal devices of the electronic system 3100. For instance, the bus 3105 communicatively connects the processing unit(s) 3110 with the read-only memory 3130, the GPU 3120, the system memory 3125, and the permanent storage device 3135.

From these various memory units, the processing unit(s) 3110 retrieve instructions to execute and data to process in order to execute the processes of the invention. The processing unit(s) may be a single processor or a multi-core processor in different embodiments. Some instructions are passed to and executed by the GPU 3120. The GPU 3120 can offload various computations or complement the image processing provided by the processing unit(s) 3110. In some embodiments, such functionality can be provided using CoreImage's kernel shading language.

The read-only-memory (ROM) 3130 stores static data and instructions that are needed by the processing unit(s) 3110 and other modules of the electronic system. The permanent storage device 3135, on the other hand, is a read-and-write memory device. This device is a non-volatile memory unit that stores instructions and data even when the electronic system 3100 is off. Some embodiments of the invention use a mass-storage device (such as a magnetic or optical disk and its corresponding disk drive) as the permanent storage device 3135.

Other embodiments use a removable storage device (such as a floppy disk, flash drive, or ZIP® disk, and its corresponding disk drive) as the permanent storage device. Like the permanent storage device 3135, the system memory 3125 is a read-and-write memory device. However, unlike storage device 3135, the system memory is a volatile read-and-write memory, such a random access memory. The system memory stores some of the instructions and data that the processor needs at runtime. In some embodiments, the invention's processes are stored in the system memory 3125, the permanent storage device 3135, and/or the read-only memory 3130. For example, the various memory units include instructions for processing multimedia items in accordance with some embodiments. From these various memory units, the processing unit(s) 3110 retrieve instructions to execute and data to process in order to execute the processes of some embodiments.

The bus 3105 also connects to the input and output devices 3140 and 3145. The input devices enable the user to communicate information and select commands to the electronic system. The input devices 3140 include alphanumeric keyboards and pointing devices (also called "cursor control devices"). The output devices 3145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 31, bus 3105 also couples electronic system 3100 to a network 3165 through a network adapter (not shown). In this manner, the computer can be a part of a network of computers (such as a local area network ("LAN"), a wide area network ("WAN"), or an Intranet, or a network of networks, such as the Internet. Any or all components of electronic system 3100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7, 15, 17, and 28) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A non-transitory computer readable medium storing a computer program which when executed by at least one processor provides a graphical user interface (GUI) for controlling an application, the GUI comprising:
   a contiguous two-dimensional sliding region defined along two axes;
   a plurality of separate sliders, each for moving to a plurality of positions within the two dimensional sliding region that have non-zero values along the two axes, wherein each slider is associated with a parameter for controlling one or more operations of the application, wherein a plurality of different positions in the two-dimensional sliding region for each slider specifies a plurality of different values for the parameter associated with the slider; and
   a plurality of selectable user interface (UI) items, wherein when one of the selectable UI items is selected and dragged into the contiguous two-dimensional sliding region, a slider is added to the contiguous two-dimensional sliding region.

2. The non-transitory computer readable medium of claim 1, wherein each of the plurality of sliders is added to the two-dimensional sliding region by selecting and dragging a different selectable UI item in the plurality of UI items into the two-dimensional sliding region.

3. The non-transitory computer readable medium of claim 1, wherein the GUI further comprises a display area for displaying the two-dimensional sliding region.

4. The non-transitory computer readable medium of claim 3, wherein the plurality of selectable UI items is displayed within the display area.

5. The non-transitory computer readable medium of claim 3, wherein the display area is a first display area, wherein the plurality of selectable UI items are displayed in a second display area adjacent to the first display area.

6. A method of providing a graphical user interface (GUI) for a media editing application to apply image processing operations to an image, the method comprising:
   providing a contiguous two-dimensional sliding region;
   providing a plurality of separate sliders for movably positioning independently with respect to each other within the two-dimensional sliding region, wherein movably positioning a slider causes a corresponding application of an image processing operation to be applied to the image based on a position of the slider within the two-dimensional sliding region; and
   providing a plurality of selectable user interface (UI) items, wherein, when one of the selectable UI items is selected and dragged into the contiguous two-dimensional sliding region, a slider is added to the contiguous two-dimensional sliding region.

7. The method of claim 6 further comprising providing a set of selectable UI items for specifying a set of pixels in the image to which the image processing operation of the slider is to be applied, the set of pixels having luminance values that fall within a particular range of luminance values.

8. The method of claim 7, wherein the set of selectable UI items is included in a menu that is displayed in the GUI.

9. The method of claim 6, wherein each of the plurality of sliders is added to the two-dimensional sliding region when a different selectable UI item of the plurality of selectable UI items is selected and dragged into the two-dimensional sliding region.

10. The method of claim 6 further comprising providing a display area for displaying the image and displaying effects of image processing operations that are applied to the image.

11. A method of applying color correction operations to an image using a slider control, the slider control comprising a two-dimensional sliding region and a plurality of sliders that each controls a color correction operation, the method comprising:
    adding a slider in the plurality of sliders to the two-dimensional sliding region by identifying a corresponding item of a plurality of items and moving the corresponding item into the two-dimensional sliding region;
    movably positioning the slider in the plurality of sliders within the two-dimensional sliding region;
    in response to the positioning of the slider, determining the color correction operation of the slider based on the position of the slider within the two-dimensional sliding region; and
    applying to the image the determined color correction operation.

12. The method of claim 11, wherein each of the plurality of sliders is added to the two-dimensional sliding region by identifying a different corresponding item of a plurality of items and moving the different corresponding item into the two-dimensional sliding region.

13. The method of claim 11, wherein movably positioning the slider in the plurality of sliders comprises presenting the plurality of sliders within the two-dimensional sliding region before and after the slider is movably positioned to the position within the two-dimensional sliding region.

14. The method of claim 11, wherein the color correction operation of at least one slider is a saturation operation.

15. The method of claim 11, wherein the color correction operation of at least one slider is a contrast operation.

16. The method of claim 11, wherein the color correction operation of at least one slider is a brightness operation.

17. The method of claim 11, wherein the color correction operation of at least one slider is a color cast operation.

18. A method of applying color correction operations to an image using a slider control, the slider control comprising a two-dimensional sliding region and a plurality of sliders that each controls a color correction operation, the method comprising:
    creating a particular slider that represents the positions of a subset of the plurality of sliders within the two-dimensional sliding region;
    movably positioning the particular slider within the two-dimensional sliding region;
    in response to the positioning of the particular slider, determining the color correction operation of the particular slider based on the position of the particular slider within the two-dimensional sliding region; and
    applying to the image the determined color correction operation.

19. The method of claim 18, wherein determining the color correction operation of the particular slider comprises determining color correction operations for each of the sliders in the subset of sliders based on the position of the particular slider within the two-dimensional sliding region.

20. The method of claim 19, wherein applying the determined color correction operation comprises applying each of the determined color correction operations for the subset of sliders to the image.

21. The method of claim 18 further comprising adding each particular slider in the plurality of sliders to the two-dimensional sliding region by identifying a corresponding item of a plurality of items and moving the corresponding item into the two-dimensional sliding region.

22. The method of claim 18, wherein creating a particular slider that represents the positions of a subset of the plurality of sliders comprises replacing the subset of the plurality of sliders within the two-dimensional sliding region with the particular slider within the two-dimensional sliding region.

* * * * *